(12) United States Patent
Gan et al.

(10) Patent No.: US 10,976,924 B2
(45) Date of Patent: Apr. 13, 2021

(54) APPLICATION INTERFACE DISPLAY METHOD AND TERMINAL DEVICE

(71) Applicant: Huawei Technologies Co., Ltd., Shenzhen (CN)

(72) Inventors: Yuanli Gan, Shenzhen (CN); Tao Liu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 101 days.

(21) Appl. No.: 16/329,167

(22) PCT Filed: Aug. 31, 2016

(86) PCT No.: PCT/CN2016/097647
§ 371 (c)(1),
(2) Date: Feb. 27, 2019

(87) PCT Pub. No.: WO2018/040010
PCT Pub. Date: Mar. 8, 2018

(65) Prior Publication Data
US 2019/0187893 A1 Jun. 20, 2019

(51) Int. Cl.
*G06F 3/0488* (2013.01)
*G06F 3/0481* (2013.01)
*G06F 3/0482* (2013.01)

(52) U.S. Cl.
CPC ........ *G06F 3/04886* (2013.01); *G06F 3/0481* (2013.01); *G06F 3/0482* (2013.01); *G06F 3/0488* (2013.01); *G06F 2203/04803* (2013.01); *G06F 2203/04804* (2013.01)

(58) Field of Classification Search
CPC ......... G06F 3/0488; G06F 2203/04803; G06F 2203/04804; G06F 3/04886; G06F 3/0481; G06F 3/0482
See application file for complete search history.

(56) References Cited

U.S. PATENT DOCUMENTS

| 2007/0245256 | A1 | 10/2007 | Boss et al. |
| 2008/0276200 | A1 | 11/2008 | Bamford et al. |
| 2012/0162112 | A1* | 6/2012 | Cho ...................... G06F 3/0482 345/173 |

(Continued)

FOREIGN PATENT DOCUMENTS

| CN | 101055520 A | 10/2007 |
| CN | 101299178 A | 11/2008 |

(Continued)

*Primary Examiner* — Angie Badawi
(74) *Attorney, Agent, or Firm* — Slater Matsil, LLP

(57) ABSTRACT

A method includes: if it is detected that at least one first menu on a first application interface receives a touch event entered by a user, starting a second application interface corresponding to any one of the at least one first menu. In the method of the embodiments, transparency processing can be performed on a partial region of the upper-layer second application interface. In addition, the first application interface and the second application interface simultaneously displayed on a terminal device are simultaneously in an active state, and the first application interface and the second application interface can implement operation interaction.

19 Claims, 33 Drawing Sheets

(56) References Cited

U.S. PATENT DOCUMENTS

| | | | | |
|---|---|---|---|---|
| 2013/0227470 A1* | 8/2013 | Thorsander | ......... | G06F 3/04886 |
| | | | | 715/790 |
| 2014/0019982 A1* | 1/2014 | John | ................ | G06F 9/544 |
| | | | | 718/102 |
| 2014/0229839 A1* | 8/2014 | Lynch | .................... | G06F 16/93 |
| | | | | 715/736 |
| 2017/0200473 A1* | 7/2017 | Moore | ............. | H04N 21/41407 |

FOREIGN PATENT DOCUMENTS

| CN | 101739202 B | 11/2011 |
|---|---|---|
| CN | 103051807 A | 4/2013 |
| CN | 103561159 A | 2/2014 |
| CN | 103809852 A | 5/2014 |
| CN | 103970422 A | 8/2014 |
| CN | 105183293 A | 12/2015 |
| CN | 105893077 A | 8/2016 |
| WO | 2012056090 A1 | 5/2012 |

\* cited by examiner

APPLICATION INTERFACE DISPLAY METHOD AND TERMINAL DEVICE

CROSS-REFERENCE TO RELATED APPLICATIONS

This application is a national stage of International Application No. PCT/CN2016/097647, filed on Aug. 31, 2016, which is hereby incorporated by reference in its entirety.

TECHNICAL FIELD

The present invention relates to the field of communications technologies, and in particular, to an application interface display method and a terminal device.

BACKGROUND

To improve efficiency of operating a terminal device by a user, the prior art provides a multi-screen operation method. As shown in FIG. 1, a display screen of a terminal device is split into a split screen region A and a split screen region B. The terminal device obtains two applications selected by a user, displays an application interface of one application in the split screen region A, and displays an application interface of the other application in the split screen region B.

Although a user can simultaneously view application interfaces of a plurality of different applications by using the split screen operation method provided in the prior art, the plurality of different applications simultaneously displayed on a display screen of a terminal device are independent from each other, and the user can activate an application interface of an application only in one split screen region at a same time. As shown in FIG. 1, if the user operates the application running in the split screen region A, the application in the split screen region B is in an inactive state and runs in the background of the terminal device. That is, the user cannot simultaneously operate different applications displayed on the display screen of the terminal device, reducing efficiency of operating an application by the user.

SUMMARY

Embodiments of the present invention provide an application interface display method and a terminal device by using which a plurality of application interfaces displayed on a display screen of a terminal device can be simultaneously processed.

According to a first aspect of the embodiments of the present invention, an application interface display method is provided, applied to a terminal device, and including the following steps.

Step A1: Start a first application interface having a first menu.

In this embodiment, the first application interface includes at least one first menu.

Specifically, in this embodiment, menus displayed on the first application interface may be classified based on levels, so that a first-level menu interface is displayed in the first application, and a plurality of first-level menus are displayed on the first-level menu interface.

A second-level menu interface is at a lower level of the first-level menu interface, and a plurality of second-level menus are displayed on the second-level menu interface.

Specifically, a submenu corresponding to at least one of the plurality of first-level menus is the second-level menu.

By analogy, the first application includes N levels of menus, and N is a positive integer greater than or equal to 2.

Step A2: If it is detected that the first menu on the first application interface receives a touch event entered by a user, start a second application interface corresponding to the first menu.

Optionally, in this embodiment, the first application interface and the second application interface may belong to different applications.

Optionally, in this embodiment, the first application interface and the second application interface may be different application interfaces of a same application.

In this step, if there are a plurality of first menus, the terminal device needs to separately start second application interfaces corresponding to the plurality of first menus.

The second application interface is used to implement a function of the first menu corresponding to the second application interface.

Step A3: Adjust the second application interface so that the second application interface is displayed in a preset mode.

Specifically, along a direction perpendicular to a display screen of the terminal device, an application interface of the second application is located at an outer layer of an application interface of a first application, and the application interface of the first application is located at an inner layer of the application interface of a second application.

The first application interface includes a third region used to display the at least one first menu and a fourth region on which no interface element is displayed. In the preset mode, a first region that is of the second application interface and that corresponds to a location of the third region along the direction perpendicular to the display screen of the terminal device is a transparent region, a second region that is of the second application interface and that corresponds to a location of the fourth region along the direction perpendicular to the display screen of the terminal device is a non-transparent region, and an interface element of the second application interface is displayed in the second region.

In the method of this embodiment, transparency processing can be performed on a partial region of the upper-layer second application interface, so that an interface element on the lower-layer first application interface can be normally displayed through the region on which transparency processing has been performed. In addition, the first application interface and the second application interface simultaneously displayed on the terminal device are simultaneously in an active state, and the first application interface and the second application interface can implement operation interaction. For example, the user touches different menus on the first application interface, so that the second application interface implements different functions corresponding to the different menus. The user can simultaneously operate application interfaces displayed on the display screen of the terminal device, thereby effectively improving efficiency of operating the terminal device by the user.

With reference to the first aspect of the embodiments of the present invention, in a first implementation of the first aspect of the embodiments of the present invention, before step A2, the method further includes the following steps.

Step A211: Divide the first application interface to form a third region and a fourth region.

In this embodiment, the third region and the fourth region are provided on the first application interface in parallel.

Step A212: Adjust an interface element displayed on the first application interface, so that the interface element of the first application interface is displayed in the third region.

To ensure that the interface element on the first application interface is normally displayed, in this embodiment, all interface elements displayed on the application interface of the first application are rearranged, so that all the rearranged interface elements displayed on the application interface of the first application are displayed in the third region, and no interface element is displayed in the fourth region, that is, the fourth region is a blank region.

With reference to the first aspect of the embodiments of the present invention or the first implementation of the first aspect of the embodiments of the present invention, in a second implementation of the first aspect of the embodiments of the present invention, step A3 specifically includes the following steps.

Step A311: Obtain an area of the third region of the first application interface.

In this embodiment, after the terminal device divides the first application interface to obtain the third region and the fourth region, the terminal device may store the area of the third region and an area of the fourth region of the first application interface.

In a process of dividing the second application interface, the terminal device may obtain the area of the third region that has been stored by the terminal device.

Step A312: Divide the second application interface to form the first region and the second region.

Specifically, the terminal device divides the second application interface based on the area of the third region of the first application interface, to form the first region and the second region, so that an area of the first region is greater than or equal to the area of the third region.

In this embodiment, the area of the first region is greater than or equal to the area of the third region, so that an interface element that is in the third region and that belongs to the first application interface can correspond to the first region, and no interface element is displayed at a location that is on the first application interface and that corresponds to the second region.

Step A313: Adjust an interface element displayed on the second application interface, so that the interface element of the second application interface is displayed in the second region.

To effectively ensure that the interface element on the second application interface is displayed, the interface element on the second application interface is displayed in the second region, so that the interface element in the second region is visible to the user.

Step A314: Perform transparency processing on the first region of the second application interface based on preset transparency.

A specific process of performing transparency processing on the first region of the second application interface may be: the terminal device presets application interface transparency, where the application interface transparency may be set before delivery of the terminal device, or the application interface transparency may be entered by the user.

The terminal device may perform transparency processing on the first region of the second application interface based on the application interface transparency, so that transparency of the first region of the second application interface is equal to the preset application interface transparency.

In this embodiment, a value of the application interface transparency is not limited. For example, the application interface transparency may be 100%. In this case, after the terminal device processes the first region of the second application interface based on the application interface transparency, the first region may be fully transparent.

For another example, the application interface transparency may be 50%. In this case, after the terminal device processes the first region of the second application interface based on the application interface transparency, the first region may be translucent.

In the first implementation of the first aspect and the second implementation of the first aspect of the embodiments of the present invention, according to the method of this embodiment, scale down processing does not need to be performed on an application interface, and application interfaces of all applications displayed on the display screen of the terminal device are displayed in full screen. In this embodiment, interface elements on different application interfaces can be arranged along different directions, so that the arranged interface elements on the plurality of application interfaces can be independent from each other, and do not block each other in the direction perpendicular to the terminal device. In this embodiment, transparency processing can be performed on a partial region of the upper-layer second application interface, so that an interface element on the lower-layer first application interface can be normally displayed through the region on which transparency processing has been performed.

With reference to any one of the first aspect of the embodiments of the present invention to the second implementation of the first aspect of the embodiments of the present invention, in a third implementation of the first aspect of the embodiments of the present invention, after step A3, the method further includes the following steps.

Step A321: Obtain first coordinates.

In this embodiment, the terminal device can detect the touch event entered by the user on the display screen of the terminal device. If the terminal device detects that the touch event entered by the user is in the first region of the second application interface, because the first region is a transparent region, it indicates that the touch event entered by the user targets a menu that is displayed through the first region and that is on the second application interface. The terminal device may obtain the first coordinates that are of a location at which the user enters the touch event and that are on the display screen of the terminal device.

Step A322: Send the first coordinates to an application to which the first application interface belongs.

In this embodiment, the terminal device determines that the touch event entered by the user targets a menu on the first application interface, and then the user may obtain the first coordinates corresponding to the touch event. The terminal device may send the first coordinates to the first application interface on which the menu is displayed, so that the application to which the first application interface belongs determines the menu corresponding to the first coordinates.

In the method of this embodiment, it can be accurately determined whether the touch event entered by the user targets the first application interface or the second application interface. If the touch event targets the first application interface, the second application interface does not respond to the touch event entered by the user, and instead, the first coordinates are sent to the first application interface, so that the application to which the first application interface belongs can determine, based on the first coordinates, the menu touched by the user, and the terminal device can accurately respond to the touch event entered by the user.

With reference to the third implementation of the first aspect of the embodiments of the present invention, in a fourth implementation of the first aspect of the embodiments of the present invention, after step A322, the method further includes the following step.

Step A3221: If it is determined that a menu corresponding to the first coordinates is a second menu, start a third application interface corresponding to the second menu.

If the terminal device determines that the menu corresponding to the first coordinates is a lower-level menu of the first menu, the terminal device may determine whether the function that can be executed by the second application interface corresponds to the second menu corresponding to the first coordinates. If the terminal device determines that the function that can be executed by the second application interface does not correspond to the second menu, the terminal device may switch to the third application interface. The third application interface is used to execute the second menu again.

Specifically, the third application interface is used to replace the second application interface and is displayed in the preset mode.

The second menu is used to start the third application interface corresponding to the second menu, and the second application interface and the third application interface are used to implement different functions.

In the method of this embodiment, the user can enter different touch events on the first application interface to trigger different second menus, so that the display screen of the terminal device can start, based on the touch event entered by the user, execution of the third application interface of the second menu by the user, and the third application interface can replace the second application interface that already cannot execute a function of the second menu. Therefore, in the method of this embodiment, different application interfaces can implement operation interaction. That is, in the method of this embodiment, application interfaces displayed on the display screen of the terminal device are all in the active state. This improves user operation efficiency, and avoids power consumption caused because a plurality of applications simultaneously displayed on a display screen of a terminal device repeatedly switch between the foreground and the background of the terminal device in the prior art.

With reference to the third implementation of the first aspect of the embodiments of the present invention, in a fifth implementation of the first aspect of the embodiments of the present invention, after step A322, the method further includes the following step.

Step A3221: If it is determined that a menu corresponding to the first coordinates is a third menu, control the application to which the first application interface belongs to implement a function of the third menu.

In this embodiment, the third menu is used to instruct the first application interface to implement a menu of a corresponding function.

In this embodiment, when the terminal device detects that the menu corresponding to the touch event entered by the user is the third menu, the terminal device may control the application to which the first application interface belongs to implement the function of the third menu.

In the method of this embodiment, the user operates the first application interface by entering the touch event, so that the first application interface can execute the function corresponding to the third menu. As can be seen, in the method of this embodiment, while the outer-side second application interface is kept in the active state, the first application interface also in the active state can be operated. This improves user operation efficiency, and avoids power consumption caused because a plurality of applications simultaneously displayed on a display screen of a terminal device repeatedly switch between the foreground and the background of the terminal device in the prior art.

With reference to any one of the first aspect of the embodiments of the present invention to the fifth implementation of the first aspect of the embodiments of the present invention, in a sixth implementation of the first aspect of the embodiments of the present invention, the method further includes the following step.

Step B: Attach a task of an application to which the second application interface belongs to a task stack of the application to which the first application interface belongs, so that the task of the application to which the second application interface belongs and a task of the application to which the first application interface belongs are in the same task stack.

In this embodiment, a window manager of the terminal device can invoke an activity stack of an application interface task manager. The activity stack of the application interface task manager can attach the task of the second application interface to the task stack of the first application interface, so that the task of the first application interface and the task of the second application interface are in the same task stack, and the first application interface and the second application interface are displayed as one application interface in display effects. In addition, it can be ensured that the first application interface and the second application interface on the display screen of the terminal device are simultaneously in the active state, so that the user can simultaneously operate a plurality of application interfaces displayed on the display screen of the terminal device. Therefore, this improves efficiency of operating, by the user, an application interface displayed on the terminal device.

With reference to any one of the first aspect of the embodiments of the present invention to the sixth implementation of the first aspect of the embodiments of the present invention, in a seventh implementation of the first aspect of the embodiments of the present invention, after step A3, the method further includes the following steps.

Step A331: Obtain second coordinates.

In this embodiment, the terminal device can detect the touch event entered by the user on the display screen of the terminal device. If the terminal device detects that the touch event entered by the user is in the second region of the second application interface, that is, the terminal device detects that the touch event entered by the user is in a region that is on the second application interface and on which an interface element is displayed, the terminal device obtains the second coordinates that are of the location at which the user enters the touch event and that are on the display screen of the terminal device.

Step A332: Send the second coordinates to the application to which the second application interface belongs.

In this embodiment, the terminal device can send the second coordinates to the application to which the second application interface belongs, so that the application to which the second application interface belongs determines a fourth menu corresponding to the second coordinates, and the application to which the second application interface belongs implements a function of the fourth menu.

In this embodiment, the function corresponding to the fourth menu corresponds to the function that can be executed by the second application interface.

As can be seen, in the method of this embodiment, when the first application interface is in the active state, the user can operate the second application interface by entering a corresponding touch event, so that the second application interface can implement a function corresponding to a menu touched by the user. Therefore, this improves efficiency of operating, by the user, an application interface displayed on the display screen of the terminal device.

With reference to any one of the first aspect of the embodiments of the present invention to the seventh implementation of the first aspect of the embodiments of the present invention, in an eighth implementation of the first aspect of the embodiments of the present invention, the first application interface and the second application interface belong to different applications in this embodiment.

Step A2 specifically includes the following steps.

Step A221: Detect whether the terminal device has stored an application for implementing a function of the first menu.

In this embodiment, there is at least one first menu.

The terminal device can detect a function that can be implemented by an application that has been stored by the terminal device. On this basis, it is detected whether the terminal device has stored the application for implementing the function of the first menu.

Step A222: Start the second application interface of the application that has been stored by the terminal device and that is used to implement the function of the first menu.

In this embodiment, if the terminal device detects that the terminal device has stored the application for implementing the function of the first menu, the terminal device starts the second application interface of the application that has been stored by the terminal device and that is used to implement the function of the first menu.

Step A223: Download the application for implementing the function of the first menu.

In this embodiment, if the terminal device detects that the terminal device has not stored the application for implementing the function of the first menu, the terminal device can download the application for implementing the function of the first menu from a server.

Step A224: Start the second application interface.

In this embodiment, after the terminal device completes executing an application downloading procedure, the terminal device may start the second application interface of the application that has been downloaded by the terminal device and that is used to implement the function of the first menu.

In the method of this embodiment, when the first application interface and the second application interface belong to different applications, if the terminal device has not stored the application that can implement the function of the first menu, the terminal device can automatically execute a procedure of downloading the application that can implement the function of the first menu from the server. If the terminal device has stored the application that can implement the function of the first menu, the terminal device can directly start the second application interface of the application. As can be seen, in this embodiment, the terminal device can execute an automatic application downloading procedure when determining that the terminal device has not stored the application that can implement the function of the first menu. Therefore, when the function corresponding to the first menu is implemented, this omits a procedure of downloading the application by the user, and improves efficiency of operating the first application interface and the second application interface by the user.

With reference to the eighth implementation of the first aspect of the embodiments of the present invention, in a ninth implementation of the first aspect of the embodiments of the present invention, step A223 specifically includes the following steps.

Step A2231: Obtain an order of applications that are stored on a server and that are used to implement the function of the first menu.

On the server, the applications for implementing the function of the first menu are sorted in descending order of quantities of downloading times, or the applications for implementing the function of the first menu are sorted in descending order of quantities of favorable comments, or the applications for implementing the function of the first menu are sorted in descending order of downloading success probabilities, or the applications for implementing the function of the first menu are sorted in descending order of downloading speeds.

Step A2232: Download first N applications of the applications that are stored on the server and that are used to implement the function of the first menu.

N is a positive integer greater than or equal to 1.

In the method of this embodiment, in a process in which the terminal device downloads an application that can implement the function corresponding to the first menu, the terminal device can download the application based on the order of the applications for implementing the function of the first menu. Therefore, this improves a probability of successfully implementing the function of the first menu by the application downloaded by the terminal device based on the order, and avoids that the application running on the terminal device cannot successfully implement the function of the first menu.

With reference to the eighth implementation of the first aspect of the embodiments of the present invention or the ninth implementation of the first aspect of the embodiments of the present invention, in a tenth implementation of the first aspect of the embodiments of the present invention, before step A2, the method includes the following steps.

A201: Generate an application start event.

In this embodiment, if the terminal device detects that the at least one first menu on the first application interface receives the touch event entered by the user, the terminal device generates the application start event.

The application start event is used to start the application to which the second application interface belongs.

Step A202: Add a column split flag to the application start event.

The column split flag is used to instruct the second application interface to be displayed in the preset mode.

In this embodiment of the present invention, the terminal device can further add the column split flag to the application start event already encapsulated in an intent object.

The column split flag is used to instruct to display an application interface meeting a preset condition on the display screen of the terminal device.

Specifically, in this embodiment, the column split flag may be: intent.addFlags(Intent. FLAG_HW_SPLIT_ACTIVITY).

Step A2 further includes: starting, based on the application start event, the application to which the second application interface belongs, so that the application to which the second application interface belongs displays the second application interface.

Step A3 further includes: adjusting the second application interface based on the column split flag so that the second application interface is displayed in the preset mode.

In the method of this embodiment, a plurality of application interfaces can be displayed on the display screen of the terminal device by using the column split flag. In addition, interface elements displayed on the application interfaces do not block each other, and a transparent region is provided on an upper-layer application interface. A lower-layer application that corresponds to the transparent region can successfully display an interface element through the transparent region. This avoids that because interface elements block each other or an upper-layer application interface blocks an interface element of a lower-layer application interface, the user cannot successfully operate a plurality of application interfaces displayed on the display screen of the terminal device.

With reference to any one of the first aspect of the embodiments of the present invention to the seventh implementation of the first aspect of the embodiments of the present invention, in an eleventh implementation of the first aspect of the embodiments of the present invention, the first application interface and the second application interface belong to a same application, the first application interface is a first-level application interface, and the second application interface is an Mth-level application interface, so that the second application interface is a lower-level application interface of the first application interface, where M is a positive integer greater than 1.

In the method of this embodiment, when the display screen of the terminal device displays at least two application interfaces, a first-level application interface of this embodiment can navigate a plurality of application interfaces displayed on the display screen of the terminal device, so that the user can clearly and conveniently know a structural relationship between the application interfaces. Therefore, application interfaces of applications are quickly positioned and searched for, and efficiency and accuracy of operating an application by the user are improved.

According to a second aspect of the embodiments of the present invention, an application interface display method is provided, applied to a terminal device, and including the following steps.

Step C1: Start a first application interface having a first menu.

For a specific execution process of step C1 in this embodiment, refer to step A1 in the first aspect of the embodiments, and details are not specifically described in this embodiment.

Step C2: Determine a second application interface corresponding to any one of at least one first menu.

The terminal device of this embodiment can detect a touch event entered by a user on a display screen of the terminal device. If the terminal device detects that the at least one first menu on the first application interface receives the touch event entered by the user, the terminal device determines, based on the at least one first menu, the second application interface corresponding to any one of the at least one first menu.

Step C3: Start the second application interface corresponding to any one of the at least one first menu.

The second application interface is used to implement a function of the first menu corresponding to the second application interface.

For a specific execution process of step C2 and step C3 in this embodiment, refer to step A2 and step A3 in the first aspect of the embodiments, and details are not specifically described in this embodiment.

In the method of this embodiment, the first application interface and the second application interface simultaneously displayed on the terminal device can be simultaneously in an active state, and the first application interface and the second application interface can implement operation interaction. For example, the user touches different menus on the first application interface, so that the second application interface implements different functions corresponding to the different menus. The user can simultaneously operate application interfaces displayed on the display screen of the terminal device, thereby effectively improving efficiency of operating the terminal device by the user.

With reference to the second aspect of the embodiments of the present invention, in a first implementation of the second aspect of the embodiments of the present invention, the method further includes the following steps.

Step D1: Obtain first coordinates.

For details of a specific execution process of step D1 in this embodiment, refer to step A321 in the first aspect of the embodiments of the present invention, and details are not specifically described in this embodiment of the present invention.

Step D2: Send the first coordinates to an application to which the first application interface belongs.

For details of a specific execution process of step D2 in this embodiment, refer to step A322 in the first aspect of the embodiments of the present invention, and details are not specifically described in this embodiment of the present invention.

In the method of this embodiment, it can be accurately determined whether the touch event entered by the user targets the first application interface or the second application interface. If the touch event targets the first application interface, the second application interface does not respond to the touch event entered by the user, and instead, the first coordinates are sent to the first application interface, so that the application to which the first application interface belongs can determine, based on the first coordinates, the menu touched by the user, and the terminal device can accurately respond to the touch event entered by the user.

With reference to the first implementation of the second aspect of the embodiments of the present invention, in a second implementation of the second aspect of the embodiments of the present invention, after step D2, the method further includes the following step.

Step D21: If it is determined that a menu corresponding to the first coordinates is a second menu, start a third application interface corresponding to the second menu.

For details of a specific execution process of step D21 in this embodiment, refer to step A3211 in the first aspect of the embodiments of the present invention, and details are not specifically described in this embodiment of the present invention.

In the method of this embodiment, the user can enter different touch events on the first application interface to trigger different second menus, so that the display screen of the terminal device can start, based on the touch event entered by the user, execution of the third application interface of the second menu by the user, and the third application interface can replace the second application interface that already cannot execute a function of the second menu. Therefore, in the method of this embodiment, different application interfaces can implement operation interaction. That is, in the method of this embodiment, application interfaces displayed on the display screen of the terminal device are all in an active state. This improves user operation efficiency, and avoids power consumption caused because a plurality of applications simultaneously displayed on a display screen of a terminal device repeatedly switch between the foreground and the background of the terminal device in the prior art.

With reference to the first implementation of the second aspect of the embodiments of the present invention, in a third implementation of the second aspect of the embodiments of the present invention, after step D2, the method further includes the following step.

Step D3: If it is determined that a menu corresponding to the first coordinates is a third menu, control the application to which the first application interface belongs to implement a function of the third menu.

For details of a specific execution process of step D3 in this embodiment, refer to step A3212 in the first aspect of the embodiments of the present invention, and details are not specifically described in this embodiment of the present invention.

In the method of this embodiment, the user operates the first application interface by entering the touch event, so that the first application interface can execute the function corresponding to the third menu. As can be seen, in the method of this embodiment, while the outer-side second application interface is kept in the active state, the first application interface also in the active state can be operated. This improves user operation efficiency, and avoids power consumption caused because a plurality of applications simultaneously displayed on a display screen of a terminal device repeatedly switch between the foreground and the background of the terminal device in the prior art.

With reference to any one of the second aspect of the embodiments of the present invention to the third implementation of the second aspect of the embodiments of the present invention, in a fourth implementation of the second aspect of the embodiments of the present invention, the method further includes the following step.

Step E: Attach a task of an application to which the second application interface belongs to a task stack of the application to which the first application interface belongs, so that the task of the application to which the second application interface belongs and a task of the application to which the first application interface belongs are in the same task stack.

In this embodiment, a window manager window manager of the terminal device can invoke an activity stack of an application interface task manager. The activity stack of the application interface task manager can attach the task of the second application interface to the task stack of the first application interface, so that the task of the first application interface and the task of the second application interface are in the same task stack, and the first application interface and the second application interface are displayed as one application interface in display effects. In addition, it can be ensured that the first application interface and the second application interface on the display screen of the terminal device are simultaneously in the active state, so that the user can simultaneously operate a plurality of application interfaces displayed on the display screen of the terminal device. Therefore, this improves efficiency of operating, by the user, an application interface displayed on the terminal device.

With reference to any one of the second aspect of the embodiments of the present invention to the fourth implementation of the second aspect of the embodiments of the present invention, in a fifth implementation of the second aspect of the embodiments of the present invention, after step C3, the method further includes the following steps.

Step C331: Obtain second coordinates.

For details of a specific execution process of step C331 in this embodiment, refer to step A331 in the first aspect of the embodiments of the present invention, and details are not specifically described in this embodiment of the present invention.

Step C332: Send the second coordinates to the application to which the second application interface belongs.

For details of a specific execution process of step C332 in this embodiment, refer to step A332 in the first aspect of the embodiments of the present invention, and details are not specifically described in this embodiment of the present invention.

With reference to any one of the second aspect of the embodiments of the present invention to the fourth implementation of the second aspect of the embodiments of the present invention, in a sixth implementation of the second aspect of the embodiments of the present invention, the first application interface and the second application interface belong to different applications.

Step C2 specifically includes the following steps.

Step C221: Detect whether the terminal device has stored an application for implementing a function of the first menu.

For details of a specific execution process of step C221 in this embodiment, refer to step A221 in the first aspect of the embodiments of the present invention, and details are not specifically described in this embodiment of the present invention.

Step C222: Start the second application interface of the application that has been stored by the terminal device and that is used to implement the function of the first menu.

For details of a specific execution process of step C222 in this embodiment, refer to step A222 in the first aspect of the embodiments of the present invention, and details are not specifically described in this embodiment of the present invention.

Step C223: Download the application for implementing the function of the first menu.

For details of a specific execution process of step C223 in this embodiment, refer to step A223 in the first aspect of the embodiments of the present invention, and details are not specifically described in this embodiment of the present invention.

Step C224: Start the second application interface.

For details of a specific execution process of step C224 in this embodiment, refer to step A224 in the first aspect of the embodiments of the present invention, and details are not specifically described in this embodiment of the present invention.

In the method of this embodiment, when the first application interface and the second application interface belong to different applications, if the terminal device has not stored the application that can implement the function of the first menu, the terminal device can automatically execute a procedure of downloading the application that can implement the function of the first menu from a server. If the terminal device has stored the application that can implement the function of the first menu, the terminal device can directly start the second application interface of the application. As can be seen, in this embodiment, the terminal device can execute an automatic application downloading procedure when determining that the terminal device has not stored the application that can implement the function of the first menu. Therefore, when the function corresponding to the first menu is implemented, this omits a procedure of downloading the application by the user, and improves efficiency of operating the first application interface and the second application interface by the user.

With reference to the sixth implementation of the second aspect of the embodiments of the present invention, in a seventh implementation of the second aspect of the embodiments of the present invention, step C223 specifically includes the following steps.

Step C2231: Obtain an order of applications that are stored on a server and that are used to implement the function of the first menu.

For details of a specific execution process of step C2231 in this embodiment, refer to step A2231 in the first aspect of the embodiments of the present invention, and details are not specifically described in this embodiment of the present invention.

Step C2232: Download first N applications of the applications that are stored on the server and that are used to implement the function of the first menu.

For details of a specific execution process of step C2232 in this embodiment, refer to step A2232 in the first aspect of the embodiments of the present invention, and details are not specifically described in this embodiment of the present invention.

In the method of this embodiment, in a process in which the terminal device downloads an application that can implement the function corresponding to the first menu, the terminal device can download the application based on the order of the applications for implementing the function of the first menu. Therefore, this improves a probability of successfully implementing the function of the first menu by the application downloaded by the terminal device based on the order, and avoids that the application running on the terminal device cannot successfully implement the function of the first menu.

With reference to any one of the second aspect of the embodiments of the present invention to the seventh implementation of the second aspect of the embodiments of the present invention, in an eighth implementation of the second aspect of the embodiments of the present invention, the first application interface and the second application interface belong to a same application, the first application interface is a first-level application interface, and the second application interface is an Mth-level application interface, so that the second application interface is a lower-level application interface of the first application interface, where M is a positive integer greater than 1.

In the method of this embodiment, when the display screen of the terminal device displays at least two application interfaces, a first-level application interface of this embodiment can navigate a plurality of application interfaces displayed on the display screen of the terminal device, so that the user can clearly and conveniently know a structural relationship between the application interfaces. Therefore, application interfaces of applications are quickly positioned and searched for, and efficiency and accuracy of operating an application by the user are improved.

According to a third aspect of the embodiments of the present invention, a terminal device is provided, including: a first detection unit and a first adjustment unit.

The first detection unit is configured to: if it is detected that at least one first menu on a first application interface receives a touch event entered by a user, start a second application interface corresponding to any one of the at least one first menu.

In this embodiment, the first detection unit is configured to perform step A1 and step A2 in the first aspect of the embodiments of the present invention. For details of a specific execution process of step A1 and step A2, refer to the first aspect of the embodiments of the present invention, and details are not specifically described in this embodiment.

The first adjustment unit is configured to adjust the second application interface so that the second application interface is displayed in a preset mode, where the second application interface is used to implement a function of the first menu corresponding to the second application interface.

The first application interface includes a third region used to display the at least one first menu and a fourth region on which no interface element is displayed, and in the preset mode, a first region that is of the second application interface and that corresponds to a location of the third region along a direction perpendicular to a display screen of the terminal device is a transparent region, a second region that is of the second application interface and that corresponds to a location of the fourth region along the direction perpendicular to the display screen of the terminal device is a non-transparent region, and an interface element of the second application interface is displayed in the second region.

In this embodiment, the first adjustment unit is configured to perform step A3 in the first aspect of the embodiments of the present invention. For details of a specific execution process of step A3, refer to the first aspect of the embodiments of the present invention, and details are not specifically described in this embodiment.

The terminal device of this embodiment can perform transparency processing on a partial region of the upper-layer second application interface, so that an interface element on the lower-layer first application interface can be normally displayed through the region on which transparency processing has been performed. In addition, the first application interface and the second application interface simultaneously displayed on the terminal device are simultaneously in an active state, and the first application interface and the second application interface can implement operation interaction. For example, the user touches different menus on the first application interface, so that the second application interface implements different functions corresponding to the different menus. The user can simultaneously operate application interfaces displayed on the display screen of the terminal device, thereby effectively improving efficiency of operating the terminal device by the user.

With reference to the third aspect of the embodiments of the present invention, in a first implementation of the third aspect of the embodiments of the present invention, the terminal device further includes: a first division unit and a second adjustment unit.

The first division unit is configured to divide the first application interface to form the third region and the fourth region.

In this embodiment, the first division unit is configured to perform step A211 in the first aspect of the embodiments of the present invention. For details of a specific execution process of step A211, refer to the first aspect of the embodiments of the present invention, and details are not specifically described in this embodiment.

The second adjustment unit is configured to adjust an interface element displayed on the first application interface, so that the interface element of the first application interface is displayed in the third region.

In this embodiment, the second adjustment unit is configured to perform step A212 in the first aspect of the embodiments of the present invention. For details of a specific execution process of step A212, refer to the first aspect of the embodiments of the present invention, and details are not specifically described in this embodiment.

With reference to the third aspect of the embodiments of the present invention or the first implementation of the third aspect of the embodiments of the present invention, in a second implementation of the third aspect of the embodiments of the present invention, the first adjustment unit includes: an obtaining module, a first division module, a first adjustment module, and a first processing module.

The obtaining module is configured to obtain an area of the third region of the first application interface.

In this embodiment, the obtaining module is configured to perform step A311 in the first aspect of the embodiments of the present invention. For details of a specific execution process of step A311, refer to the first aspect of the embodiments of the present invention, and details are not specifically described in this embodiment.

The first division module is configured to divide the second application interface based on the area of the third region of the first application interface, to form the first region and the second region, so that an area of the first region is greater than or equal to the area of the third region.

In this embodiment, the first division module is configured to perform step A312 in the first aspect of the embodiments of the present invention. For details of a specific execution process of step A312, refer to the first aspect of the embodiments of the present invention, and details are not specifically described in this embodiment.

The first adjustment module is configured to adjust the interface element displayed on the second application interface, so that the interface element of the second application interface is displayed in the second region.

In this embodiment, the first adjustment module is configured to perform step A313 in the first aspect of the embodiments of the present invention. For details of a specific execution process of step A313, refer to the first aspect of the embodiments of the present invention, and details are not specifically described in this embodiment.

The first processing module is configured to perform transparency processing on the first region of the second application interface based on preset transparency, so that the first region on which transparency processing has been performed is a transparent region.

In this embodiment, the first processing module is configured to perform step A314 in the first aspect of the embodiments of the present invention. For details of a specific execution process of step A314, refer to the first aspect of the embodiments of the present invention, and details are not specifically described in this embodiment.

In the first implementation of the third aspect and the second implementation of the third aspect of the embodiments of the present invention, the terminal device of this embodiment does not need to perform scale down processing on an application interface, and application interfaces of all applications displayed on the display screen of the terminal device are displayed in full screen. In this embodiment, interface elements on different application interfaces can be arranged along different directions, so that the arranged interface elements on the plurality of application interfaces can be independent from each other, and do not block each other in a direction perpendicular to the terminal device. In this embodiment, transparency processing can be performed on a partial region of the upper-layer second application interface, so that an interface element on the lower-layer first application interface can be normally displayed through the region on which transparency processing has been performed.

With reference to any one of the third aspect of the embodiments of the present invention to the second implementation of the third aspect of the embodiments of the present invention, in a third implementation of the third aspect of the embodiments of the present invention, the terminal device further includes: a second detection unit and a first sending unit.

The second detection unit is configured to: if it is detected that the touch event entered by the user is in the first region of the second application interface, obtain first coordinates that are of a location at which the user enters the touch event and that are on the display screen of the terminal device.

In this embodiment, the second detection unit is configured to perform step A321 in the first aspect of the embodiments of the present invention. For details of a specific execution process of step A321, refer to the first aspect of the embodiments of the present invention, and details are not specifically described in this embodiment.

The first sending unit is configured to send the first coordinates to an application to which the first application interface belongs, so that the application to which the first application interface belongs determines a menu corresponding to the first coordinates.

In this embodiment, the first sending unit is configured to perform step A322 in the first aspect of the embodiments of the present invention. For details of a specific execution process of step A322, refer to the first aspect of the embodiments of the present invention, and details are not specifically described in this embodiment.

The terminal device of this embodiment can accurately determine whether the touch event entered by the user targets the first application interface or the second application interface. If the touch event targets the first application interface, the second application interface does not respond to the touch event entered by the user, and instead, the first coordinates are sent to the first application interface, so that the application to which the first application interface belongs can determine, based on the first coordinates, the menu touched by the user, and the terminal device can accurately respond to the touch event entered by the user.

With reference to the third implementation of the third aspect of the embodiments of the present invention, in a fourth implementation of the third aspect of the embodiments of the present invention, the terminal device further includes: a first start unit, configured to: if it is determined that the menu corresponding to the first coordinates is a second menu, start a third application interface corresponding to the second menu, where the third application interface is used to replace the second application interface and is displayed in the preset mode, the second menu is used to start the third application interface corresponding to the second menu, and the second application interface and the third application interface are used to implement different functions.

In this embodiment, the first start unit is configured to perform step A3221 in the first aspect of the embodiments of the present invention. For details of a specific execution process of step A3221, refer to the first aspect of the embodiments of the present invention, and details are not specifically described in this embodiment.

According to the terminal device of this embodiment, the user can enter different touch events on the first application interface to trigger different second menus, so that the display screen of the terminal device can start, based on the touch event entered by the user, execution of the third application interface of the second menu by the user, and the third application interface can replace the second application interface that already cannot execute a function of the second menu. Therefore, in the method of this embodiment, different application interfaces can implement operation interaction. That is, in the method of this embodiment, application interfaces displayed on the display screen of the terminal device are all in an active state. This improves user operation efficiency, and avoids power consumption caused because a plurality of applications simultaneously displayed on a display screen of a terminal device repeatedly switch between the foreground and the background of the terminal device in the prior art.

With reference to the third implementation of the third aspect of the embodiments of the present invention, in a fifth implementation of the third aspect of the embodiments of the present invention, the terminal device further includes: a first determining unit, configured to: if it is determined that the menu corresponding to the first coordinates is a third menu, control the application to which the first application interface belongs to implement a function of the third menu.

In this embodiment, the first determining unit is configured to perform step A3221 in the first aspect of the embodiments of the present invention. For details of a specific execution process of step A3221, refer to the first aspect of the embodiments of the present invention, and details are not specifically described in this embodiment.

According to the terminal device of this embodiment, the user operates the first application interface by entering the touch event, so that the first application interface can execute the function corresponding to the third menu. As can be seen, in the method of this embodiment, while the outer-side second application interface is kept in the active state, the first application interface also in the active state can be operated. This improves user operation efficiency, and avoids power consumption caused because a plurality of applications simultaneously displayed on a display screen of a terminal device repeatedly switch between the foreground and the background of the terminal device in the prior art.

With reference to any one of the third aspect of the embodiments of the present invention to the fifth implementation of the third aspect of the embodiments of the present invention, in a sixth implementation of the third aspect of the embodiments of the present invention, the terminal device further includes: a first processing unit, configured to attach a task of an application to which the second application interface belongs to a task stack of the application to which the first application interface belongs, so that the task of the application to which the second application interface belongs and a task of the application to which the first application interface belongs are in the same task stack.

In this embodiment, the first processing unit is configured to perform step B in the first aspect of the embodiments of the present invention. For details of a specific execution process of step B, refer to the first aspect of the embodiments of the present invention, and details are not specifically described in this embodiment.

In this embodiment, a window manager window manager of the terminal device can invoke an activity stack of an application interface task manager. The activity stack of the application interface task manager can attach the task of the second application interface to the task stack of the first application interface, so that the task of the first application interface and the task of the second application interface are in the same task stack, and the first application interface and the second application interface are displayed as one application interface in display effects. In addition, it can be ensured that the first application interface and the second application interface on the display screen of the terminal device are simultaneously in the active state, so that the user can simultaneously operate a plurality of application interfaces displayed on the display screen of the terminal device. Therefore, this improves efficiency of operating, by the user, an application interface displayed on the terminal device.

With reference to any one of the third aspect of the embodiments of the present invention to the sixth implementation of the third aspect of the embodiments of the present invention, in a seventh implementation of the third aspect of the embodiments of the present invention, the terminal device further includes: a third detection unit and a second sending unit.

The third detection unit is configured to: if it is detected that the touch event entered by the user is in the second region of the second application interface, obtain second coordinates that are of a location at which the user enters the touch event and that are on the display screen of the terminal device.

In this embodiment, the third detection unit is configured to perform step A331 in the first aspect of the embodiments of the present invention. For details of a specific execution process of step A331, refer to the first aspect of the embodiments of the present invention, and details are not specifically described in this embodiment.

The second sending unit is configured to send the second coordinates to the application to which the second application interface belongs, so that the application to which the second application interface belongs determines a fourth menu corresponding to the second coordinates, and the application to which the second application interface belongs implements a function of the fourth menu.

In this embodiment, the second sending unit is configured to perform step A332 in the first aspect of the embodiments of the present invention. For details of a specific execution process of step A332, refer to the first aspect of the embodiments of the present invention, and details are not specifically described in this embodiment.

As can be seen, according to the terminal device of this embodiment, when the first application interface is in the active state, the user can operate the second application interface by entering a corresponding touch event, so that the second application interface can implement a function corresponding to a menu touched by the user. Therefore, this improves efficiency of operating, by the user, an application interface displayed on the display screen of the terminal device.

With reference to any one of the third aspect of the embodiments of the present invention to the seventh implementation of the third aspect of the embodiments of the present invention, in an eighth implementation of the third aspect of the embodiments of the present invention, the first application interface and the second application interface belong to different applications, and the first detection unit further includes: a first detection module, a first start module, a second processing module, and a second start module.

The first detection module is configured to detect whether the terminal device has stored an application for implementing a function of any one of the at least one first menu.

In this embodiment, the first detection module is configured to perform step A221 in the first aspect of the embodiments of the present invention. For details of a specific execution process of step A221, refer to the first aspect of the embodiments of the present invention, and details are not specifically described in this embodiment.

The first start module is configured to: if it is detected that the terminal device has stored the application for implementing the function of the first menu, start the second application interface of the application that has been stored by the terminal device and that is used to implement the function of the first menu.

In this embodiment, the first start module is configured to perform step A222 in the first aspect of the embodiments of the present invention. For details of a specific execution process of step A222, refer to the first aspect of the embodiments of the present invention, and details are not specifically described in this embodiment.

The second processing module is configured to: if it is detected that the terminal device has not stored the application for implementing the function of the first menu, download the application for implementing the function of the first menu.

In this embodiment, the second processing module is configured to perform step A223 in the first aspect of the embodiments of the present invention. For details of a specific execution process of step A223, refer to the first aspect of the embodiments of the present invention, and details are not specifically described in this embodiment.

The second start module is configured to start the second application interface of the application that has been downloaded by the terminal device and that is used to implement the function of the first menu.

In this embodiment, the second start module is configured to perform step A224 in the first aspect of the embodiments of the present invention. For details of a specific execution process of step A224, refer to the first aspect of the embodiments of the present invention, and details are not specifically described in this embodiment.

According to the terminal device of this embodiment, when the first application interface and the second application interface belong to different applications, if the terminal device has not stored the application that can implement the function of the first menu, the terminal device can automatically execute a procedure of downloading the application that can implement the function of the first menu from the server. If the terminal device has stored the application that can implement the function of the first menu, the terminal device can directly start the second application interface of the application. As can be seen, in this embodiment, the terminal device can execute an automatic application downloading procedure when determining that the terminal device has not stored the application that can implement the function of the first menu. Therefore, when the function corresponding to the first menu is implemented, this omits a procedure of downloading the application by the user, and improves efficiency of operating the first application interface and the second application interface by the user.

With reference to the eighth implementation of the third aspect of the embodiments of the present invention, in a ninth implementation of the third aspect of the embodiments of the present invention, the second processing module includes: a first obtaining submodule and a first downloading submodule.

The first obtaining submodule is configured to obtain an order of applications that are stored on the server and that are used to implement the function of the first menu, where on the server, the applications for implementing the function of the first menu are sorted in descending order of quantities of downloading times, or the applications for implementing the function of the first menu are sorted in descending order of quantities of favorable comments, or the applications for implementing the function of the first menu are sorted in descending order of downloading success probabilities, or the applications for implementing the function of the first menu are sorted in descending order of downloading speeds.

In this embodiment, the first obtaining submodule is configured to perform step A2231 in the first aspect of the embodiments of the present invention. For details of a specific execution process of step A2231, refer to the first aspect of the embodiments of the present invention, and details are not specifically described in this embodiment.

The first downloading submodule is configured to download first N applications of the applications that are stored on the server and that are used to implement the function of the first menu, where N is a positive integer greater than or equal to 1.

In this embodiment, the first downloading submodule is configured to perform step A2232 in the first aspect of the embodiments of the present invention. For details of a specific execution process of step A2232, refer to the first aspect of the embodiments of the present invention, and details are not specifically described in this embodiment.

According to the terminal device of this embodiment, in a process in which the terminal device downloads an application that can implement the function corresponding to the first menu, the terminal device can download the application based on the order of the applications for implementing the function of the first menu. Therefore, this improves a probability of successfully implementing the function of the first menu by the application downloaded by the terminal device based on the order, and avoids that the application running on the terminal device cannot successfully implement the function of the first menu.

With reference to the eighth implementation of the third aspect of the embodiments of the present invention or the ninth implementation of the third aspect of the embodiments of the present invention, in a tenth implementation of the third aspect of the embodiments of the present invention, the terminal device further includes: a generation unit and a second processing unit.

The generation unit is configured to: if it is detected that the at least one first menu on the first application interface receives the touch event entered by the user, generate an application start event, where the application start event is used to start the application to which the second application interface belongs.

In this embodiment, the generation unit is configured to perform step A201 in the first aspect of the embodiments of the present invention. For details of a specific execution process of step A201, refer to the first aspect of the embodiments of the present invention, and details are not specifically described in this embodiment.

The second processing unit is configured to add a column split flag to the application start event, where the column split flag is used to instruct the second application interface to be displayed in the preset mode.

In this embodiment, the second processing unit is configured to perform step A202 in the first aspect of the embodiments of the present invention. For details of a specific execution process of step A202, refer to the first aspect of the embodiments of the present invention, and details are not specifically described in this embodiment.

The first detection unit is further configured to start, based on the application start event, the application to which the second application interface belongs, so that the application to which the second application interface belongs displays the second application interface.

The first adjustment unit is further configured to adjust the second application interface based on the column split flag so that the second application interface is displayed in the preset mode.

According to the terminal device of this embodiment, a plurality of application interfaces can be displayed on the display screen of the terminal device by using the column split flag. In addition, interface elements displayed on the application interfaces do not block each other, and a transparent region is provided on an upper-layer application interface. A lower-layer application that corresponds to the transparent region can successfully display an interface element through the transparent region. This avoids that because interface elements block each other or an upper-layer application interface blocks an interface element of a lower-layer application interface, the user cannot successfully operate a plurality of application interfaces displayed on the display screen of the terminal device.

With reference to any one of the third aspect of the embodiments of the present invention to the seventh implementation of the third aspect of the embodiments of the present invention, in an eleventh implementation of the third aspect of the embodiments of the present invention, the first application interface and the second application interface belong to a same application, the first application interface is a first-level application interface, and the second application interface is an Mth-level application interface, so that the second application interface is a lower-level application interface of the first application interface, where M is a positive integer greater than 1.

According to the terminal device of this embodiment, when the display screen of the terminal device displays at least two application interfaces, a first-level application interface of this embodiment can navigate a plurality of application interfaces displayed on the display screen of the terminal device, so that the user can clearly and conveniently know a structural relationship between the application interfaces. Therefore, application interfaces of applications are quickly positioned and searched for, and efficiency and accuracy of operating an application by the user are improved.

According to a fourth aspect of the embodiments of the present invention, a terminal device is provided, including: a fourth detection unit and a second start unit.

The fourth detection unit is configured to: if it is detected that at least one first menu on a first application interface receives a touch event entered by a user, determine, based on the at least one first menu, a second application interface corresponding to any one of the at least one first menu.

In this embodiment, the fourth detection unit is configured to perform step C1 and step C2 in the second aspect of the embodiments of the present invention. For details of a specific execution process of step C1 and step C2, refer to the second aspect of the embodiments of the present invention, and details are not specifically described in this embodiment.

The second start unit is configured to start the second application interface corresponding to any one of the at least one first menu, where the second application interface is used to implement a function of the first menu corresponding to the second application interface.

In this embodiment, the second start unit is configured to perform step C3 in the second aspect of the embodiments of the present invention. For details of a specific execution process of step C3, refer to the second aspect of the embodiments of the present invention, and details are not specifically described in this embodiment.

According to the terminal device of this embodiment, the first application interface and the second application interface simultaneously displayed on the terminal device can be simultaneously in an active state, and the first application interface and the second application interface can implement operation interaction. For example, the user touches different menus on the first application interface, so that the second application interface implements different functions corresponding to the different menus. The user can simultaneously operate application interfaces displayed on a display screen of the terminal device, thereby effectively improving efficiency of operating the terminal device by the user.

With reference to the fourth aspect of the embodiments of the present invention, in a first implementation of the fourth aspect of the embodiments of the present invention, the terminal device further includes: a fifth detection unit and a third sending unit.

The fifth detection unit is configured to: if it is detected that the touch event entered by the user corresponds to an interface element on the first application interface, obtain first coordinates that are of a location at which the user enters the touch event and that are on the display screen of the terminal device.

In this embodiment, the fifth detection unit is configured to perform step D1 in the second aspect of the embodiments of the present invention. For details of a specific execution process of step D1, refer to the second aspect of the embodiments of the present invention, and details are not specifically described in this embodiment.

The third sending unit is configured to send the first coordinates to an application to which the first application interface belongs, so that the application to which the first application interface belongs determines a menu corresponding to the first coordinates.

In this embodiment, the third sending unit is configured to perform step D2 in the second aspect of the embodiments of the present invention. For details of a specific execution process of step D2, refer to the second aspect of the embodiments of the present invention, and details are not specifically described in this embodiment.

The terminal device of this embodiment can accurately determine whether the touch event entered by the user targets the first application interface or the second application interface. If the touch event targets the first application interface, the second application interface does not respond to the touch event entered by the user, and instead, the first coordinates are sent to the first application interface, so that the application to which the first application interface belongs can determine, based on the first coordinates, the menu touched by the user, and the terminal device can accurately respond to the touch event entered by the user.

With reference to the first implementation of the fourth aspect of the embodiments of the present invention, in a second implementation of the fourth aspect of the embodiments of the present invention, the terminal device further includes: a third start unit, configured to: if it is determined that the menu corresponding to the first coordinates is a second menu, start a third application interface corresponding to the second menu, where the third application interface is used to replace the second application interface, the second menu is used to start the third application interface corresponding to the second menu, and the second application interface and the third application interface are used to implement different functions.

In this embodiment, the third start unit is configured to perform step D21 in the second aspect of the embodiments of the present invention. For details of a specific execution process of step D21, refer to the second aspect of the embodiments of the present invention, and details are not specifically described in this embodiment.

According to the terminal device of this embodiment, the user can enter different touch events on the first application interface to trigger different second menus, so that the display screen of the terminal device can start, based on the touch event entered by the user, execution of the third application interface of the second menu by the user, and the third application interface can replace the second application interface that already cannot execute a function of the second menu. Therefore, in the method of this embodiment, different application interfaces can implement operation interaction. That is, in the method of this embodiment, application interfaces displayed on the display screen of the terminal device are all in an active state. This improves user operation efficiency, and avoids power consumption caused because a plurality of applications simultaneously displayed on a display screen of a terminal device repeatedly switch between the foreground and the background of the terminal device in the prior art.

With reference to the first implementation of the fourth aspect of the embodiments of the present invention, in a third implementation of the fourth aspect of the embodiments of the present invention, the terminal device further includes: a second determining unit, configured to: if it is determined that the menu corresponding to the first coordinates is a third menu, control the application to which the first application interface belongs to implement a function of the third menu.

In this embodiment, the second determining unit is configured to perform step D3 in the second aspect of the embodiments of the present invention. For details of a specific execution process of step D3, refer to the second aspect of the embodiments of the present invention, and details are not specifically described in this embodiment.

According to the terminal device of this embodiment, the user operates the first application interface by entering the touch event, so that the first application interface can execute the function corresponding to the third menu. As can be seen, in the method of this embodiment, while the outer-side second application interface is kept in the active state, the first application interface also in the active state can be operated. This improves user operation efficiency, and avoids power consumption caused because a plurality of applications simultaneously displayed on a display screen of a terminal device repeatedly switch between the foreground and the background of the terminal device in the prior art.

With reference to any one of the fourth aspect of the embodiments of the present invention to the third implementation of the fourth aspect of the embodiments of the present invention, in a fourth implementation of the fourth aspect of the embodiments of the present invention, the terminal device further includes: a third processing unit, configured to attach a task of an application to which the second application interface belongs to a task stack of the application to which the first application interface belongs, so that the task of the application to which the second application interface belongs and a task of the application to which the first application interface belongs are in the same task stack.

In this embodiment, the third processing unit is configured to perform step E in the second aspect of the embodiments of the present invention. For details of a specific execution process of step E, refer to the second aspect of the embodiments of the present invention, and details are not specifically described in this embodiment.

In this embodiment, a window manager window manager of the terminal device can invoke an activity stack of an application interface task manager. The activity stack of the application interface task manager can attach the task of the second application interface to the task stack of the first application interface, so that the task of the first application interface and the task of the second application interface are in the same task stack, and the first application interface and the second application interface are displayed as one application interface in display effects. In addition, it can be ensured that the first application interface and the second application interface on the display screen of the terminal device are simultaneously in the active state, so that the user can simultaneously operate a plurality of application interfaces displayed on the display screen of the terminal device. Therefore, this improves efficiency of operating, by the user, an application interface displayed on the terminal device.

With reference to any one of the fourth aspect of the embodiments of the present invention to the fourth implementation of the fourth aspect of the embodiments of the present invention, in a fifth implementation of the fourth aspect of the embodiments of the present invention, the terminal device further includes: a sixth detection unit and a fourth sending unit.

The sixth detection unit is configured to: if it is detected that the touch event entered by the user corresponds to an interface element on the second application interface, obtain second coordinates that are of the location at which the user enters the touch event and that are on the display screen of the terminal device.

In this embodiment, the sixth detection unit is configured to perform step C331 in the second aspect of the embodiments of the present invention. For details of a specific execution process of step C331, refer to the second aspect of the embodiments of the present invention, and details are not specifically described in this embodiment.

The fourth sending unit is configured to send the second coordinates to the application to which the second application interface belongs, so that the application to which the second application interface belongs determines a fourth menu corresponding to the second coordinates, and the application to which the second application interface belongs implements a function of the fourth menu.

In this embodiment, the fourth sending unit is configured to perform step C332 in the second aspect of the embodiments of the present invention. For details of a specific execution process of step C332, refer to the second aspect of the embodiments of the present invention, and details are not specifically described in this embodiment.

With reference to any one of the fourth aspect of the embodiments of the present invention to the fourth implementation of the fourth aspect of the embodiments of the present invention, in a sixth implementation of the fourth aspect of the embodiments of the present invention, the first application interface and the second application interface belong to different applications, and the second start unit includes: a second detection module, a third start module, a third processing module, and a fourth start module.

The second detection module is configured to detect whether the terminal device has stored an application for implementing a function of any one of the at least one first menu.

In this embodiment, the second detection module is configured to perform step C221 in the second aspect of the embodiments of the present invention. For details of a specific execution process of step C221, refer to the second aspect of the embodiments of the present invention, and details are not specifically described in this embodiment.

The third start module is configured to: if it is detected that the terminal device has stored the application for implementing the function of the first menu, start the second application interface of the application that has been stored by the terminal device and that is used to implement the function of the first menu.

In this embodiment, the third start module is configured to perform step C222 in the second aspect of the embodiments of the present invention. For details of a specific execution process of step C222, refer to the second aspect of the embodiments of the present invention, and details are not specifically described in this embodiment.

The third processing module is configured to: if it is detected that the terminal device has not stored the application for implementing the function of the first menu, download the application for implementing the function of the first menu.

In this embodiment, the third processing module is configured to perform step C223 in the second aspect of the embodiments of the present invention. For details of a specific execution process of step C223, refer to the second aspect of the embodiments of the present invention, and details are not specifically described in this embodiment.

The fourth start module is configured to start the second application interface of the application that has been downloaded by the terminal device and that is used to implement the function of the first menu.

In this embodiment, the fourth start module is configured to perform step C224 in the second aspect of the embodiments of the present invention. For details of a specific execution process of step C224, refer to the second aspect of the embodiments of the present invention, and details are not specifically described in this embodiment.

According to the terminal device of this embodiment, when the first application interface and the second application interface belong to different applications, if the terminal device has not stored the application that can implement the function of the first menu, the terminal device can automatically execute a procedure of downloading the application that can implement the function of the first menu from the server. If the terminal device has stored the application that can implement the function of the first menu, the terminal device can directly start the second application interface of the application. As can be seen, in this embodiment, the terminal device can execute an automatic application downloading procedure when determining that the terminal device has not stored the application that can implement the function of the first menu. Therefore, when the function corresponding to the first menu is implemented, this omits a procedure of downloading the application by the user, and improves efficiency of operating the first application interface and the second application interface by the user.

With reference to the sixth implementation of the fourth aspect of the embodiments of the present invention, in a seventh implementation of the fourth aspect of the embodiments of the present invention, the third processing module includes: a first obtaining submodule and a second downloading submodule.

The first obtaining submodule is configured to obtain an order of applications that are stored on the server and that are used to implement the function of the first menu, where on the server, the applications for implementing the function of the first menu are sorted in descending order of quantities of downloading times, or the applications for implementing the function of the first menu are sorted in descending order of quantities of favorable comments, or the applications for implementing the function of the first menu are sorted in descending order of downloading success probabilities, or the applications for implementing the function of the first menu are sorted in descending order of downloading speeds.

In this embodiment, the first obtaining submodule is configured to perform step C2231 in the second aspect of the embodiments of the present invention. For details of a specific execution process of step C2231, refer to the second aspect of the embodiments of the present invention, and details are not specifically described in this embodiment.

The second downloading submodule is configured to download first N applications of the applications that are stored on the server and that are used to implement the function of the first menu, where N is a positive integer greater than or equal to 1.

In this embodiment, the second downloading submodule is configured to perform step C2232 in the second aspect of the embodiments of the present invention. For details of a specific execution process of step C2232, refer to the second aspect of the embodiments of the present invention, and details are not specifically described in this embodiment.

According to the terminal device of this embodiment, in a process in which the terminal device downloads an application that can implement the function corresponding to the first menu, the terminal device can download the application based on the order of the applications for implementing the function of the first menu. Therefore, this improves a probability of successfully implementing the function of the first menu by the application downloaded by the terminal device based on the order, and avoids that the application running on the terminal device cannot successfully implement the function of the first menu.

With reference to any one of the fourth aspect of the embodiments of the present invention to the seventh implementation of the fourth aspect of the embodiments of the present invention, in an eighth implementation of the fourth aspect of the embodiments of the present invention, the first application interface and the second application interface belong to a same application, the first application interface is a first-level application interface, and the second application interface is an Mth-level application interface, so that the second application interface is a lower-level application interface of the first application interface, where M is a positive integer greater than 1.

According to a fifth aspect of the embodiments of the present invention, a mobile terminal is provided, including: one or more processor units, a storage unit, a bus system, and one or more programs, where the processor unit and the storage unit are connected by using the bus system.

The one or more programs are stored in the storage unit, the one or more programs include an instruction, and when executed by the mobile terminal, the instruction enables the mobile terminal to execute the method according to any one of the first aspect of the embodiments of the present invention to the eleventh implementation of the first aspect of the embodiments of the present invention.

According to a sixth aspect of the embodiments of the present invention, a mobile terminal is provided, including: one or more processor units, a storage unit, a bus system, and one or more programs, where the processor unit and the storage unit are connected by using the bus system.

The one or more programs are stored in the storage unit, the one or more programs include an instruction, and when executed by the mobile terminal, the instruction enables the mobile terminal to execute the method according to any one of the second aspect of the embodiments of the present invention to the eighth implementation of the second aspect of the embodiments of the present invention.

The embodiments of the present invention provide the application interface display method and the terminal device. In the method of the embodiments, transparency processing can be performed on a partial region of the upper-layer second application interface, so that an interface element on the lower-layer first application interface can be normally displayed through the region on which transparency processing has been performed. In addition, the first application interface and the second application interface displayed on the terminal device are simultaneously in an active state, and the first application interface and the second application interface can implement operation interaction. For example, the user touches different menus on the first application interface, so that the second application interface implements different functions corresponding to the different menus. The user can simultaneously operate application interfaces displayed on the display screen of the terminal device, thereby effectively improving efficiency of operating the terminal device by the user.

DETAILED DESCRIPTION OF ILLUSTRATIVE EMBODIMENTS

The embodiments of the present invention provide an application interface display method based on a terminal device. The following describes a specific structure of a terminal device that can implement a lock screen interface display method in the embodiments of the present invention with reference to FIG. 2.

Figure 2:
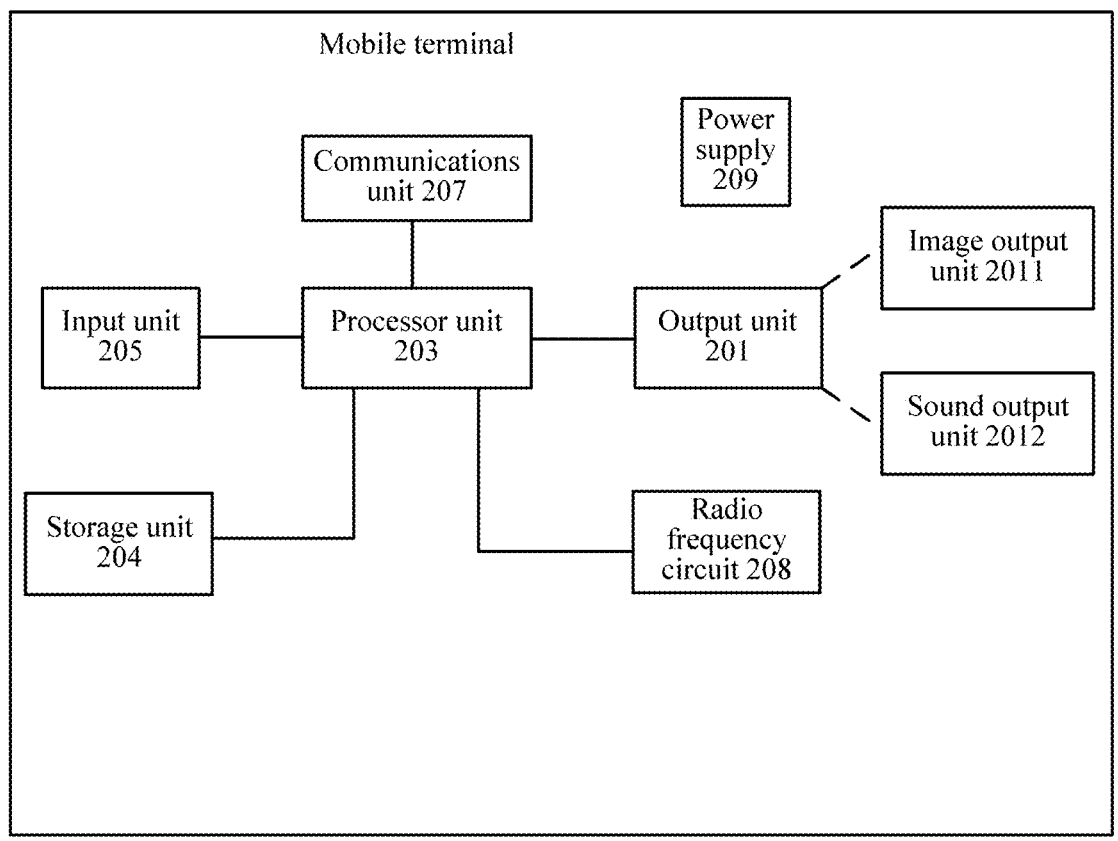
FIG. 2 is a schematic diagram of a hardware structure of a terminal device according to an embodiment of the present invention.

The following describes a specific structure of a terminal device in the embodiments with reference to FIG. 2. FIG. 2 is a schematic structural diagram of a terminal device according to an embodiment of the present invention.

The terminal device includes components such as an input unit 205, a processor unit 203, an output unit 201, a communications unit 207, a storage unit 204, and a radio frequency circuit 208.

These components communicate with each other by using one or more buses. A person skilled in the art may understand that the structure of the terminal device shown in FIG. 2 does not constitute a limitation to the present invention. The terminal device may be a bus structure or a star structure, and may include more or fewer components than those shown in the figure, or some components may be combined, or a different component layout may be used.

In an implementation of the present invention, the terminal device may be any mobile or portable electronic device, including but not limited to a smartphone, a mobile computer, a tablet computer, a personal digital assistant PDA), and a media player.

The terminal device includes: an output unit 201, configured to output a to-be-displayed image.

Specifically, the output unit 201 includes but is not limited to an image output unit 2011 and a sound output unit 2012.

The image output unit 2011 is configured to output a text, a picture, and/or a video. The image output unit 2011 may include a display panel, for example, a display panel configured in a form of a liquid crystal display (LCD), an organic light-emitting diode (OLED), a field emission display (FED), or the like. Alternatively, the image output unit 2011 may include a reflective display, for example, an electrophoretic (electrophoretic) display or a display using an interferometric modulation of light technology.

The image output unit 2011 may include a single display or a plurality of displays having different sizes. In a specific implementation of the present invention, a touchscreen may also be used as a display panel of the output unit 201.

For example, after detecting a touch on the touchscreen or a gesture operation performed near the touchscreen, the touchscreen transfers the touch or the gesture operation to the processor unit 203 to determine a type of a touch event. Subsequently, the processor unit 203 provides corresponding visual output on the display panel based on the type of the touch event. Although the input unit 205 and the output unit 201 implement input and output functions of the terminal device as two independent components in FIG. 2, in some embodiments, the touchscreen and the display panel may be integrated as a whole to implement the input and output functions of the terminal device. For example, the image output unit 2011 may display various graphical user interfaces (GUI) to serve as a virtual control component. The graphical user interfaces include but are not limited to a window, a scrollbar, an icon, and a clipboard, so that a user performs an operation by touch control.

In a specific implementation of the present invention, the image output unit 2011 includes a filter and an amplifier, configured to perform filtering and amplification on a video outputted by the processor unit 203. The sound output unit 2012 includes a digital-to-analog converter, configured to convert an audio signal outputted by the processor unit 203 from a digital format to an analog format.

The processor unit 203 is configured to run corresponding code, and process received information, to generate and output a corresponding interface.

Specifically, the processor unit 203 is a control center of the terminal device, and connects various parts of the entire terminal device by using various interfaces and circuits. The processor unit 203 runs or executes a software program and/or module stored in the storage unit, and invokes data stored in the storage unit, to perform various functions and/or data processing of the terminal device. The processor unit 203 may include an integrated circuit (IC), for example, may include a single encapsulated IC, or may include a plurality of connected encapsulated ICs having a same function or different functions.

For example, the processor unit 203 may include only a central processing unit (CPU), or may be a combination of a graphics processing unit (GPU), a digital signal processor (DSP), and a control chip (for example, a baseband chip) of a communications unit. In an implementation of the present invention, the CPU may be a single computing core, or may include a plurality of computing cores.

The storage unit 204 is configured to store code and data, and the code is executed by the processor unit 203.

Specifically, the storage unit 204 may be configured to store a software program and module. The processor unit 203 runs the software program and module stored in the storage unit 204, to implement various functional applications and data processing of the terminal device. The storage unit 204 mainly includes a program storage area and a data storage area. The program storage area may store an operating system, and an application required by at least one function, such as a sound play program and an image play program. The data storage area may store data (such as audio data and a phone book) created based on use of the terminal device, and the like.

In a specific implementation of the present invention, the storage unit 204 may include a volatile storage, for example, a nonvolatile dynamic random access memory (NVRAM), a phase change random access memory (PRAM), or a magnetoresistive random access memory (MRAM), or may include a nonvolatile storage, for example, at least one magnetic disk storage device, an electrically erasable programmable read-only memory (EEPROM), or a flash memory device such as a NOR flash memory or a NAND flash memory.

The nonvolatile storage stores an operating system and an application executed by the processor unit 203. The processor unit 203 loads a running program and data from the nonvolatile storage to a memory, and stores digital content in a mass storage apparatus. The operating system includes various components and/or drives that are configured to control and manage a regular system task, for example, memory management, storage device control, and power supply management, and that facilitate communication between various software and hardware.

In an implementation of the present invention, the operating system may be an Android operating system of Google, an iOS system developed by Apple, a Windows operating system developed by Microsoft, or the like, or may be an embedded operating system such as VxWorks.

The application includes any application installed on the terminal device, and includes but is not limited to a browser, an email, an instant messaging service, text processing, a virtual keyboard, a window widget (Widget), encryption, digital copyright management, speech recognition, speech reproduction, positioning (for example, a function provided by a global positioning system), and music play.

The input unit 205 is configured to implement interaction between a user and the terminal device and/or information input to the terminal device.

For example, the input unit 205 may receive digit or character information entered by a user, to generate signal input related to user setting or functional control. In a specific implementation of the present invention, the input unit 205 may be a touchscreen, may be another human-computer interaction interface, for example, a substantive input key and a microphone, or may be another external information obtaining apparatus, for example, a camera.

In this embodiment of the present invention, the touchscreen may collect a touch of a user on the touchscreen or an operation action performed by a user near the touchscreen, for example, an operation action performed by a user on or near the touchscreen by using any suitable object or accessory, such as a finger or a stylus, and drive a corresponding connection apparatus based on a preset program. Optionally, the touchscreen may include two parts: a touch detection apparatus and a touch controller. The touch detection apparatus detects a touch event of a user, converts the detected touch event to an electrical signal, and transfers the electrical signal to the touch controller. The touch controller receives the electrical signal from the touch detection apparatus, converts the electrical signal to contact coordinates, and sends the contact coordinates to the processor unit 203.

The touch controller may further receive a command sent by the processor unit 203 and execute the command. In addition, the touchscreen may be implemented by using a plurality of types such as a resistive, capacitive, infrared, or surface sound wave touchscreen.

In another implementation of the present invention, a substantive input key of the input unit 205 may include but is not limited to one or more of a physical keyboard, a functional key (such as a volume control key or an on/off key), a track ball, a mouse, or a joystick. The input unit 205 in a microphone form may collect a speech entered by a user or an environment, and convert the speech to a command that is in an electrical signal form and that can be executed by the processor unit 203.

In some other implementations of the present invention, the input unit 205 may be various sensing devices, for example, a Hall device, and is configured to: detect a physical quantity of the terminal device, for example, a force, a torque, a pressure, a stress, a location, a displacement, a speed, an acceleration, an angle, an angular velocity, a quantity of revolutions, a rotational speed, and a time at which a working state changes, and convert the physical quantity to a quantity of electricity for detection and control.

Some other sensing devices may further include a gravity sensor, a tri-axis accelerometer, a gyroscope, an electronic compass, an ambient light sensor, a proximity sensor, a temperature sensor, a humidity sensor, a pressure sensor, a heart rate sensor, a fingerprint sensor, and the like.

The communications unit 207 is configured to establish a communication channel, so that the terminal device connects to a remote server by using the communication channel, and downloads media data from the remote server. The communications unit 207 may include a communications module such as a wireless local area network (wireless LAN) module, a Bluetooth module, or a baseband module, and a radio frequency (RF) circuit corresponding to the communications module, and is configured to perform wireless local area network communication, Bluetooth communication, infrared communication, and/or communication of a cellular communications system, for example, Wideband Code Division Multiple Access (W-CDMA) and/or High Speed Downlink Packet Access (HSDPA). The communications module is configured to control communication of components of the terminal device, and can support direct memory access.

In different implementations of the present invention, the various communications modules of the communications unit 207 generally appear in a form of an integrated circuit chip, and may be selectively combined, and not all communications modules and corresponding antenna groups are necessarily included. For example, the communications unit 207 may include only a baseband chip, a radio frequency chip, and a corresponding antenna to provide a communication function in a cellular communications system. The terminal device can connect to a cellular network or the Internet by using a wireless communication connection established by the communications unit 207, for example, wireless local area network access or WCDMA access. In some optional implementations of the present invention, the communications module such as the baseband module of the communications unit 207 may be integrated to the processor unit 203. A typical example is an APQ+MDM platform provided by Qualcomm.

The radio frequency circuit 208 is configured to receive and send information or receive and send a signal in a call process. For example, the radio frequency circuit receives downlink information from a base station, delivers the downlink information to the processor unit 203 for processing, and sends related uplink data to the base station. Usually, the radio frequency circuit 208 includes well-known circuits configured to perform these functions, and includes but is not limited to an antenna system, a radio frequency transceiver, one or more amplifiers, a tuner, one or more oscillators, a digital signal processor, a codec chip set, a subscriber identity module (SIM) card, and a storage. In addition, the radio frequency circuit 208 may further communicate with a network and another device by wireless communication.

The wireless communication may use any communications standard or protocol, including but not limited to Global System for Mobile Communications (GSM), General Packet Radio Service (GPRS), Code Division Multiple Access (CDMA), Wideband Code Division Multiple Access (WCDMA), High Speed Uplink Packet Access (HSUPA), Long Term Evolution (LTE), an email, and Short Messaging Service (SMS).

The power supply 209 is configured to supply power to various components of the terminal device to maintain running of the components. In general understanding, the power supply 209 may be a built-in battery, for example, a common lithium-ion battery or an NiMH battery, or includes an externally connected power supply such as an AC adapter that directly supplies power to the terminal device. In some implementations of the present invention, the power supply 209 may be further defined in a broader sense, for example, may further include a power supply management system, a charging system, a power supply fault detection circuit, a power supply converter or inverter, a power supply state indicator (such as an emitting diode), and any other components related to power generation, management, distribution of the terminal device.

In an application interface display method provided in the embodiments of the present invention, a display screen of a terminal device can simultaneously display a plurality of applications to facilitate an operation of a user. To better understand the application interface display method provided in the embodiments of the present invention, how application interfaces of a plurality of different applications are simultaneously displayed on a display screen of a terminal device in the embodiments of the present invention is compared with how application interfaces of a plurality of applications are displayed on a display screen of a terminal device in the prior art in description.

Figure 1:
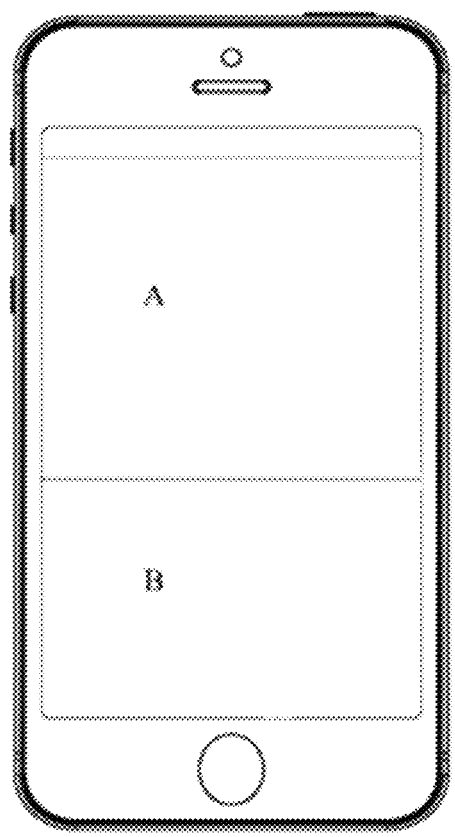
FIG. 1 is a schematic diagram of a split screen of a terminal device in the prior art.

Still referring to FIG. 1, an example in which application interfaces of two different applications can be simultaneously displayed on a display screen of a terminal device in the prior art is used.

The terminal device detects a screen split instruction entered by a user. The screen split instruction may be that the user taps a split screen functional key on a display screen of the terminal device, or that the user enters a preset pattern on a display screen of the terminal, or the like. In this case, the terminal device may split the display screen of the terminal device into a split screen region A and a split screen region B. When the user selects two of applications installed on the terminal device, the terminal device can establish a correspondence between a first application of the two applications and the split screen region A, and establish a correspondence between a second application of the two applications and the split screen region B. In this case, the terminal device can display an application interface of the first application in the split screen region A, and display an application interface of the second application in the split screen region B.

More specifically, an example in which the split screen region A occupies 50% of the display screen of the terminal device is used. In this case, the terminal device needs to decrease an area that is of the application interface and that exists when the first application is displayed in full screen by 50%, and display the application interface of the first application that is decreased by 50% in the split screen region A. If an example in which the split screen region A occupies 30% of the display screen of the terminal device is used, the terminal device needs to decrease an area that is of the application interface and that exists when the first application is displayed in full screen by 70%, and display the application interface of the first application that is decreased by 70% in the split screen region A.

Figure 3:
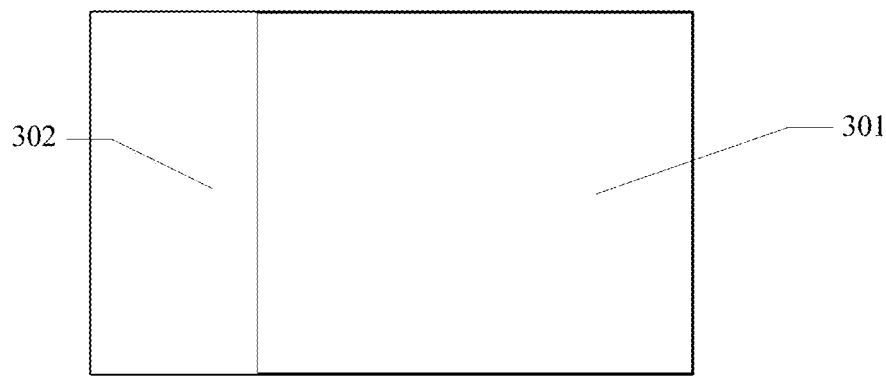
FIG. 3 is a schematic structural diagram of displaying an application interface on a display screen of a terminal device according to the present invention.
Figure 4:
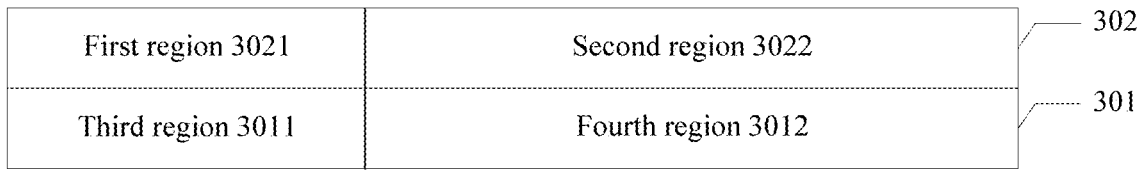
FIG. 4 is another schematic structural diagram of displaying an application interface on a display screen of a terminal device according to the present invention.

With reference to FIG. 3 and FIG. 4, the following describes how application interfaces of a plurality of different applications are displayed on the display screen of the terminal device in the embodiments of the present invention.

It should be noted that, in FIG. 3 and FIG. 4, an example in which two applications are displayed on a display screen of a terminal device is used for description. In an actual application, more than two applications may be displayed on a display screen of a terminal device, and a quantity of applications displayed on a display screen of a terminal device is not limited in this embodiment.

FIG. 3 is a top view showing that application interfaces of two different applications are displayed on a display screen of a terminal device according to the present invention. FIG. 4 is a side view showing that application interfaces of two different applications are displayed on a display screen of a terminal device according to the present invention.

As shown in FIG. 3 and FIG. 4, in the embodiments of the present invention, an example in which the terminal device displays an application interface in a landscape mode is used for description. In a specific application, the terminal device may also display an application interface of an application in a portrait mode.

In the embodiments of the present invention, the display screen of the terminal device is not split to obtain split screen regions. Instead, application interfaces of a plurality of different applications that need to be displayed on the display screen of the terminal device are layered along a direction perpendicular to the display screen of the terminal device, and the application interfaces are displayed on the display screen of the terminal device in full screen.

In the embodiments of the present invention, an example in which two applications whose application interfaces need to be displayed on the display screen of the terminal device are a first application 301 and a second application 302 is used.

It should be noted that, in an actual application, more than two applications may be displayed on the display screen of the terminal device. That is, in this embodiment, a quantity of applications displayed on the display screen of the terminal device is not limited.

Along a direction perpendicular to the display screen of the terminal device, the application interface of the second application 302 is located at an outer layer of the application interface of the first application 301, and the application interface of the first application 301 is located at an inner layer of the application interface of the second application 302.

In this embodiment, an area of the application interface of the first application 301 and an area of the application interface of the second application 302 are not limited in the embodiments. To improve display effects of displaying the application interfaces of the first application 301 and the second application 302 on the display screen of the terminal device, in the embodiments, an example in which the area of the application interface of the first application 301 and the area of the application interface of the second application 302 are equal, and the area of the application interface of the first application 301 and the area of the application interface of the second application 302 are equal to an area of the display screen of the terminal device is used for description.

Certainly, in another embodiment, alternatively, the area of the application interface of the first application 301 and the area of the application interface of the second application 302 may be less than the area of the display screen of the terminal device, or the area of the application interface of the first application 301 is greater than the area of the application interface of the second application 302, or the area of the application interface of the first application 301 is less than the area of the application interface of the second application 302.

In this embodiment, the application interface of the second application 302 is split into two regions: a first region 3021 and a second region 3022; and the application interface of the first application 301 is split into two regions: a third region 3011 and a fourth region 3012.

Transparency processing is performed on the first region 3021 of the second application 302, so that the first region 3021 is a transparent region.

A specific process of performing transparency processing on the first region 3021 of the second application 302 may be: presetting application interface transparency on the terminal device. The application interface transparency may be set before delivery of the terminal device from a factory, or the application interface transparency may be entered by a user.

The terminal device may perform transparency processing on the first region 3021 of the second application 302 based on the application interface transparency, so that transparency of the first region 3021 of the second application 302 is equal to the preset application interface transparency.

In this embodiment, a value of the application interface transparency is not limited. For example, the application interface transparency may be 100%. In this case, after the terminal device processes the first region 3021 of the second application 302 based on the application interface transparency, the first region 3021 may be fully transparent. For another example, the application interface transparency may be 50%. In this case, after the terminal device processes the first region 3021 of the second application 302 based on the application interface transparency, the first region 3021 may be translucent.

In this embodiment, an example in which the application interface transparency is 100%, that is, the first region 3021 is fully transparent, is used for description.

To ensure that all interface elements on the first application 301 and the second application 302 are normally displayed, in this embodiment, all the interface elements displayed on the application interface of the first application 301 and all the interface elements displayed on the application interface of the second application 302 can be rearranged.

It should be noted that, in this embodiment, the interface elements displayed on the application interface of the first application 301 and the interface elements displayed on the application interface of the second application 302 are not limited.

In this embodiment, the interface element displayed on the application interface can receive a touch event entered by the user, so that the application can execute an icon of a corresponding function based on the touch event entered by the user.

Figure 5:
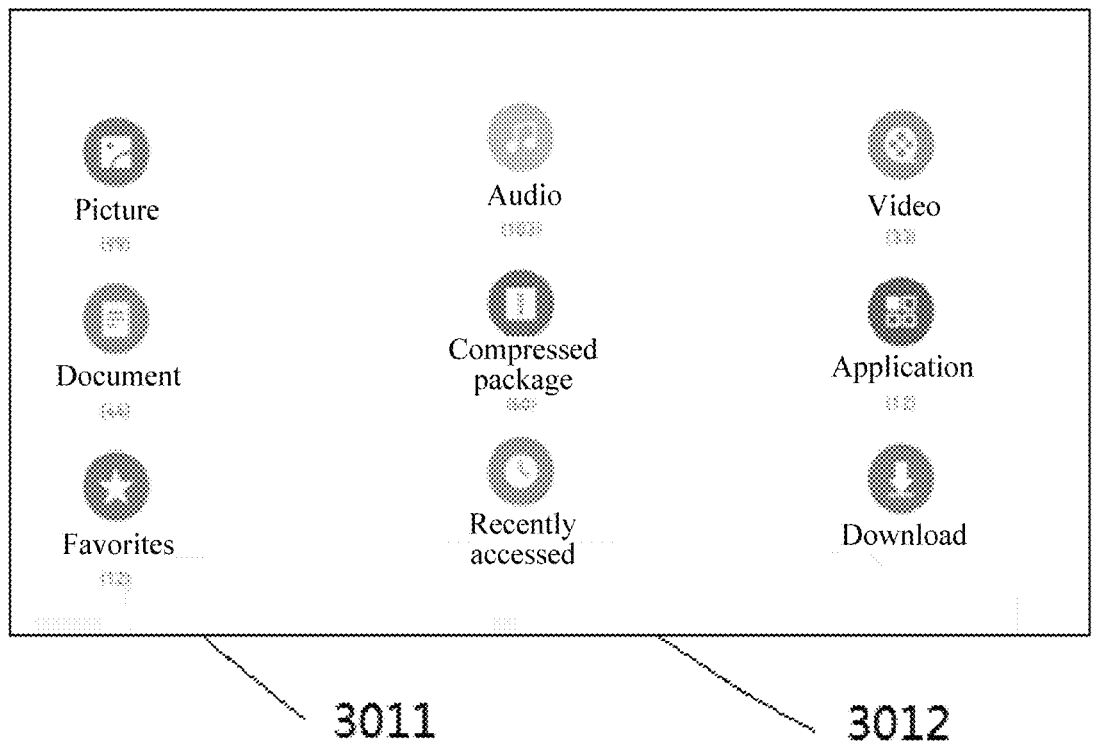
FIG. 5 is a schematic structural diagram that exists before interface elements of an application interface of a first application are rearranged according to the present invention.

Specifically, for a structure of the application interface that exists before all the interface elements displayed on the application interface of the first application 301 are rearranged, refer to FIG. 5. For a structure of the application interface that exists after all the interface elements displayed on the application interface of the first application 301 are rearranged, refer to FIG. 6.

Figure 6:
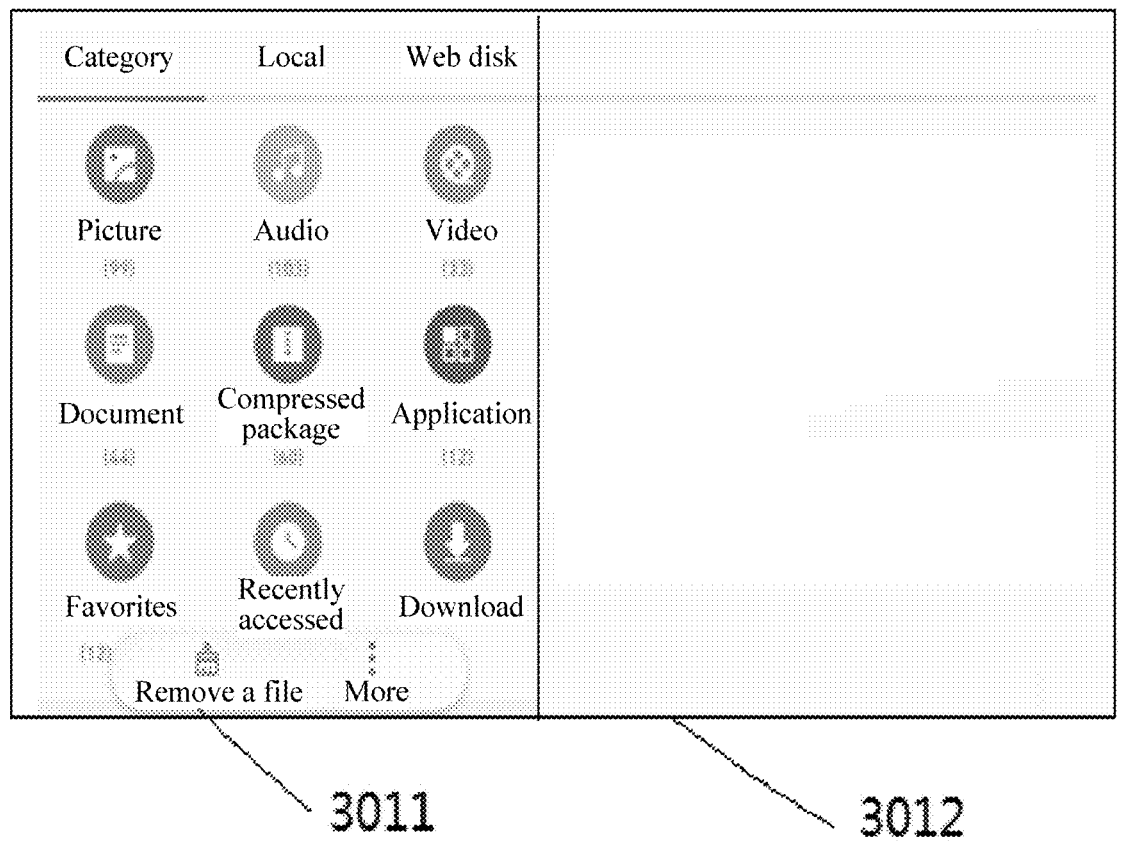
FIG. 6 is a schematic structural diagram that exists after interface elements of an application interface of a first application are rearranged according to the present invention.

With reference to FIG. 5 and FIG. 6, before rearrangement, all the interface elements on the application interface of the first application 301 are evenly arranged on the entire application interface of the first application 301. In this embodiment, all the interface elements displayed on the application interface of the first application 301 are rearranged, so that all the rearranged interface elements displayed on the application interface of the first application 301 are displayed in the third region 3011, and no interface element is displayed in the fourth region 3012, that is, the fourth region 3012 is a blank region.

In this embodiment, all the interface elements displayed on the application interface of the second application 302 can be also rearranged. A difference between arrangement of all the interface elements on the application interface of the second application 302 and arrangement of all the interface elements on the application interface of the first application 301 is as follows: All the rearranged interface elements displayed on the application interface of the second application 302 are displayed in the second region 3022, but no interface element is displayed in the first region 3021 of the second application 302, that is, the first region 3021 is a blank region.

In this embodiment, specific arrangement manners of the interface elements on the application interface of the first application 301 and the interface elements on the application interface of the second application 302 are not limited, provided that the interface elements on the application interface of the first application 301 and the interface elements on the application interface of the second application 302 do not block each other in a direction perpendicular to the terminal device.

In this embodiment, a relationship between sizes of the first region 3021 and the second region 3022 is not limited, and a relationship between sizes of the third region 3011 and the fourth region 3012 is not limited.

In this embodiment, an example in which an area of the first region 3021 and an area of the third region 3011 are equal, and an area of the second region 3022 and an area of the fourth region 3012 are equal is used.

Certainly, in a specific application, a location that is of the second application 302 and that corresponds to the fourth region 3012 of the first application 301 may be a non-transparent region, and a location that is of the second application 302 and that does not correspond to the fourth region 3012 of the first application 301 may be a transparent region, so that all interface elements in the third region 3011 of the first application 301 and the second region 3022 of the second application 302 can be viewed.

In this embodiment, an interface element displayed in the third region 3011 of the first application 301 can be displayed and viewed by the user through the transparent first region 3021, and an interface element displayed in the second region 3022 of the second application 302 can be directly displayed and viewed by the user.

Figure 31:
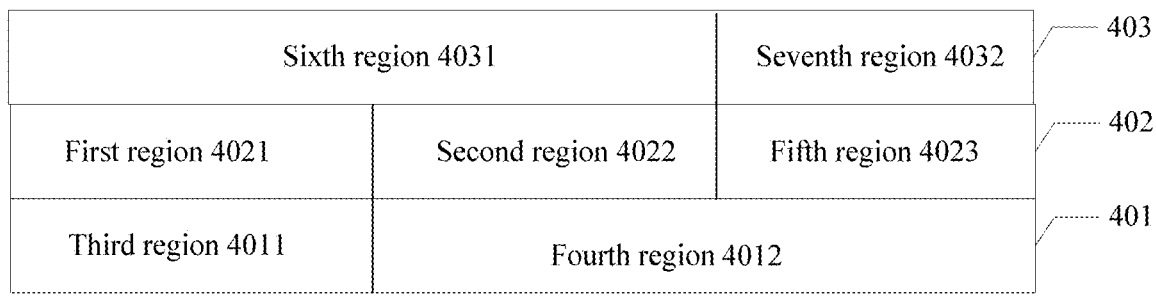
FIG. 31 is another schematic structural diagram of displaying an application interface on a display screen of a terminal device according to the present invention.

It should be noted that, in this embodiment, an example in which two application interfaces are displayed on the display screen of the terminal device is used for description. In a specific application, FIG. 31 is used as an example. A plurality of second applications may be displayed above a first application 401, for example, a second application 402 and a second application 403 are displayed above the first application 401.

The first application 401 is split to obtain a third region 4011 and a fourth region 4012. For details of a split manner of the first application 401, refer to the split manner of the first application 301 in the foregoing embodiment. Details are not specifically described again.

The second application 402 is split to form a first region 4021. The first region 4021 is a transparent region, the first region 4021 is provided in correspondence with a location of the third region 4011 along a direction perpendicular to a display screen of a terminal device, and an area of the first region 4021 is greater than or equal to that of the third region 4011, so that an interface element displayed in the third region 4011 can be seen through the transparent first region 4021.

An application interface of the second application 402 continues to be split to obtain a second region 4022 and a fifth region 4023. The second region 4022 and the fifth region 4023 are regions isolated from each other, and an interface element of the second application 402 is arranged in the second region 4022 for display.

An application interface of the second application 403 is split to form a sixth region 4031 and a seventh region 4032. The sixth region 4031 is provided in correspondence with locations of the first region 4021 and the second region 4022 along the direction perpendicular to the display screen of the terminal device, and an area of the sixth region 4031 is greater than or equal to areas of the third region 4011 and the second region 4022, so that an interface element displayed in the third region 4011 and an interface element displayed in the second region 4022 can be seen through the transparent sixth region 4031.

An interface element of the second application 403 is arranged in the seventh region 4032 for display.

As can be seen, a plurality of application interfaces can be displayed on the display screen of the terminal device by using the structure of this embodiment, and an interface element on a lower-layer application interface can be displayed by using a transparent region of an upper-layer application interface, so that application interfaces do not block each other in display of an interface element.

As can be seen, a difference between the method for displaying an application interface of an application on the display screen of the terminal device in this embodiment and that in the prior aft is as follows:

1. In the prior art, to simultaneously display a plurality of different applications on a display screen of a terminal device, scale down processing needs to be performed on an application interface of an application, so that application interfaces of a plurality of different applications on which scale down processing has been performed are simultaneously displayed on the display screen of the terminal device in parallel. However, in the method of this embodiment, scale down processing does not need to be performed on an application interface of an application, and application interfaces of all applications displayed on the display screen of the terminal device are displayed in full screen. Because scale down processing needs to be performed on an application interface in the prior aft, an information volume displayed on the application interface on which scale down processing has been performed is less than an information volume that can be displayed on the application interface on which scale down processing has not been performed. However, in this embodiment, after interface elements of an application interface are rearranged, the application interface may display all the interface elements that exist before rearrangement, or the application interface can display some interface elements that exist before rearrangement. If the application interface can display all the interface elements that exist before rearrangement, an information volume that can be displayed on the application interface is not reduced, and efficiency of obtaining displayed information of an application interface by a user is ensured.

2. In the prior aft, a display location of an interface element on an application interface of an application is not changed. However, in this embodiment, interface elements on application interfaces of different applications can be arranged along different directions, and the arranged interface elements on the application interfaces of the plurality of applications can be independent from each other, and do not block each other in a direction perpendicular to the terminal device.

3. In this embodiment, transparency processing can be performed on a partial region of an application interface of an upper-layer application, so that an interface element on an application interface of a lower-layer application can be normally displayed through the region on which transparency processing has been performed.

4. In this embodiment, all applications displayed on the display screen of the terminal device are in an active state, and a user can simultaneously operate a plurality of applications in the active state. This improves user operation efficiency, and avoids power consumption caused because a plurality of applications simultaneously displayed on the display screen of the terminal device repeatedly switch between the foreground and the background of the terminal device in the prior art.

5. In this embodiment, the application interface of the second application includes the transparent region and the non-transparent region, an interface element of the first application can be displayed through the transparent region of the second application, and an interface element of the second application can be displayed in the non-transparent region of the second application. The application interface of the first application and the application interface of the second application are displayed together by combination in display effects. That is, the application interface of the first application and the application interface of the second application are an application interface of a same application in display effects.

With reference to a flowchart, the following describes how application interfaces of different applications are simultaneously displayed on the display screen of the terminal device in the embodiments of the present invention.

Figure 7:
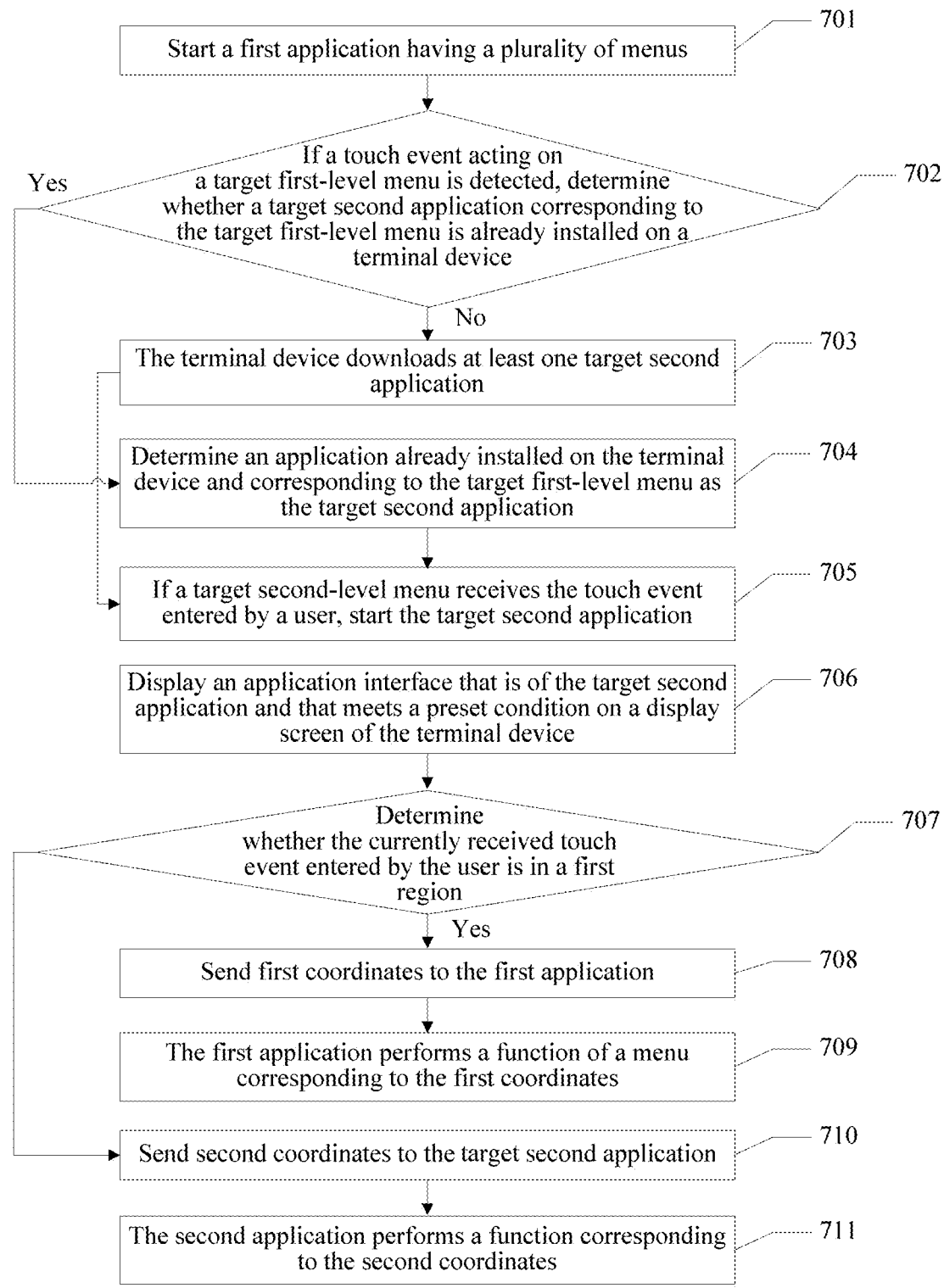
FIG. 7 is a flowchart of steps of an application interface display method according to an embodiment of the present invention.

First, refer to FIG. 7.

Step 701: Start a first application having a plurality of menus.

Figure 8:
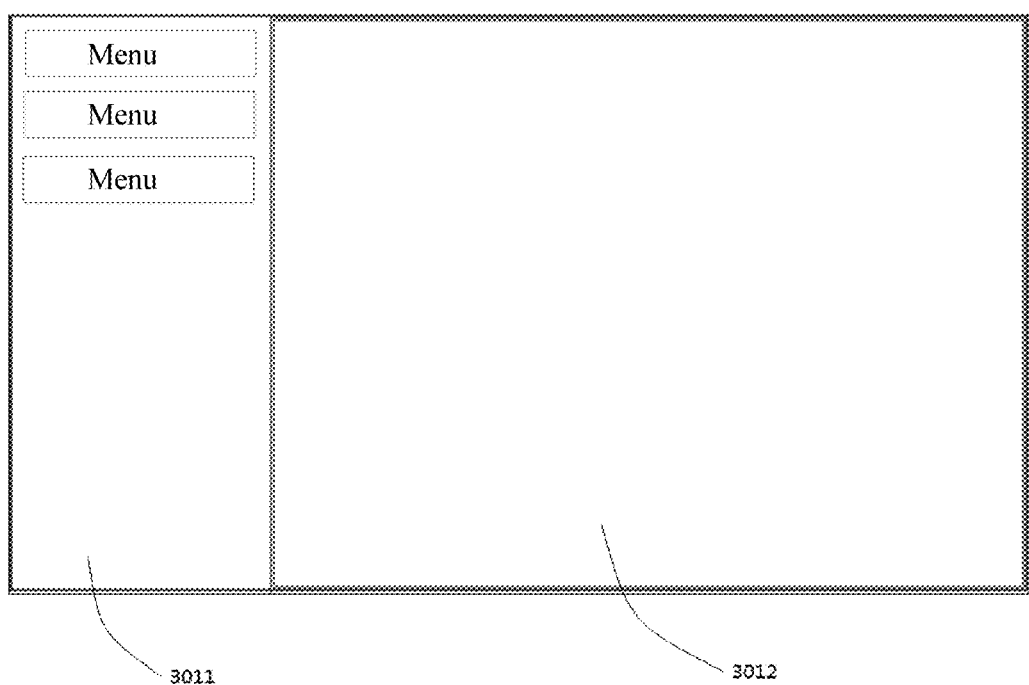
FIG. 8 is a schematic structural diagram of an application interface of a first application according to an embodiment of the present invention.

In this embodiment, for an application interface of the first application, refer to FIG. 8. A left-side region of the first application (the left-side region of the first application is the third region 3011 shown in FIG. 4) is provided with a plurality of menus.

In this embodiment, menus may be classified based on levels, so that a first-level menu interface is displayed in the third region 3011 of the first application, and a plurality of first-level menus are displayed on the first-level menu interface.

A second-level menu interface is at a lower level of the first-level menu interface, and a plurality of second-level menus are displayed on the second-level menu interface.

Specifically, a submenu corresponding to at least one of the plurality of first-level menus is the second-level menu.

By analogy, the first application includes N levels of menus, and N is a positive integer greater than or equal to 2.

FIG. 6 is used as an example. FIG. 6 is a schematic diagram showing that the application interface of the first application displays the first-level menu interface.

The first-level menus displayed on the first-level menu interface may be buttons arranged in groups based on different file types.

Specifically, the terminal device can classify file types stored by the terminal device and/or a web disk configured to provide online storage for the terminal device.

The first-level menus correspond to the file types classified by the terminal device, so that different types of files can be operated by using any one of the first-level menus.

In this embodiment, a quantity of the first-level menus included in the first application and a file type corresponding to each of the first-level menus are not limited.

For example, the first-level menu may be a button "picture", a file type corresponding to the first-level menu "picture" is a picture, and the picture is stored locally in the terminal device and/or in a web disk.

For another example, the first-level menu may be a button "audio", a file type corresponding to the first-level menu "audio" is audio, and the audio is stored locally in the terminal device and/or in a web disk.

For another example, the first-level menu may be a button "document", a file type corresponding to the first-level menu "document" is a document, and the document is stored locally in the terminal device and/or in a web disk.

For another example, the first-level menu may be a button "compressed package", a file type corresponding to the first-level menu "compressed package" is a compressed package, and the compressed package is stored locally in the terminal device and/or in a web disk.

For another example, the first-level menu may be a button "application", and a file type corresponding to the first-level menu "application" is various applications installed on the terminal device.

Step 702. If a touch event acting on a target first-level menu is detected, determine whether a target second application corresponding to the target first-level menu is already installed on the terminal device; and if no, perform step 703; or if yes, perform step 704.

In this embodiment, the terminal device can process a display effect of a menu that has received a touch event entered by a user in the first application, so that the display effect of the menu that has received the touch event entered by the user is different from that of a menu that has not received the touch event entered by the user.

Optionally, in this embodiment, luminance enhancing processing may be performed on the menu that has received the touch event entered by the user, so that a luminance of the menu that has received the touch event entered by the user is greater than that of the menu that has not received the touch event entered by the user.

In this embodiment, the target first-level menu is any first-level menu that is of a plurality of first-level menus included on the first-level menu interface displayed by the first application and that has received the touch event entered by the user.

FIG. 6 is used as an example. If a first-level menu "video" has received the touch event entered by the user, it indicates that the first-level menu "video" is the target first-level menu.

If the first-level menu "audio" has received the touch event entered by the user, it indicates that the first-level menu "audio" is the target first-level menu.

In this embodiment, the target second application is an application that can implement a file type corresponding to the target first-level menu touched by the user.

For example, as shown in FIG. 6, if the target first-level menu "video" has received the touch event entered by the user, the target second application corresponding to the target first-level menu "video" is an application that can play a video. The target second application may be Tencent Video, iQiyi, Tudou, or the like.

For another example, if the target first-level menu "audio" has received the touch event entered by the user, the target second application corresponding to the target first-level menu "audio" is an application that can play audio. The target second application may be Baidu Music, Kuwo Music, TTPlayer, or the like.

Step 703: The terminal device downloads at least one target second application.

Specifically, when determining that the target second application is not installed on the terminal device, the terminal device may perform a procedure of downloading the target second application.

In this embodiment, the terminal device may determine a plurality of target second applications. For example, if the terminal device determines that the target second application is an application used to play audio, the terminal device may download at least one target second application.

For example, when the terminal device determines that the target second application is an application used to play audio, the terminal device may download iQiyi, Tencent Video, Tudou, Youku, and/or the like.

The following describes how the terminal device downloads the target second application.

In this embodiment, the terminal device may automatically download the target second application.

Specifically, in this embodiment, the terminal device may obtain an order of the target second applications.

More specifically, the terminal device may obtain an order of the target second applications from an "application store" used to download an application.

The plurality of target second applications may be sorted in descending order of quantities of downloading times. For example, if the target second application is an application used to play a video, the terminal device obtains a descending order of quantities of downloading times of iQiyi, Tencent Video, Tudou, and Youku.

Alternatively, the plurality of target second applications may be sorted in descending order of quantities of favorable comments. For example, if the target second application is an application used to play a video, the terminal device obtains a descending order of quantities of favorable comments of iQiyi, Tencent Video, Tudou, and Youku.

The terminal device may automatically download first N applications of the target second applications based on the order, where N is a positive integer greater than or equal to 1.

In this embodiment, a sorting manner of the target second applications is only an example for description, and a specific sorting manner is not limited in this embodiment.

In this embodiment, the terminal device may alternatively download the target second application based on a user operation.

Specifically, the terminal device may push a plurality of download paths of the target second applications to a user by using the application interface of the first application. A download path of each target second application may be displayed in the third region 3011 and/or the fourth region 3012.

The download path of the target second application is a storage address of the target second application on a server.

If a download path of the target second application receives the touch event entered by the user, the terminal device may download a corresponding target second application based on the download path selected by the user.

After completing downloading the target second application, the terminal device may delete the download path of the target second application from the application interface of the first application.

Figure 28:
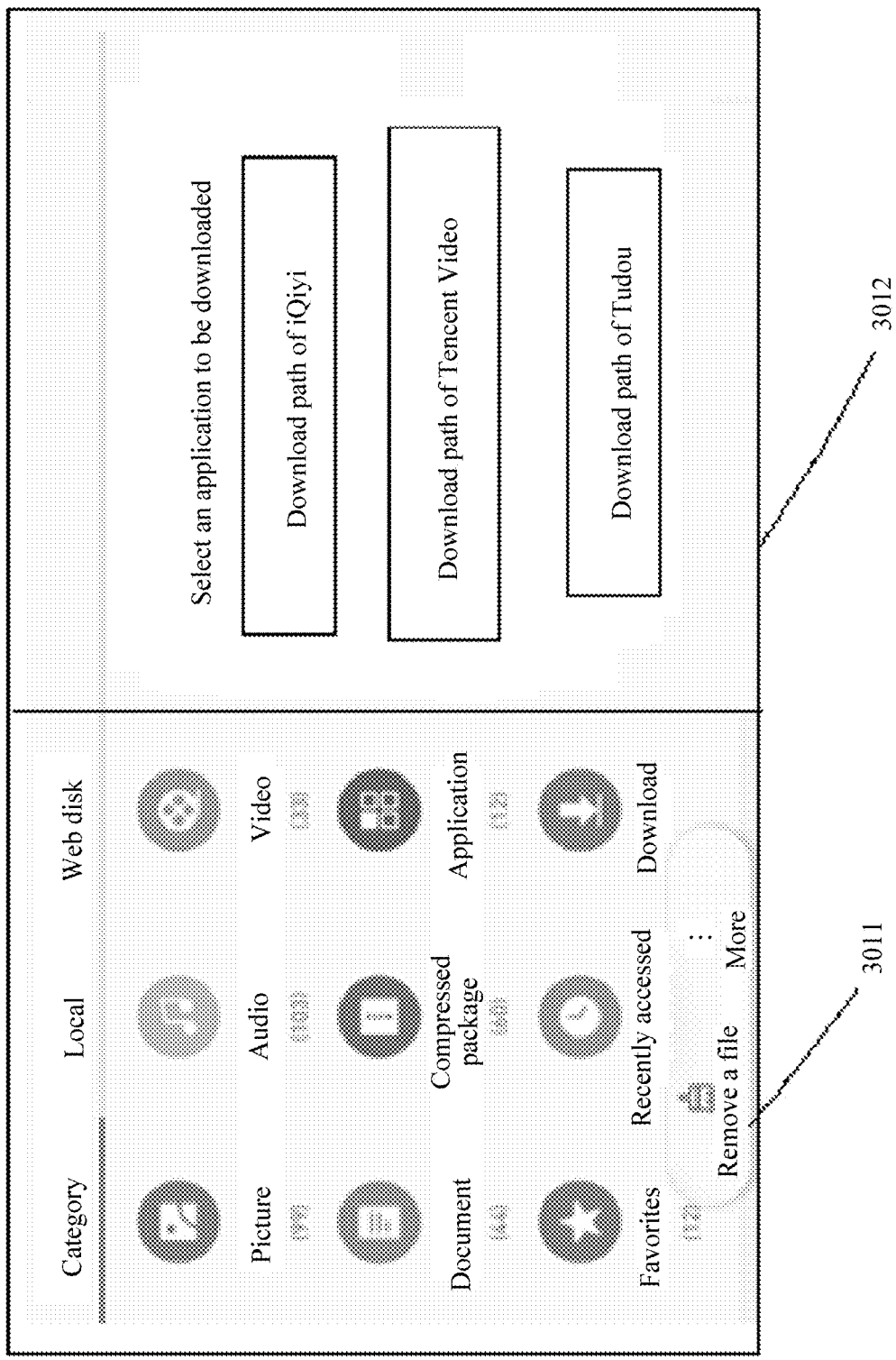
FIG. 28 is a schematic diagram of another application scenario to which an application interface display method is applied according to an embodiment of the present invention.

As shown in FIG. 28, when the terminal device detects that the target second applications are iQiyi, Tencent Video, and Tudou, the terminal device may display a download path of each target second application in the fourth region 3012 of the first application. For example, a download path of iQiyi indicates a storage address of iQiyi on the server, and a specific address is not described in detail in this embodiment.

If a download path of any one of the target second applications receives the touch event entered by the user, the terminal device may download a corresponding target second application based on the download path triggered by the user.

For example, if a download path of Tudou receives the touch event entered by the user, the terminal device may download Tudou based on the download path of Tudou.

In another application scenario, the application interface may alternatively display an icon that is of the target second application and that corresponds to the download path of the target second application.

Figure 29:
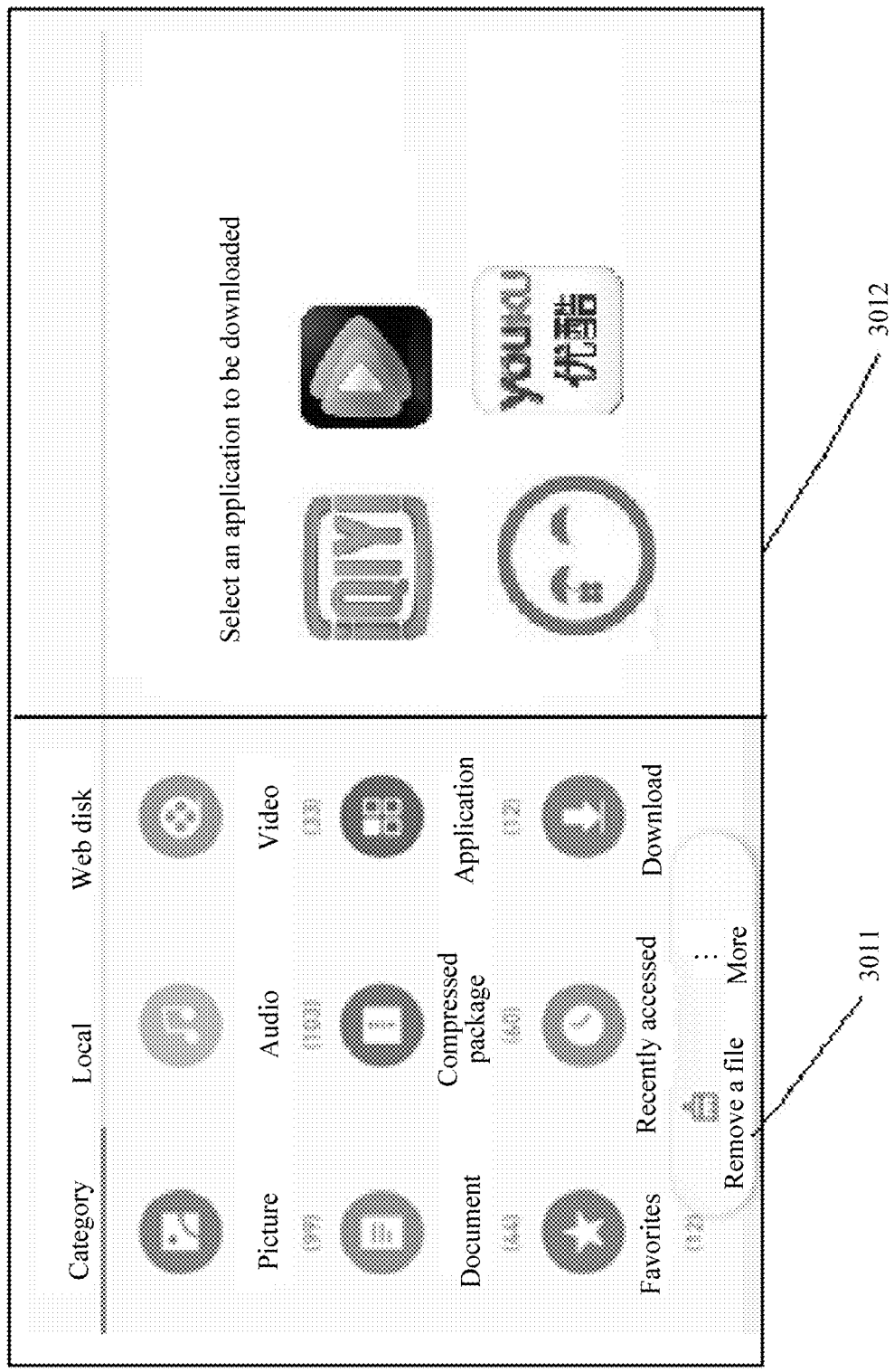
FIG. 29 is a schematic diagram of another application scenario to which an application interface display method is applied according to an embodiment of the present invention.

As shown in FIG. 29, when the terminal device detects that the target second applications are iQiyi, Tencent Video, Tudou, and Youku, the terminal device may display icons of the target second applications in the fourth region 3012 of the first application, and the terminal device establishes a correspondence between an icon of each target second application and a download path used to download the target second application. If an icon of any target second application receives the touch event entered by the user, the terminal device may obtain a download path corresponding to the icon touched by the user, and download the corresponding target second application based on the determined download path.

For example, if the user touches an icon of iQiyi in the fourth region 3012, the terminal device may obtain, based on the triggered icon of iQiyi, a download path used to download iQiyi, and download iQiyi based on the download path of iQiyi.

In this application scenario, if the terminal device detects that the target second application has been downloaded, the terminal device may delete all interface elements displayed in the fourth region 3012 and used to complete download of the target second application. In this application scenario, for a display effect of the interface after deletion, refer to FIG. 6.

FIG. 28 is used as an example. The terminal device may display, on the application interface of the first application, all download paths, of the target second applications, that may be determined; or the terminal device may display, on the application interface of the first application, download paths, of the target second applications, that satisfy a preset condition.

The download paths, of the target second applications, that satisfy the preset condition are download paths on which a success probability of downloading the target second applications is greater than a first preset value, and/or a speed of downloading the target second applications is greater than or equal to a second preset value.

In this embodiment, specific values of the first preset value and the second preset value are not limited.

For another example, the terminal device may display the obtained order of the target second applications on the application interface of the first application. The order of the target second applications further includes a download path corresponding to each target second application and used to download the target second application. If any target second application in the order receives the touch event entered by the user, the terminal device may obtain a download path corresponding to the triggered target second application, and complete downloading the target second application based on the obtained download path.

Step 704. Determine an application already installed on the terminal device and corresponding to the target first-level menu as the target second application.

In this embodiment, it is assumed that the touch event acting on the target first-level menu in step 702 is detected, and applications already installed on the terminal device include at least one application corresponding to the target first-level menu.

For example, if the target first-level menu is "video", when the terminal device detects that the target first-level menu "video" has received the touch event entered by the user, and an application such as iQiyi, Youku, or Tudou that can implement a function of the first-level menu "video" is already installed on the terminal device, the terminal device may determine iQiyi, Youku, and/or Tudou already installed on the terminal device as the target second application.

For another example, if the target first-level menu is "audio", when the terminal device detects that the target first-level menu "audio" has received the touch event entered by the user, and an application such as TTPlayer, Baidu Music, or Kuwo Music that can implement a function of the first-level menu "audio" is already installed on the terminal device, the terminal device may determine TTPlayer, Baidu Music, and/or Kuwo Music already installed on the terminal device as the target second application.

Step 705: If a target second-level menu receives the touch event entered by a user, start the target second application.

Figure 9:
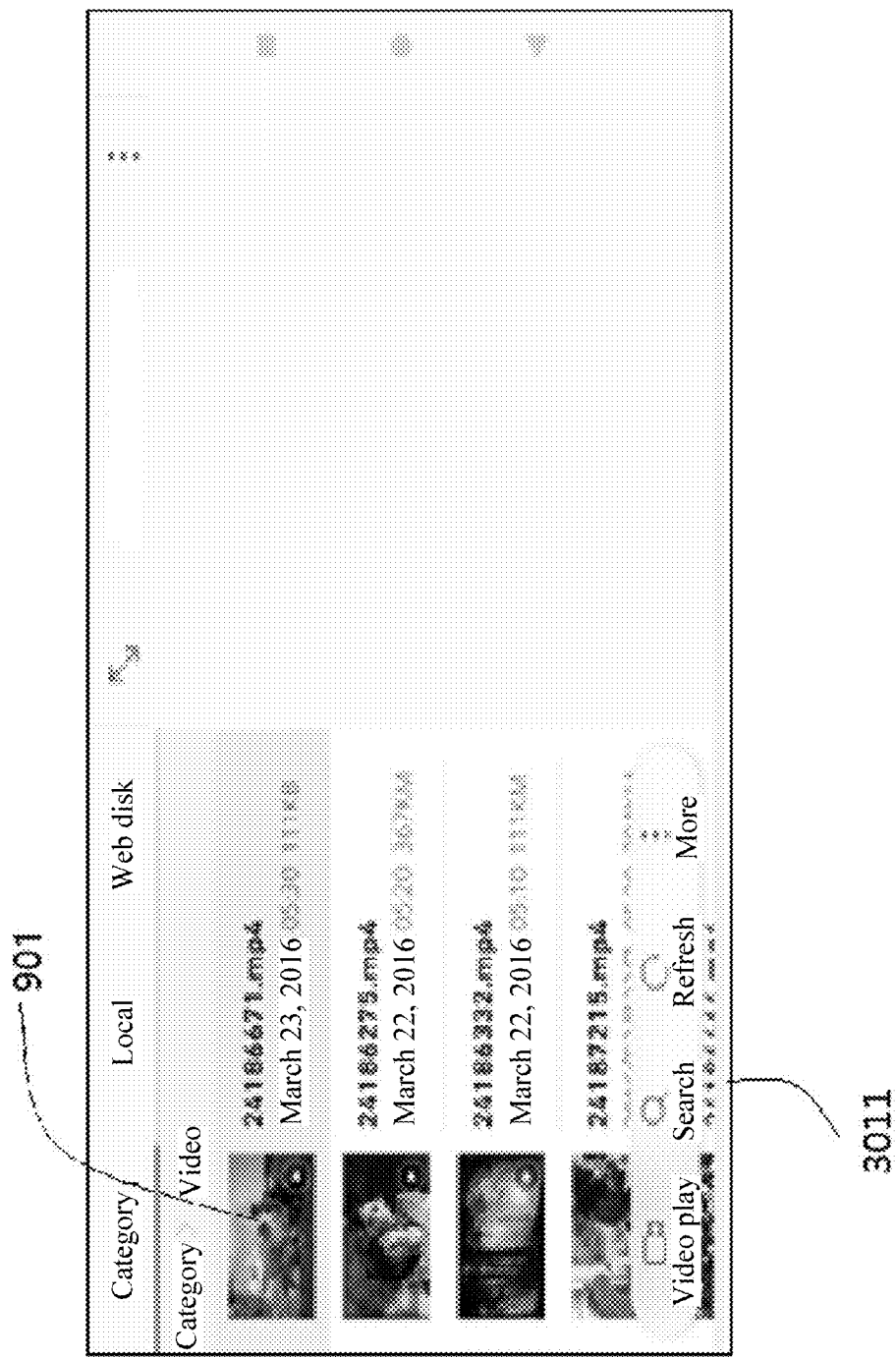
FIG. 9 is a schematic diagram of an application scenario to which an application interface display method is applied according to an embodiment of the present invention.

As shown in FIG. 9, if the target first-level menu is "video", a second-level menu interface corresponding to the target first-level menu "video" is displayed in the third region 3011 of the first application, and the second-level menu interface displays a plurality of second-level menus corresponding to the target first-level menu.

As can be known from FIG. 9, a lower-level menu of the first-level menu "video" displays various video files stored by the terminal device and/or the web disk, and different second-level menus of the lower-level menu of the first-level menu "video" correspond to different video files.

Optionally, in this embodiment, the various menus may include content abstract information. The content abstract information may be of a floating window structure. The content abstract information may be prompt information, and/or the content abstract information may be provided to the user to preview content included on a menu selected by the user.

In a specific application, a sensor of the terminal device can detect a strength used by the user to press any menu. If the strength used by the user to press the menu is greater than or equal to a preset value, the terminal device may display, in the floating window structure, content abstract information corresponding to the menu pressed by the user.

Certainly, in this embodiment, descriptions about content included in the content abstract information, a display manner, and triggering to display the content abstract information are optional examples, and are not limited.

Figure 30:
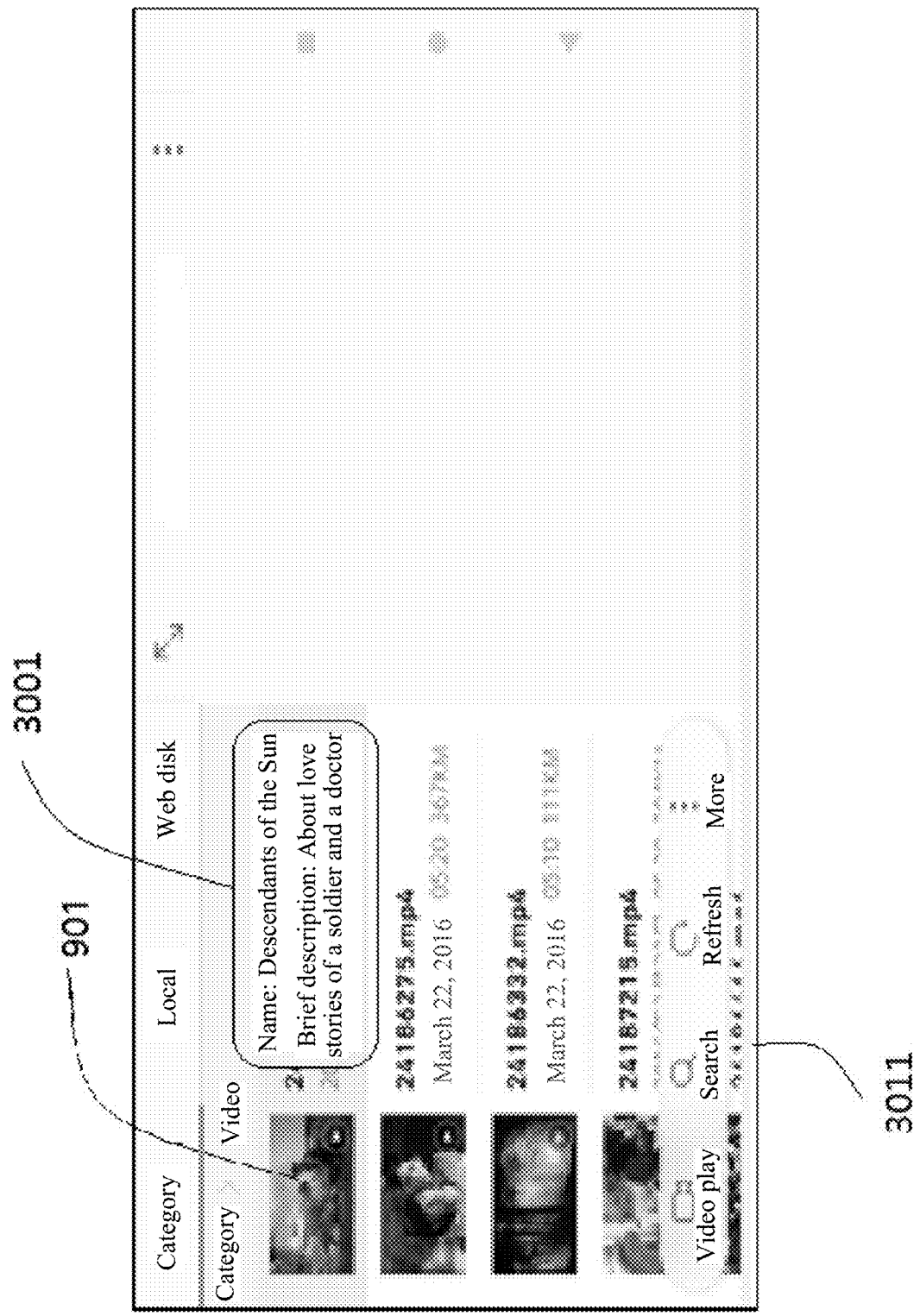
FIG. 30 is a schematic diagram of another application scenario to which an application interface display method is applied according to an embodiment of the present invention.

FIG. 9 and FIG. 30 are used as an example. As shown in FIG. 9, a strength used by the user to press a second-level menu 901 is greater than or equal to a preset value. In this case, as shown in FIG. 30, the terminal device may display content abstract information 3001 of the second-level menu 901. In this scenario, the content abstract information 3001 of the second-level menu 901 may be information such as a name, a content summary, and network user comments of a current video file.

If the video file corresponding to the second-level menu 901 displayed on the terminal device is "Descendants of the Sun", the content abstract information 3001 of the second-level menu 901 may indicate information such as the name "Descendants of the Sun" of the current video file, a content summary of "Descendants of the Sun", and network user comments of "Descendants of the Sun".

In this embodiment, the target second application of the terminal device may be an application downloaded in step 703, or the target second application is an application already installed on the terminal device and determined in step 704.

If there is one target second application, the terminal device may directly start the target second application. If there are two or more target second applications, the terminal device needs to perform a procedure of selecting a target second application.

The following describes details of the procedure of selecting a target second application by the terminal device.

For example, the terminal device may select a target second application based on the order of the target second applications. That is, the terminal device may select a downloaded second application that is located in a first location in the order of the target second applications.

For another example, the terminal device may collect statistics on quantities of usage times of the target second applications installed on the terminal device, and select a target second application having a largest quantity of usage times.

It should be noted that, in this embodiment, how the terminal device selects the target second application is not limited.

Certainly, the terminal device may further push a selection list to the user, where the selection list includes all the current target second applications on the terminal device, and the user may select a target second application by using the selection list.

After determining the target second application, the terminal device may start the target second application.

The following describes how the terminal device starts the target second application.

In this embodiment, the target second-level menu that has received the touch event entered by the user corresponds to a target second application start event, where the target second application start event is used to start the target second application.

Specifically, in this embodiment, each second-level menu corresponding to the target first-level menu and displayed on the second menu interface corresponds to a different second application start event, different second-level menus correspond to different second application start events, and the second application start event is used to start a second application for implementing a corresponding file type.

If the target second-level menu on the second-level menu interface detects the touch event performed by the user, the terminal device may obtain the target second application start event corresponding to the target second-level menu.

For example, as shown in FIG. 6, if the target first-level menu "video" receives the touch event entered by the user, a second-level menu interface corresponding to the target first-level menu "video" displays a plurality of second-level menus that can implement different video files. A second-level menu that has received the touch event entered by the user and that is on the second-level menu interface is determined as the target second-level menu. A target second application start event corresponding to the target second-level menu is determined. The target second application start event can start a target second application that can play a video file, where the target second application may be Tencent Video, iQiyi, Tudou, or the like.

For another example, if the target first-level menu "audio" receives the touch event entered by the user, a second-level menu interface corresponding to the target first-level menu "audio" displays a plurality of second-level menus that can implement different audio files. A second-level menu that has received the touch event entered by the user and that is on the second-level menu interface is determined as the target second-level menu. A target second application start event corresponding to the target second-level menu is determined. The target second application start event can start a target second application that can play an audio file, where the target second application may be Baidu Music, Kuwo Music, TTPlayer, or the like.

After the terminal device determines the target second application, the terminal device may encapsulate the target second application start event used to start the target second application in an intent object.

For example, the method of this embodiment is applied to an Android Android system. An activity manager activity manager of the Android system obtains, by using an inter-process communication socket, the target second application start event already encapsulated in the intent object.

The activity manager activity manager may start the target second application based on the target second application start event.

Step 706: Display an application interface that is of the target second application and that meets a preset condition on a display screen of the terminal device.

In this embodiment of the present invention, the terminal device can further add a column split flag to the target second application start event already encapsulated in the intent object.

The column split flag is used to instruct the target second application to display the application interface meeting the preset condition on the display screen of the terminal device.

Specifically, a window manager window manager of the Android system obtains the column split flag by using an inter-process communication socket. In this case, the window manager window manager can obtain locations and areas of the third region 3011 and the fourth region 3012 of the first application 301 by using an inter-process communication socket.

Specifically, in this embodiment, the column split flag may be:

intent.addFlags(Intent. FLAG_HW_SPLIT_ACTIVITY).

It should be noted that, in this embodiment, description of the column split flag is an optional example and is not limited.

More specifically, in this embodiment, the window manager window manager can invoke an activity stack of an application interface task manager. The activity stack of the application interface task manager can attach a task of the target second application to a task stack of the first application. Therefore, a task of the first application and the task of the second application are in the same task stack, the first application and the second application are displayed as one application in display effects, and this can ensure that the first application and the target second application on the display screen of the terminal device are simultaneously in an active state.

In the prior-art method of splitting the screen of the terminal device to display application interfaces of a plurality of applications, a plurality of applications on the display screen of the terminal device are independent from each other and do not integrate with each other in overall display effects. In the method of this embodiment, application interfaces of a plurality of applications are not independent from each other and integrate with each other in overall display effects of the display screen of the terminal device. In usage experience, in the method of this embodiment, experience of operating application interfaces of a plurality of applications displayed on the display screen of the terminal device is the same as that of operating an application interface of one application displayed on the display screen of the terminal device.

When the window manager window manager has obtained the locations and the areas of the third region 3011 and the fourth region 3012 of the first application, the window manager window manager can process the application interface of the target second application based on the column split flag, so that the processed application interface of the target second application meets the preset condition.

The preset condition of this embodiment is as follows: The first region 3021 of the target second application is set as a transparent region, so that an interface element displayed in the third region 3011 of the first application is displayed through the transparent first region 3021 and is viewed by the user. For details of how to perform transparency processing on the first region 3021, refer to the foregoing embodiments. Details are not specifically described in this embodiment.

The preset condition is further as follows: The second region 3022 of the target second application displays all interface elements of the second application, and the second region 3022 of the second application is a non-transparent region.

That is, a location that corresponds to the fourth region 3012 of the application interface of the first application, and that is on the application interface that is of the target second application and that satisfies the preset condition is a non-transparent region, and a location that does not correspond to the fourth region 3012 of the application interface of the first application 301 and that is on the application interface of the target second application 302 is a transparent region.

The following specifically describes step 701 to step 706 with reference to a specific first application scenario.

The user starts the first application already installed on the terminal device. For a structure of the application interface of the started first application, refer to FIG. 6. As can be known, the first-level menu interface is displayed in a left-side region (the third region 3011) of the first application, and the first-level menu interface displays a plurality of first-level menus.

The user may tap a corresponding target first-level menu based on a use requirement. For example, if the user needs to view a video file, the user may tap a target first-level menu "video", if the user needs to view a picture, the user may tap a target first-level menu "picture", and if the user needs to listen to audio, the user may tap a target first-level menu "audio".

In this application scenario, for example, the user taps the target first-level menu "video".

When the user taps the target first-level menu "video", all lower-level menus of the target first-level menu "video" are displayed in the third region 3011 of the first application.

That is, the third region 3011 of the first application jumps from displaying the first-level menu interface including the target first-level menu "video" to displaying the second-level menu interface.

In this application scenario, the lower-level menu of the target first-level menu "video" displays various video files stored by the terminal device and/or the web disk.

Different second-level menus of lower-level menus of the target first-level menu "video" correspond to different video files.

If the user taps the first-level menu "video", the terminal device may determine whether an application, for example, iQiyi, Youku, or Tudou, that can run a video file is already installed on the terminal device.

If the target second application that can play a video is already installed on the terminal device, the terminal device directly plays the video file by using the installed target second application.

If the target second application that can play a video is not installed on the terminal device, the terminal device needs to perform a process of downloading the target second application.

For details of a specific process of how the terminal device downloads the target second application, refer to step 703. The specific process is not described in detail in this application scenario.

When the terminal device has determined the target second application that can play a video, as shown in FIG. 9, if the user taps the target second-level menu 901, the target second application may play the video file "Descendants of the Sun".

Figure 10:
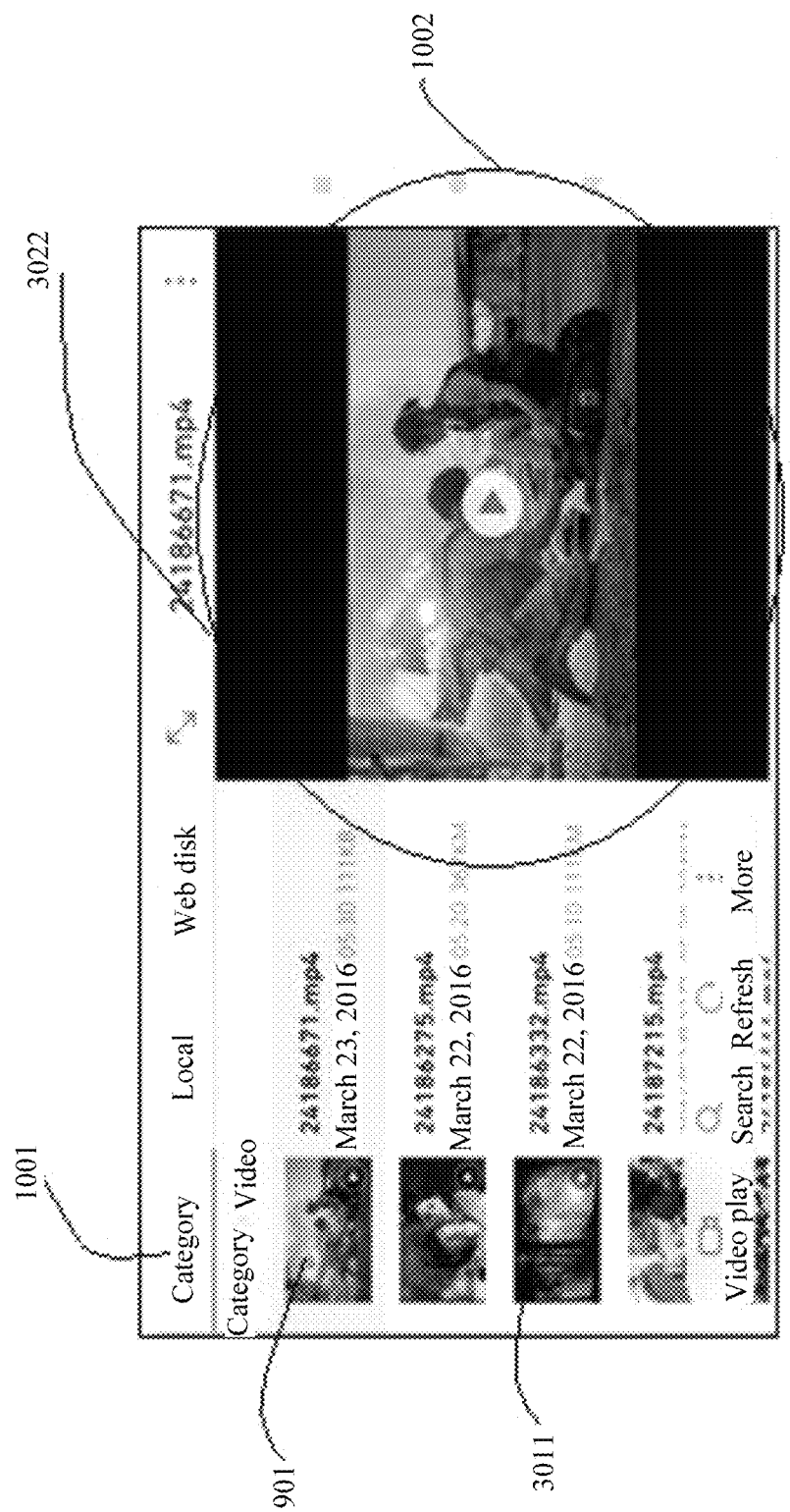
FIG. 10 is a schematic diagram of another application scenario to which an application interface display method is applied according to an embodiment of the present invention.

Specifically, the terminal device displays, in the third region 3011 of the first application, various second-level menus that are included in the first application and that correspond to the target first-level menu. The terminal device plays the video file in the second region 3022 of the second application. That is, in this application scenario, as shown in FIG. 10, the terminal device plays "Descendants of the Sun" in the second region 3022.

For detailed descriptions of the regions of the first application and the regions of the second application, refer to the foregoing embodiments. Details are not specifically described in this application scenario.

More specifically, the terminal device may determine whether the target second application can successfully execute a file corresponding to the target second-level menu. If the terminal device determines that the target second application cannot successfully execute the file corresponding to the target second-level menu, the terminal device may switch the target second application to execute the target second-level menu again.

For example, if the target second-level menu is "Descendants of the Sun" and the target second application is Youku, because Youku has no copyright of playing "Descendants of the Sun", the current target second application Youku cannot successfully play the video "Descendants of the Sun". In this case, the terminal device may run a new target second application. The new target second application may be already downloaded by the terminal device, or the target second application is newly downloaded by the terminal device.

Optionally, the terminal device may obtain a reason why the target second application Youku cannot successfully execute the target second-level menu "Descendants of the Sun", and the terminal device may newly download a new target second application based on the obtained reason.

The terminal device determines that the target second application Youku cannot play the video "Descendants of the Sun" because of copyright. In this case, the terminal device may obtain an application having the copyright of playing the video "Descendants of the Sun" from a network-side device. The terminal device can determine, based on information returned by the network-side device, that the application iQiyi has the copyright of playing the video "Descendants of the Sun", and the terminal device may download the new target second application iQiyi, to effectively ensure normal video play.

The following continues to describe, with reference to FIG. 7, how the terminal device performs a switching operation on a file when the display screen of the terminal device simultaneously displays the first application and the target second application.

Step 707: Determine whether the currently received touch event entered by the user is in a first region 3021; and if yes, perform step 708; or if no, perform step 710.

As shown in FIG. 4, in a direction perpendicular to the display screen of the terminal device, the application interface of the first application is at an inner layer of the application interface of the second application, and the application interface of the second application is at an outer layer of the application interface of the first application. For the user, visible regions are the third region 3011 of the first application 301 and the second region 3022 of the second application 302.

When the user enters the touch event on the display screen of the terminal device, a coupling capacitance is generated among a body electric field of the user, a finger tip of the user, and a location that is touched by the user and that is on the display screen of the terminal device. The terminal device determines, based on the coupling capacitance, coordinates that are currently touched by the user and that are on the display screen of the terminal device.

The terminal device may determine, based on the coordinates that are currently touched by the user and that are on the display screen of the terminal device, whether the currently received touch event entered by the user is in the first region 3021.

Specifically, if the coordinates of the touch event entered by the user are in the first region 3021, the terminal device determines that the touch event entered by the user is in the first region 3021. If the coordinates of the touch event entered by the user are in the second region 3022, the terminal device determines that the touch event entered by the user is in the second region 3022.

Step 708: Send first coordinates to the first application.

The first coordinates are coordinates of the touch event entered by the user in the first region 3021.

If the terminal device determines that the touch event entered by the user is in the first region 3021, because the first region 3021 is a transparent region, it indicates that the touch event entered by the user targets the first application, and that an object of the touch event entered by the user is a menu in the third region 3011 of the first application. In this case, the terminal device may send the first coordinates that are currently touched by the user and that are on the display screen of the terminal device to the first application.

Step 709: The first application performs a function of a menu corresponding to the first coordinates.

The first application may determine a touched menu in the third region 3011 of the first application based on the first coordinates, and the first application may perform the function of the menu touched by the user.

In this embodiment, a specific function of the menu corresponding to the first coordinates is not limited, and the following describes an example with reference to a specific application scenario.

A second application scenario is described with reference to FIG. 10. The second-level menu interface of the first application is displayed on the left side of FIG. 10. If the first application determines, based on the first coordinates, that the user touches a menu "category", the first-level menu interface of the first application is displayed in the third region 3011 of the first application (as shown in FIG. 6).

Figure 11:
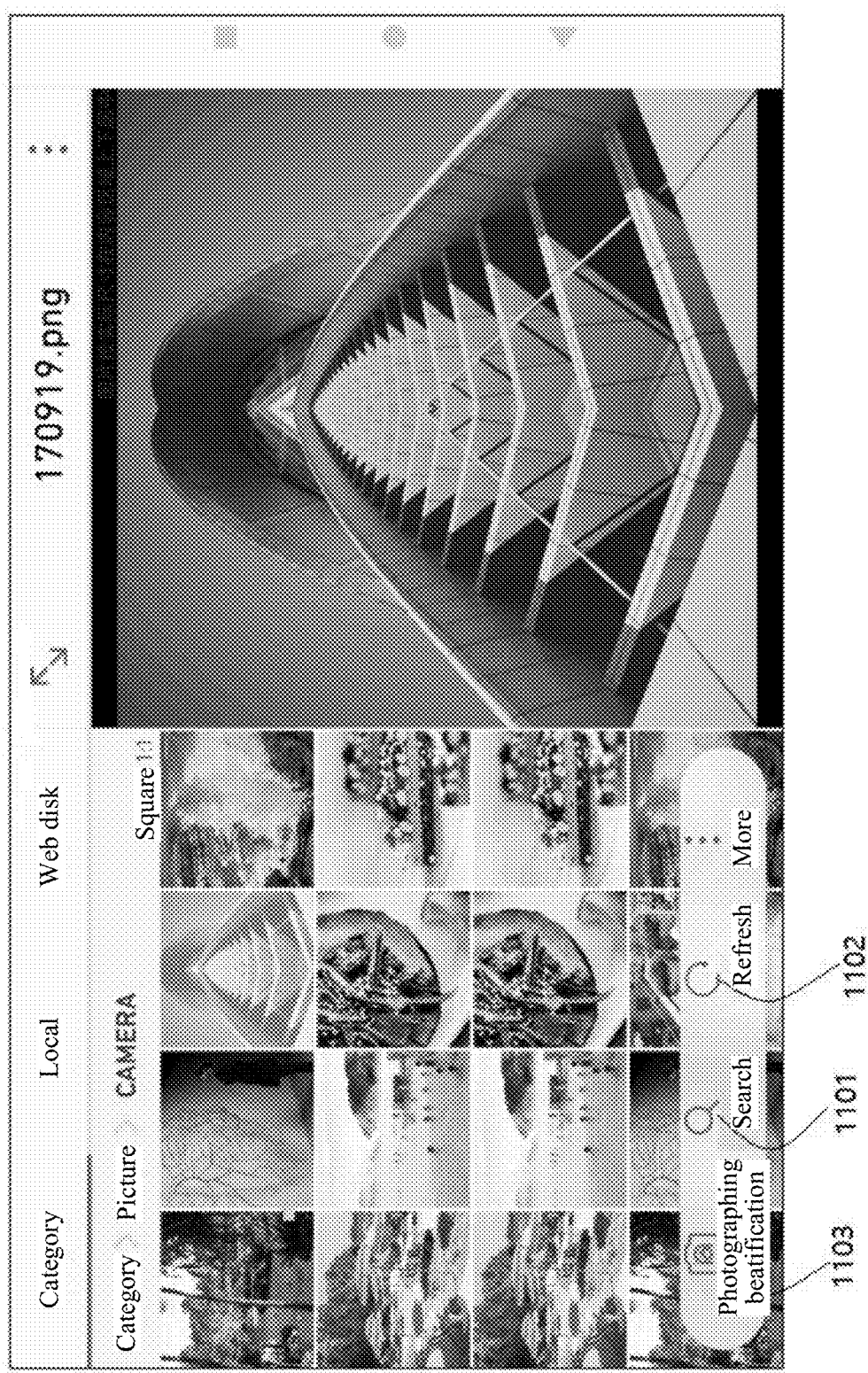
FIG. 11 is a schematic diagram of another application scenario to which an application interface display method is applied according to an embodiment of the present invention.

If the first application determines, based on the first coordinates, that the user touches the first-level menu "picture", as shown in FIG. 11, lower-level menus corresponding to the first-level menu "picture" are displayed in the third region 3011 of the first application. That is, the second-level menu interface corresponding to the first-level menu "picture" is displayed in the third region 3011, and different second-level menus on the second-level menu interface correspond to different picture files.

An application used to view a picture file can be run in the second region 3022.

The application used to view a picture may be already installed on the terminal device, or the application used to view a picture may be downloaded by the terminal device.

For details of a process in which the terminal device downloads a corresponding application based on the first-level menu touched by the user, refer to step 703. Details are not specifically described in this application scenario.

As can be known from the first application scenario and the second application scenario, when the user views a video by using the target second application, the user may touch a menu in the first application at any time to operate a file type different from the video file. For example, in the second application scenario, the user touches the first-level menu "picture" to invoke an application that can be used to view a picture file type, and the user may view a picture file by using the second application. As shown in FIG. 11, the user can view different picture files by touching different target second-level menus.

In this embodiment, an example in which the second application is an application used to view a picture is used for description.

Figure 12:
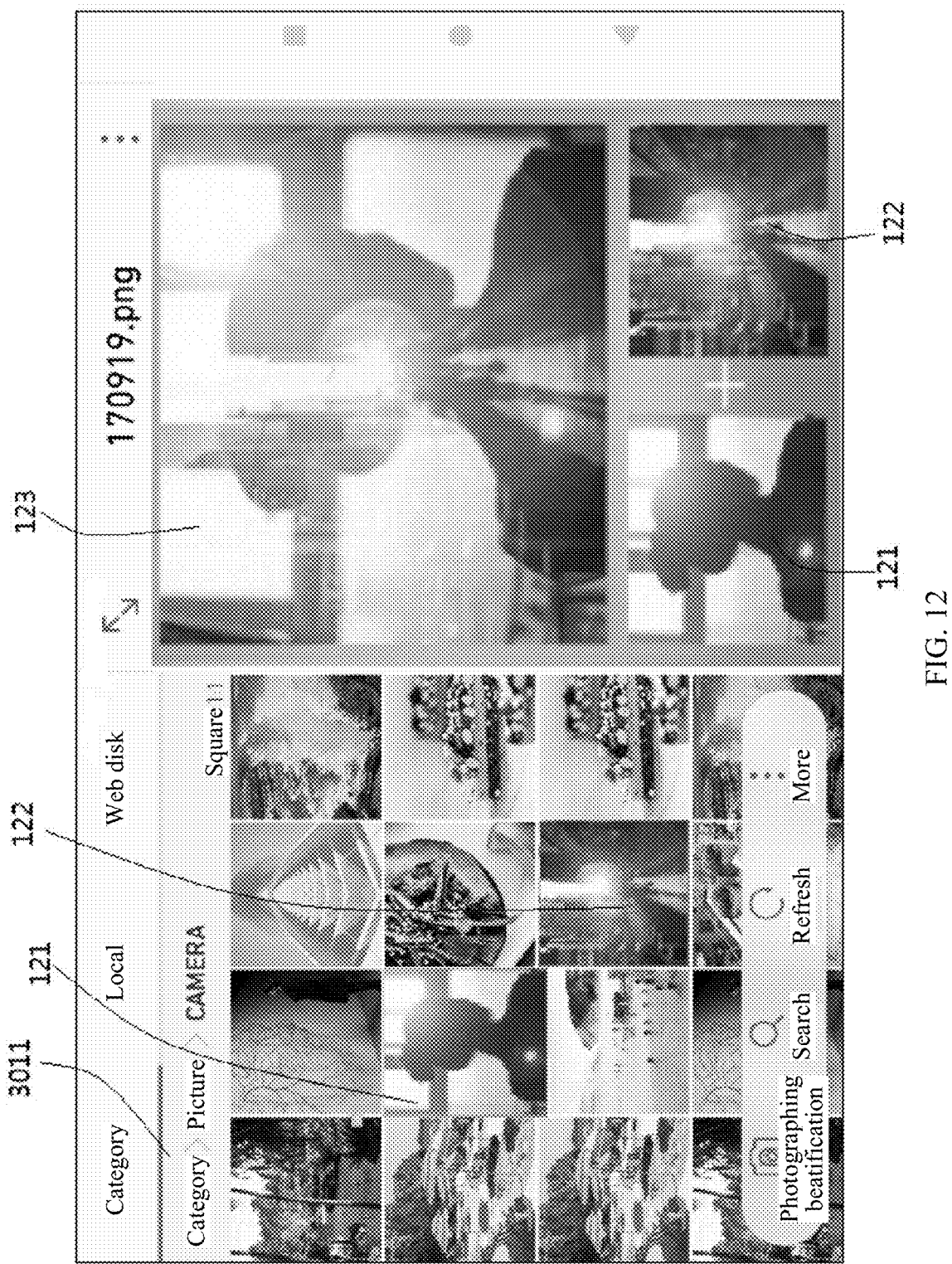
FIG. 12 is a schematic diagram of another application scenario to which an application interface display method is applied according to an embodiment of the present invention.

The following describes a third application scenario in an embodiment of the present invention with reference to FIG. 12.

As shown in FIG. 12, the second-level menu interface is displayed in the third region 3011 of the first application, and different second-level menus included on the second-level menu interface correspond to different picture files. In this application scenario, the target second application is an application used to combine pictures.

The user can select two pictures (a picture 121 and a picture 122) by touching the third region 3011, and the target second application can obtain the picture 121 and the picture 122 selected by the user by using the first application. The target second application can further combine the picture 121 and the picture 122 selected by the user, to form a combined picture 123, and the combined picture 123 can be displayed in the second region 3022 of the target second application.

An advantage of this application scenario is that the user can simultaneously select pictures stored in the first application and combine the selected pictures, thereby improving operation efficiency of the user in a picture combination process.

This application scenario is an example for description. The second application may be an application used to view a picture, or an application used to combine pictures, an application used to process a picture, or the like.

Optionally, in this embodiment, a function that can be implemented by a menu in the third region 3011 is not limited only to executing a file stored by the terminal device or the web disk, and in this embodiment, the function that can be implemented by the menu in the third region 3011 is not limited.

For example, as shown in FIG. ii, the third region 3011 may be further provided with a menu 1101 used to implement a search function, a menu 1102 used to implement an update function, and a menu 1103 used to implement a picture beautification function.

The following provides descriptions with reference to the specific second application scenario and a specific fourth application scenario.

When the second application scenario is implemented, as shown in FIG. 10, the user can play a video file by using the second-level menu interface corresponding to the target first-level menu "video". For details, specifically refer to the second application scenario, and details are not described herein again.

In this embodiment, a file type switching operation can be performed in the fourth application scenario.

Figure 13:
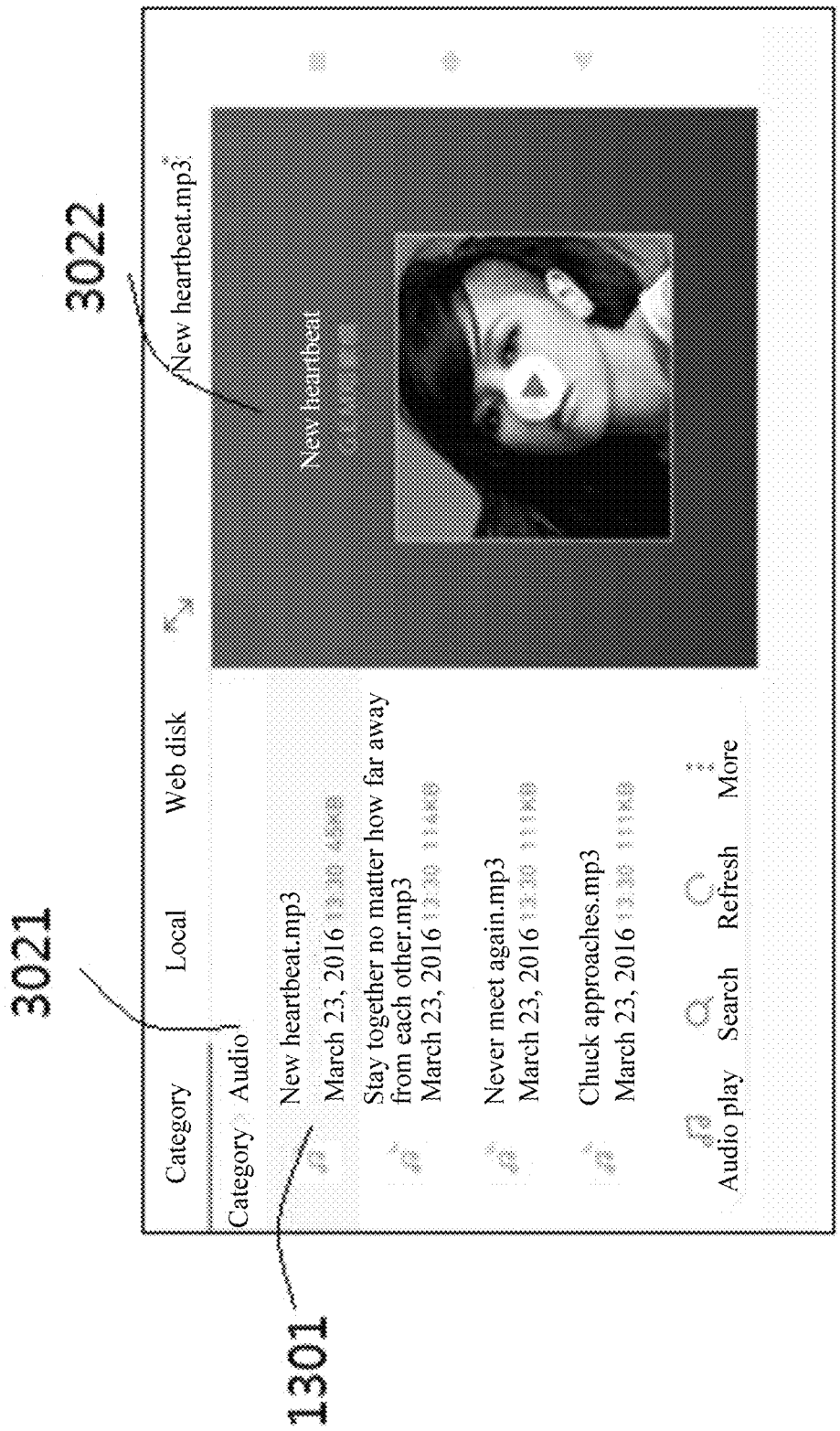
FIG. 13 is a schematic diagram of another application scenario to which an application interface display method is applied according to an embodiment of the present invention.

Specifically, the user touches a location that is in the transparent first region 3021 and that corresponds to the menu "category" 1001, to enter the first coordinates corresponding to the menu "category" 1001 of the first application. The terminal device sends the first coordinates corresponding to the "category" 1001 to the first application. The first application detects that the menu "category" receives the touch event entered by the user, and displays the first menu interface (as shown in FIG. 6) in the third region 3011 of the first application. If the user needs to play an audio file, the user may touch a location that is in the first region 3021 and that corresponds to the first-level menu "audio". The terminal device may send the first coordinates corresponding to the first-level menu "audio" to the first application. As shown in FIG. 13, the first application displays, based on the first coordinates corresponding to the first-level menu "audio" by using the third region 3011, the second-level menu interface corresponding to the first menu "audio". The second-level menu interface displays different second-level menus corresponding to different audio files stored by the terminal device or the web disk.

If the user wants to listen to audio "new heartbeat", the user may touch a location that is in the transparent first region 3021 and that corresponds to a target second-level menu 1301. After the target second-level menu 1301 receives the touch event entered by the user, the target second application that can play audio plays the audio "new heartbeat" in the second region 3022.

Optionally, in a process of playing the audio "new heartbeat", in this embodiment, the target second application that can play audio is not limited, for example, the target second application may be Baidu Music or Kuwo Music.

Optionally, in this embodiment, content displayed when the audio is played in the second region 3022 of the target second application is not limited. For example, a name of a currently played audio file may be displayed in the second region 3022. In this application scenario, information "new heartbeat" may be displayed in the second region 3022, so that the user determines that the currently played audio file is "new heartbeat".

Further optionally, in this embodiment, a progress of the currently played audio may be further displayed in the second region 3022 of the target second application. For example, a progress bar is used to indicate a progress of an audio file currently played by the user. Lyrics, a picture, singer information, and/or the like corresponding to the currently played audio file may be further displayed in the second region 3022.

Step 710: Send second coordinates to the target second application.

In this embodiment, the second coordinates are coordinates that are of the touch event entered by the user and that are in the second region 3022.

If the terminal device determines that the touch event entered by the user is in the second region 3022, because the second region 3022 is a non-transparent region, it indicates that the touch event entered by the user targets the target second application, and that an object of the touch event entered by the user is an interface element in the second region 3022 of the target second application. In this case, the terminal device may send the second coordinates that are currently touched by the user and that are on the display screen of the terminal device to the target second application.

Step 711: The second application performs a function corresponding to the second coordinates.

In this embodiment, the function that can be performed by the target second application based on the second coordinates is not limited.

For example, if the target second application is an application used to play a video file, and the second coordinates are within a preset region of the second region 3022, the target second application may pause playing of a video file. FIG. 10 is used as an example. If the second coordinates entered by the user are in a window 1002 for playing a video file, the target second application pauses playing of the video file "Descendants of the Sun".

If the target second application pauses playing of a video file, and the target second application detects a touch event entered by the user again in the preset region, the target second application may play the video file again.

Figure 14:
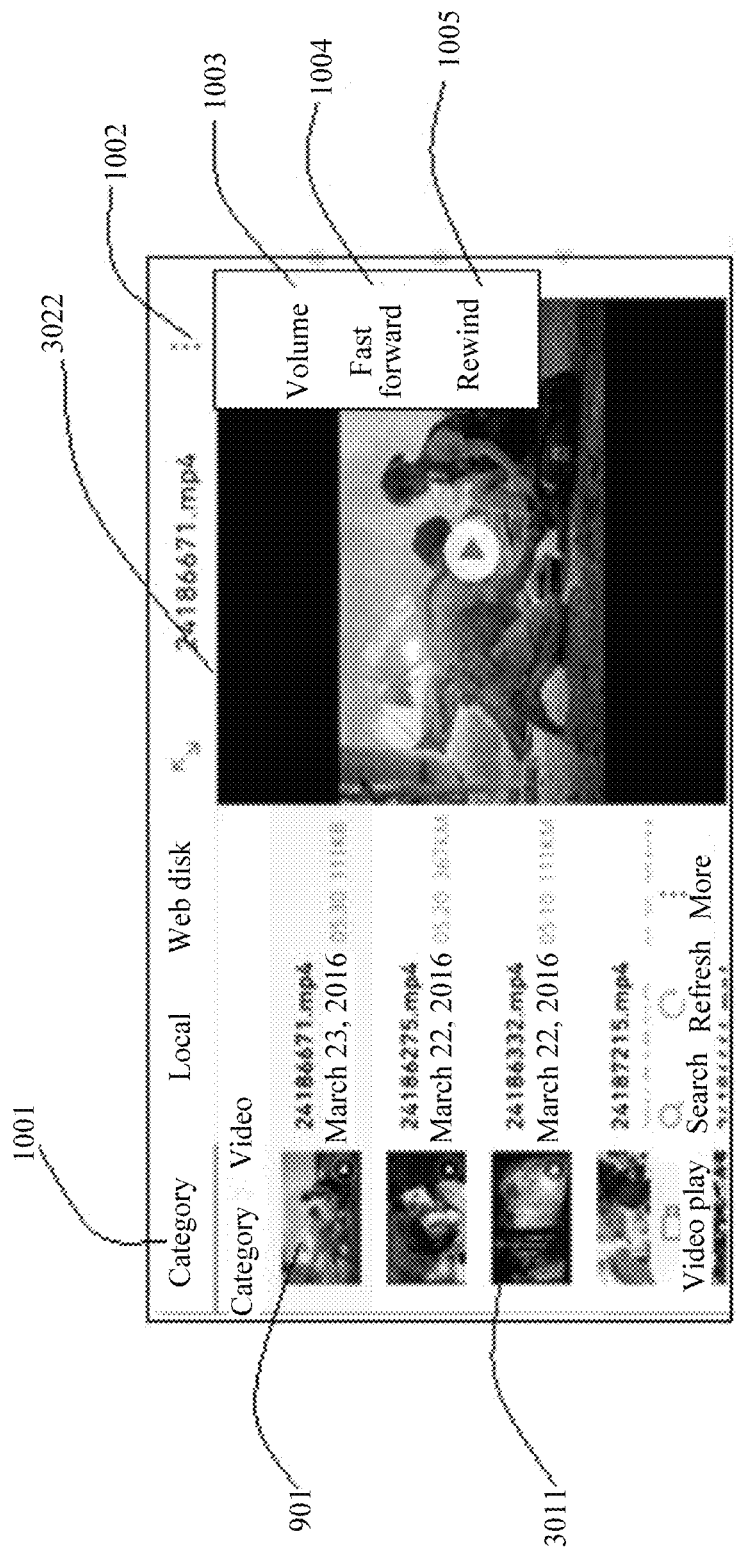
FIG. 14 is a schematic diagram of another application scenario to which an application interface display method is applied according to an embodiment of the present invention.

For another example, as shown in FIG. 14, if the second region 3022 may be provided with a drop-down list item 1002, and the second coordinates sent by the terminal device to the target second application correspond to the drop-down list item 1002, the drop-down list item 1002 may display a plurality of submenus to the user. In this embodiment, functions that can be implemented by the submenus are not limited. For example, a submenu 1003 can implement adjustment of a volume of a video file that is currently being played by the target second application, the submenu 1004 can implement fast-forward processing on a video file that is currently being played by the target second application, and the submenu 1005 can implement rewind processing on a video file that is currently being played by the target second application.

Figure 15:
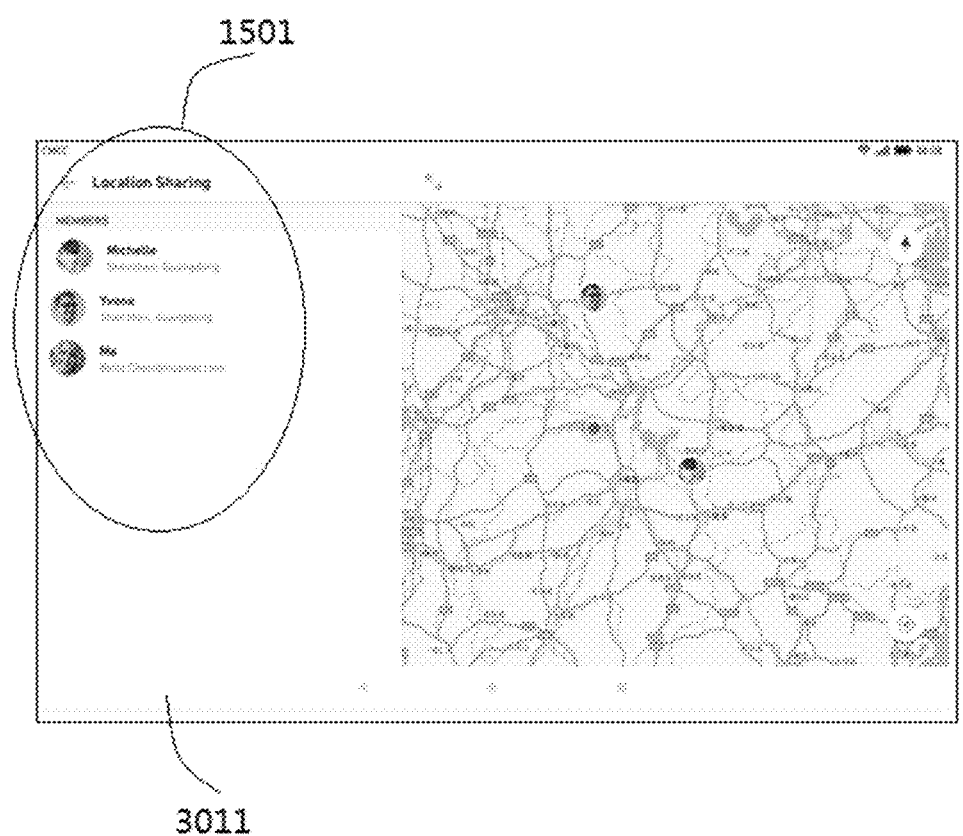
FIG. 15 is a schematic diagram of another application scenario to which an application interface display method is applied according to an embodiment of the present invention.

The following describes a fifth application scenario provided in this embodiment with reference to FIG. 15.

In this application scenario, the first application is a contact application, and contacts stored by the terminal device are displayed in the third region 3011 of the first application. The user may touch the transparent first region 3021 to select at least one contact, and the mobile device may send the first coordinates corresponding to the contact selected by the user to the first application.

As shown in FIG. 15, the first application may arrange the contact selected by the user and display the contact in the third region 3011 based on the first coordinates.

Specifically, the first-level menu interface of the first application may display all contacts stored by the terminal device, and the user may touch the first region 3021 to enter the touch event. The terminal device may send the first coordinates that are currently touched by the user and that are on the display screen of the terminal device to the first application. The first application may determine a target contact that is of the contacts displayed on the first-level menu interface and that corresponds to the first coordinates.

The first terminal may display, on a second-level menu 1501 of the terminal device, all target contacts selected by the user.

In this embodiment, the target second application is an application for navigation. For example, the target second application may be Baidu Maps.

In this embodiment, the terminal device can send location request information to a target terminal device of a target contact selected by the user. The target contact sends target location information to the terminal device based on the location request information by using the target terminal device, where the target location information is location information of the target contact.

The terminal device sends the target location information to the target second application. The target second application may mark, by using the target location information, a location of the target contact on a map displayed in the target second application.

In this application scenario, the user can simultaneously select target contacts and view locations of the target contacts on the map, thereby improving user operation efficiency.

The following describes a sixth application scenario provided in this embodiment.

Figure 16:
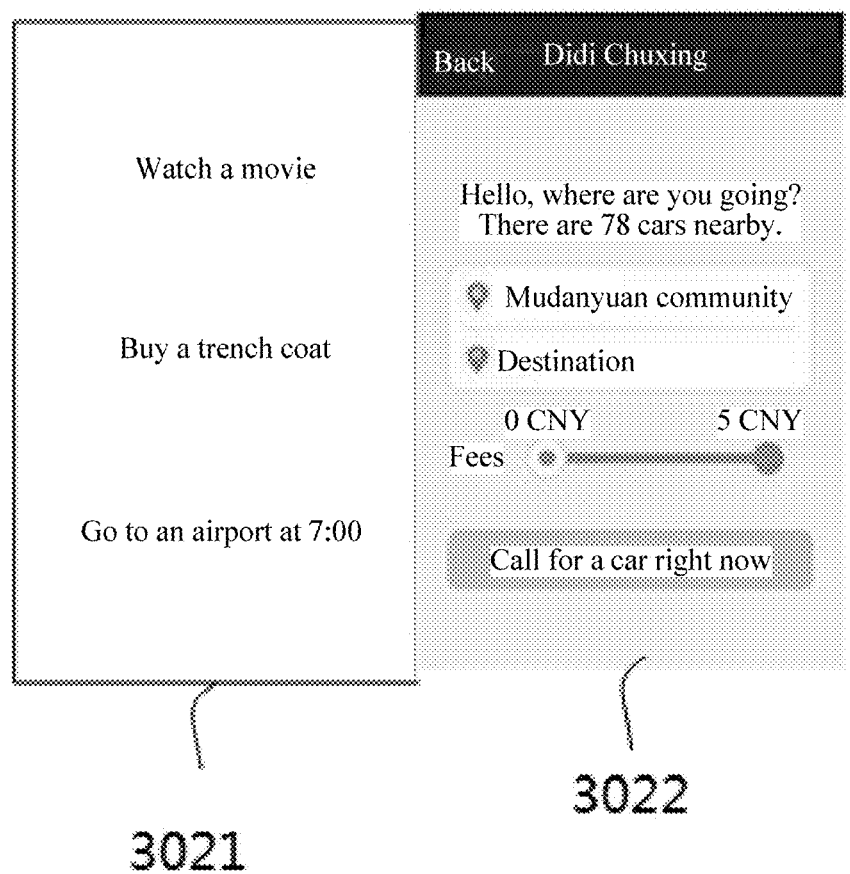
FIG. 16 is a schematic diagram of another application scenario to which an application interface display method is applied according to an embodiment of the present invention.

In this application scenario, the first application is a memo application. As shown in FIG. 16, a first-level menu interface is displayed in the third region 3011 of the first application, and the first-level menu interface displays to-be-handled items that are recorded by the user.

The user may touch the transparent first region 3021 to select at least one to-be-handled item, and then the terminal device may determine the target second application based on the target to-be-handled item that is selected by the user.

As shown in FIG. 16, if the first coordinates entered by the user in the first region 3021 correspond to a to-be-handled item of watching a movie, the terminal device may determine that the target second application is an application such as iQiyi or Youku that can play a video, or the terminal device determines that the target second application is an application such as Maoyan by using which a movie ticket can be bought.

If the first coordinates entered by the user in the first region 3021 correspond to a to-be-handled item of buying a trench coat, the terminal device may determine that the target second application is an application such as Taobao or Jingdong by using which shopping can be done.

If the first coordinates entered by the user in the first region 3021 correspond to a to-be-handled item of going to an airport at Too, the terminal device may determine that the target second application is Didi Chuxing, China Auto Rental, or the like.

In this application scenario, an example in which the target to-be-handled item is going to an airport at Too and the target second application is Didi Chuxing is used for description.

In this application scenario, an application interface of Didi Chuxing is displayed in the second region 3022 of the target second application, and the user may perform services such as calling a taxi and paying a fee on the interface of Didi Chuxing.

Figure 32:
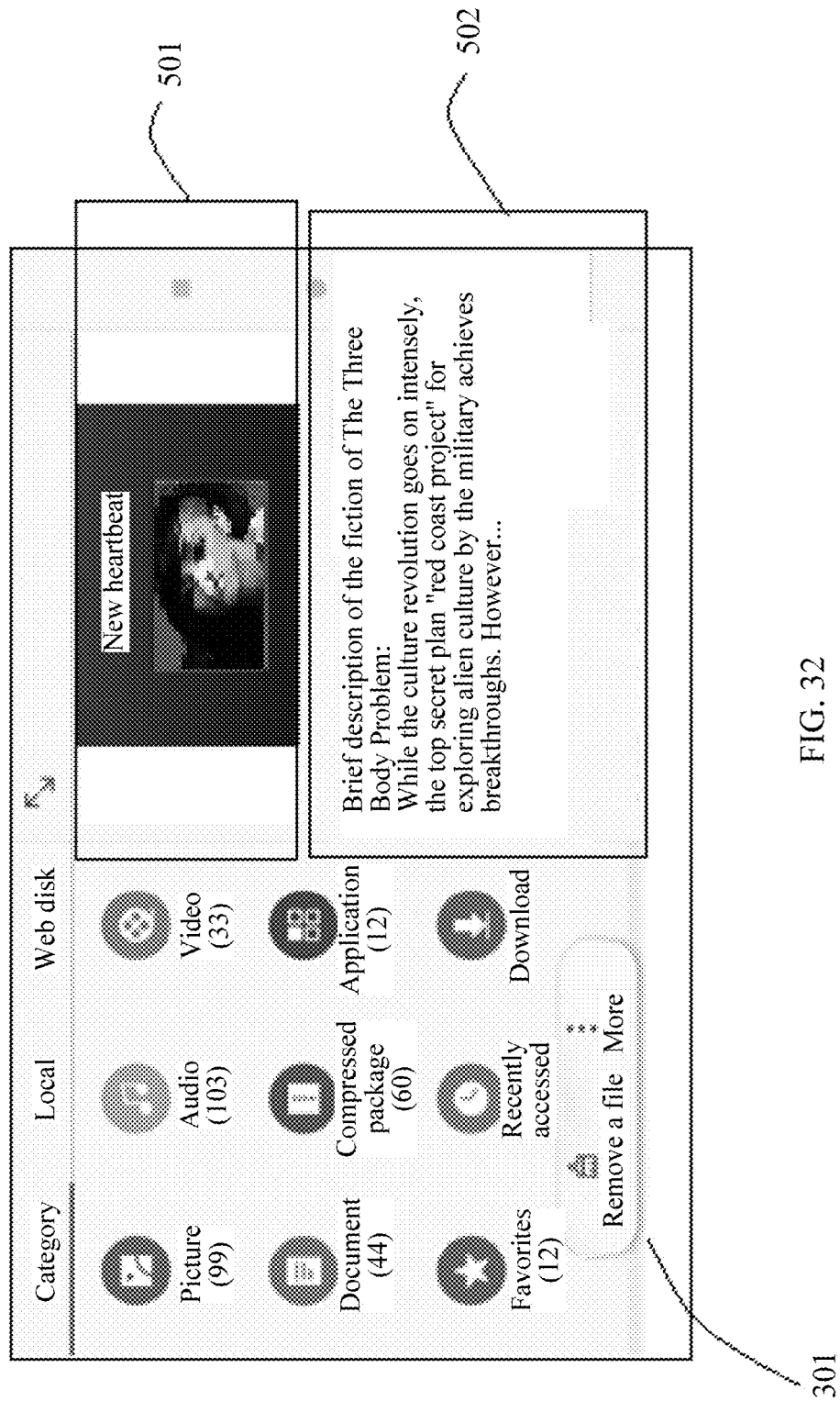
FIG. 32 is a schematic diagram of another application scenario to which an application interface display method is applied according to an embodiment of the present invention.

FIG. 32 is used as an example. In this application scenario, a plurality of application interfaces may be displayed on the display screen of the terminal device, and an example in which there are three application interfaces is used for description.

For details of a structure of arranging three application interfaces on the display screen of the terminal device, refer to FIG. 31. Details are not specifically described in this application scenario.

For details of specific descriptions of the first application 301, refer to the foregoing descriptions. Details are not specifically described in this application scenario.

The second application 302 and a second application 303 are displayed at upper layers of the application interface of the first application 301. The user can start, by entering touch events on two menus of the first application 301 that are used to perform different functions, second applications separately corresponding to the two menus.

For example, the user may enter a touch event on a menu for executing an audio file. For details of a specific process of entering the touch event, refer to the foregoing embodiments. Details are not specifically described in this application scenario.

Specifically, the user touches a menu that can play audio "heartbeat of love", and an application for playing an audio file may play the audio "heartbeat of love" in a region 501.

An application interface of the application for playing an audio file is split into a transparent region and a non-transparent region. The region 501 for playing the audio file is the non-transparent region, and the remaining region through which an interface element on another application interface can be displayed is the transparent region.

If the user wants to read a fiction while listening to audio, the user may enter a touch event on a menu for executing a document file. For details of a specific process of entering the touch event, refer to the foregoing embodiments. Details are not specifically described in this application scenario.

Specifically, the user touches a menu that can display a document "The Three Body Problem", and an application for displaying a document may display the document "The Three Body Problem" in a region 502.

An application interface of the application for displaying a document is split into a transparent region and a non-transparent region. The region 502 for displaying a document is the non-transparent region, and the remaining region through which an interface element on another application interface can be displayed is the transparent region.

Figure 36:
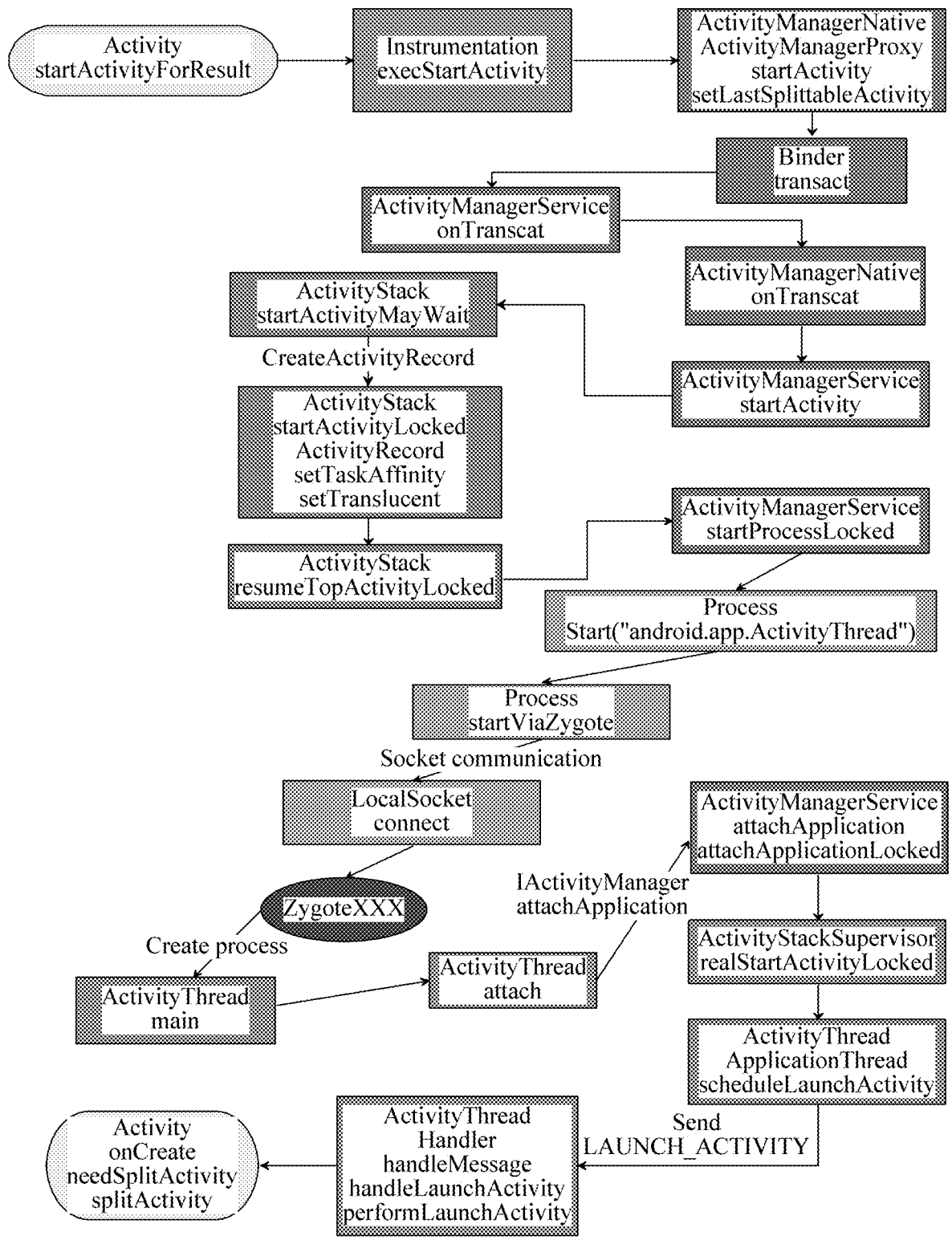
FIG. 36 is a flowchart of software for implementing an application interface display method according to an embodiment of the present invention.
Figure 37:
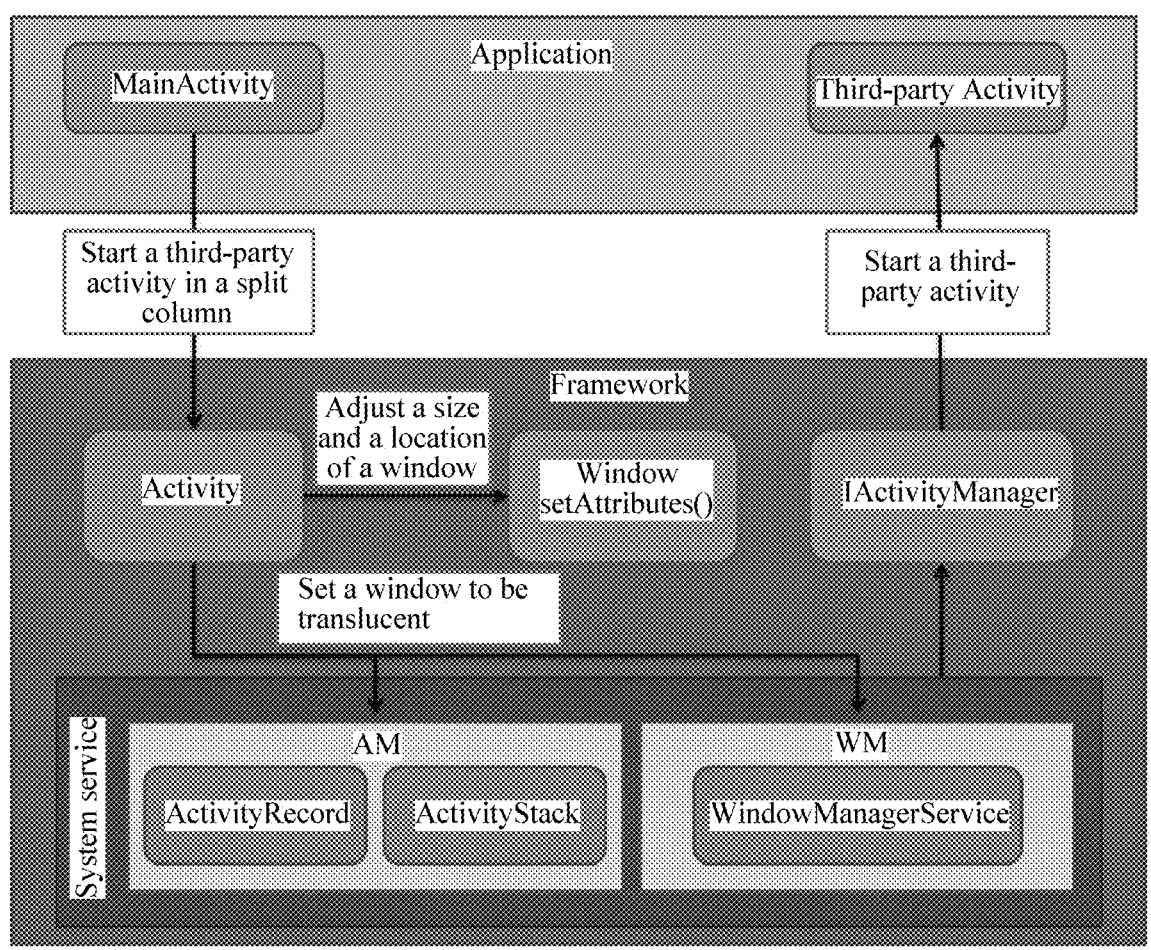
FIG. 37 is another flowchart of software for implementing an application interface display method according to an embodiment of the present invention.

The following describes, from the perspective of a procedure of steps, the application interface display method provided in this embodiment. In this embodiment, for a flowchart of software of the application interface display method, refer to FIG. 36 or FIG. 37. For details of a specific execution process of FIG. 36 or FIG. 37, refer to the foregoing descriptions. Details are not specifically described in this embodiment.

In the method of this embodiment, the application interface of the first application and the application interface of the second application simultaneously displayed on the terminal device can be simultaneously in an active state, and the first application and the second application can implement operation interaction. For example, the user touches different menus on the first application, so that the second application implements different functions corresponding to the different menus. The user can simultaneously operate applications displayed on the display screen of the terminal device, thereby effectively improving efficiency of operating the terminal device by the user.

In the foregoing embodiment, how application interfaces of different applications are simultaneously displayed on the display screen of the terminal device is described. The following describes, with reference to FIG. 17, how different levels of application interfaces of a same application are simultaneously displayed on the display screen of the terminal device.

Step 1701: Start an application that displays a first-level application interface.

In this embodiment, the application has two or more levels of application interfaces.

An N$^{th}$-level application interface of the application can receive a touch event entered by a user, and the N$^{th}$-level application interface of the application can perform interface jump based on the touch event entered by the user, to display an (N+1)$^{th}$-level application interface of the application.

N is a positive integer greater than or equal to 1.

Figure 18:
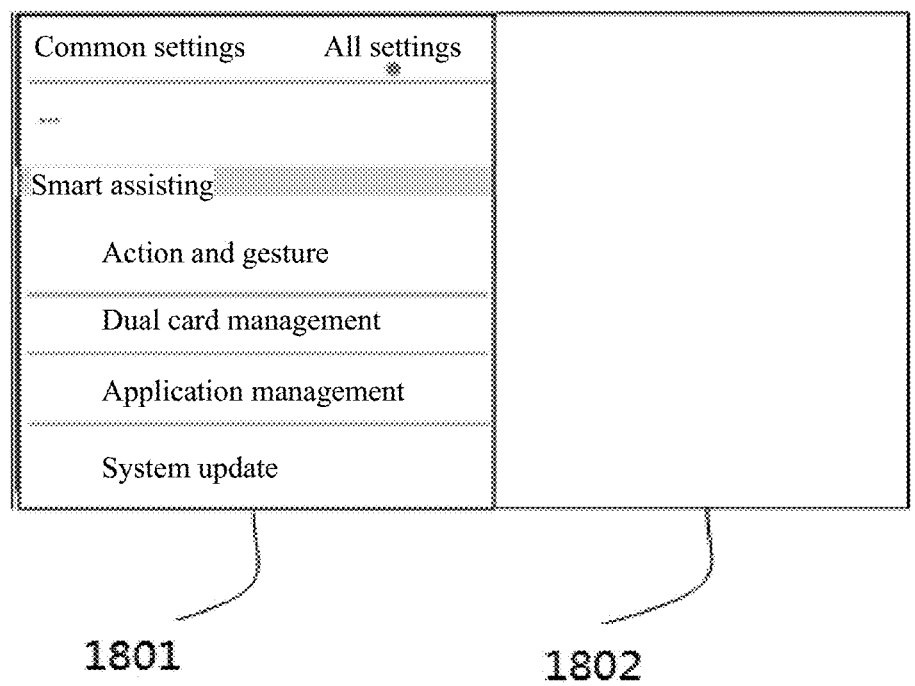
FIG. 18 is a schematic diagram of another application scenario to which an application interface display method is applied according to an embodiment of the present invention.

FIG. 18 is used as an example. An application shown in FIG. 18 is system setting. The left side shown in FIG. 18 is a schematic structural diagram of the first-level application interface of the application that is displayed by the terminal device. In this embodiment, the first-level application interface of the application is an application interface first displayed when the application is started.

Different menus displayed on the first-level application interface of the application can implement setting of different functions of the terminal device.

For example, a menu "dual card management" on the first-level application interface of the application can implement management of two SIM cards that can be installed in the terminal device.

It should be noted that, in this embodiment, the menu displayed on the first-level application interface of the terminal device is an optional example, and is not limited.

In this embodiment, as shown in FIG. 18, all interface elements of the first-level application interface of the application are displayed in a fifth region 1801 of the application, and the fifth region 1801 is on the left side of the application interface of the application.

No interface element is displayed in a sixth region 1802 of the application, that is, the sixth region 1802 is a blank region. In this embodiment, the fifth region 1801 and the sixth region 1802 are disposed in parallel and are isolated from each other.

Step 1702: If a target first-level menu displayed on the first-level application interface of the application receives a touch event, display, in a preset mode, a second-level application interface corresponding to the target first-level menu.

In this embodiment, the target first-level menu is a menu that is on the first-level application interface of the application and that has received the touch event entered by the user.

FIG. 18 is used as an example. If the user touches a menu "action and gesture", the terminal device may determine that the menu "action and gesture" is the target first-level menu.

In this embodiment, if the user enters the touch event on the menu "action and gesture", the display screen of the terminal device displays, in the preset mode, the second-level application interface corresponding to the target first-level menu.

The following describes how the terminal device displays, in the preset mode, the second-level application interface corresponding to the target first-level menu.

In this embodiment, for example, the target first-level menu is "action and gesture".

The terminal device obtains the second-level application interface corresponding to the target first-level menu "action and gesture", and the terminal device processes the second-level application interface.

Figure 19:
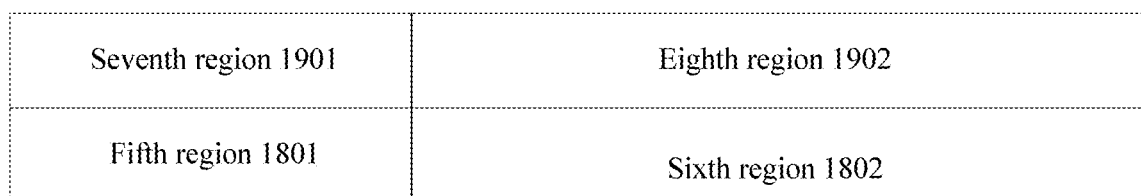
FIG. 19 is another schematic structural diagram of displaying an application interface on a display screen of a terminal device according to the present invention.

Specifically, as shown in FIG. 19, the terminal device splits the second-level application interface into a seventh region 1901 and an eighth region 1902.

For details of a display manner of the fifth region 1801 on the first-level application interface of the application in this embodiment, refer to the display manner of the third region 3011 of the first application in the foregoing embodiment. For details of a display manner of the sixth region 1802 on the first-level application interface of the application in this embodiment, refer to the display manner of the fourth region 3012 of the first application in the foregoing embodiment. For details of a display manner of the seventh region 1901 on the second-level application interface of the application in this embodiment, refer to the display manner of the first region 3021 of the second application in the foregoing embodiment. For details of a display manner of the eighth region 1902 on the second-level application interface of the application in this embodiment, refer to the display manner of the second region 3022 of the second application in the foregoing embodiment. A specific display manner is not limited in this embodiment.

As can be seen, in this embodiment, in the preset mode, the seventh region 1901 on the second-level application interface of the application is a transparent region, and all interface elements on the second-level application interface are arranged in the eighth region 1902 for display.

Figure 20:
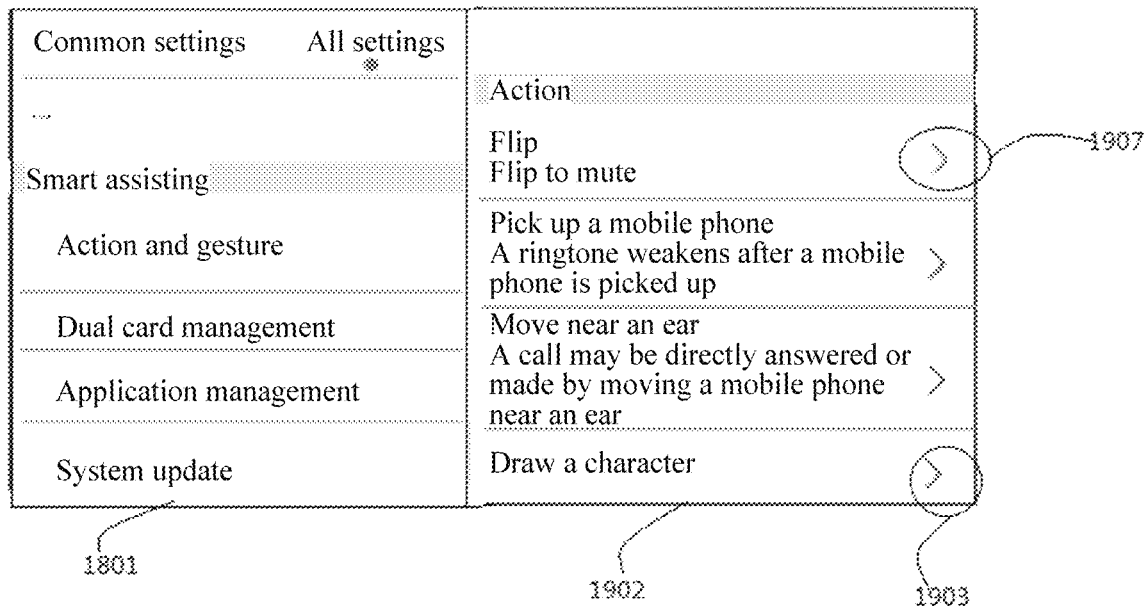
FIG. 20 is a schematic diagram of another application scenario to which an application interface display method is applied according to an embodiment of the present invention.

As can be known from FIG. 20, in the method of this embodiment, the first-level application interface and the second-level application interface of the application can be simultaneously displayed on the display screen of the terminal device.

For details of size and location relationships among the fifth region 1801, the sixth region 1802, the seventh region 1901, and the eighth region, refer to the descriptions of the size and location relationships among the first region 3021, the second region 3022, the third region 3011, and the fourth region 3012 in the foregoing embodiment. Details are not specifically described in this embodiment.

Step 1703: Determine whether the currently received touch event entered by a user is in a seventh region 1901; and if yes, perform step 1704; or if no, perform step 1706.

As shown in FIG. 19, the first-level application interface of the application is at an inner layer of the second-level application interface, and the second-level application interface is at an outer layer of the first-level application interface. For the user, because the seventh region 1901 is a transparent region, visible regions are the fifth region 1801 of the first-level application interface and the eighth region 1902 of the second-level application interface.

When the user enters the touch event on the display screen of the terminal device, a coupling capacitance is generated among a body electric field of the user, a finger tip of the user, and a location that is touched by the user and that is on the display screen of the terminal device. The terminal device determines, based on the coupling capacitance, coordinates that are currently touched by the user and that are on the display screen of the terminal device.

The terminal device may determine, based on the coordinates that are currently touched by the user and that are on the display screen of the terminal device, whether the currently received touch event entered by the user is in the seventh region 1901.

Step 1704: Send first coordinates to the application.

The first coordinates are coordinates of the seventh region 1901 that are currently touched by the user.

If the terminal device determines that the touch event entered by the user is in the seventh region 1901, because the seventh region 1901 is a transparent region, it indicates that the touch event entered by the user targets the first-level application interface of the application, and that an object of the touch event entered by the user is a menu in the fifth region 1801 of the application. In this case, the terminal device may send the first coordinates that are currently touched by the user and that are on the display screen of the terminal device to the application.

Step 1705: The application performs a function of a menu corresponding to the first coordinates.

It should be noted that, in this embodiment, the first-level application interface of the application is always displayed in the fifth region 1801.

In this embodiment, in a process of performing a system setting on the terminal by using the application, the fifth region 1801 is always displayed on the first-level application interface of the application, and different menus on the first-level application interface of the application are used to perform different system settings. Therefore, the user may touch different menus on the first-level application interface of the application based on a system setting requirement.

Figure 21:
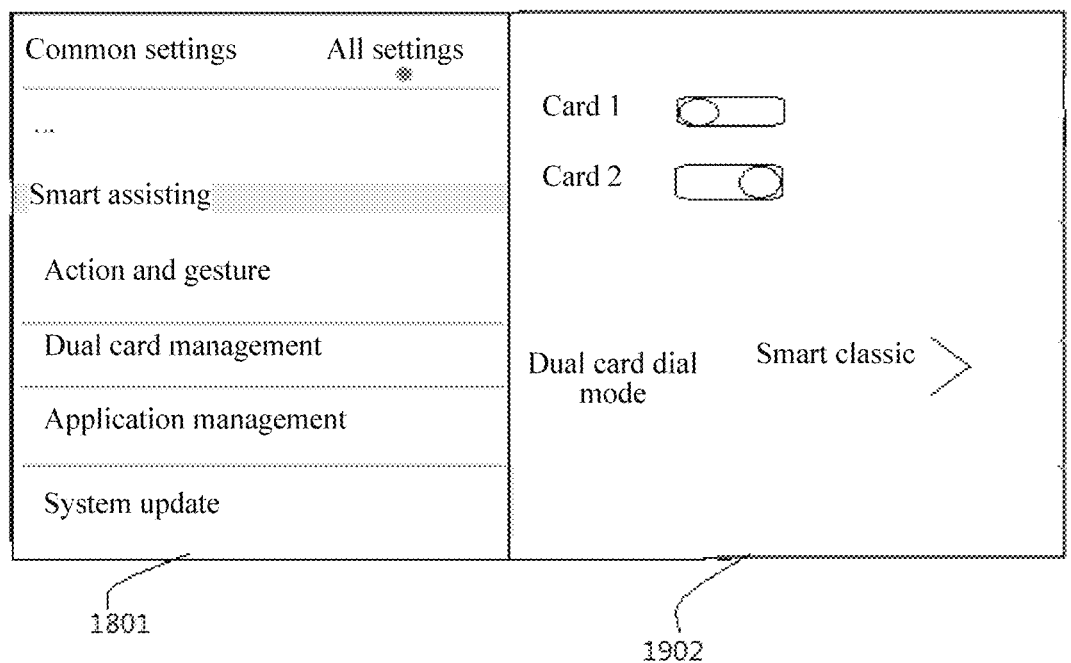
FIG. 21 is a schematic diagram of another application scenario to which an application interface display method is applied according to an embodiment of the present invention.

As shown in FIG. 20, the user is setting the menu "action and gesture". If the user wants to set the menu "dual card management", as shown in FIG. 21, the user may enter a touch event on the menu "dual card management". When the menu "dual card management" receives the touch event entered by the user, a second-level application interface corresponding to the menu "dual card management" is displayed in the preset mode, as shown in the region 1902 in FIG. 21.

Step 1706: Send second coordinates to the application.

In this embodiment, the second coordinates are coordinates of the eighth region 1902 that are currently touched by the user.

If the terminal device determines that the touch event entered by the user is in the eighth region 1902, because the eighth region 1902 is a non-transparent region, it indicates that the touch event entered by the user targets the second-level application interface, and that an object of the touch event entered by the user is a menu on the second-level application interface of the application. In this case, the terminal device may send the second coordinates that are currently touched by the user and that are on the display screen of the terminal device to the application.

Step 1707: The application performs a function corresponding to the second coordinates.

The application may perform a corresponding function based on the second coordinates. In this embodiment, the function that can be performed by the application based on the second coordinates is not limited.

That the application performs a jump function based on the second coordinates is described with reference to FIG. 20 and FIG. 22.

First, referring to FIG. 20, the user determines, based on a menu displayed on the second-level application interface, a manner of setting an action that can be performed by the terminal device.

For example, on a menu "flip", a function that can be performed by flipping the terminal device can be set.

For another example, on a menu "pick up a mobile phone", a function that can be performed by picking up the terminal device can be set.

For another example, on a menu "move near an ear", a function that can be performed by moving the terminal device to an ear of the user can be set.

For another example, on a menu "draw a character", a function that can be performed by drawing a character on the display screen of the terminal device can be set.

If the user wants to set the menu "draw a character", the user may directly enter the touch event on the menu "draw a character" 1903.

If the terminal device detects the touch event entered by the user on the menu "draw a character" 1903, the terminal device sends the second coordinates of the touch event entered by the user to the application. To complete setting of the menu "draw a character", the application displays, in the preset mode, a third-level application interface corresponding to the menu "draw a character".

Figure 22:
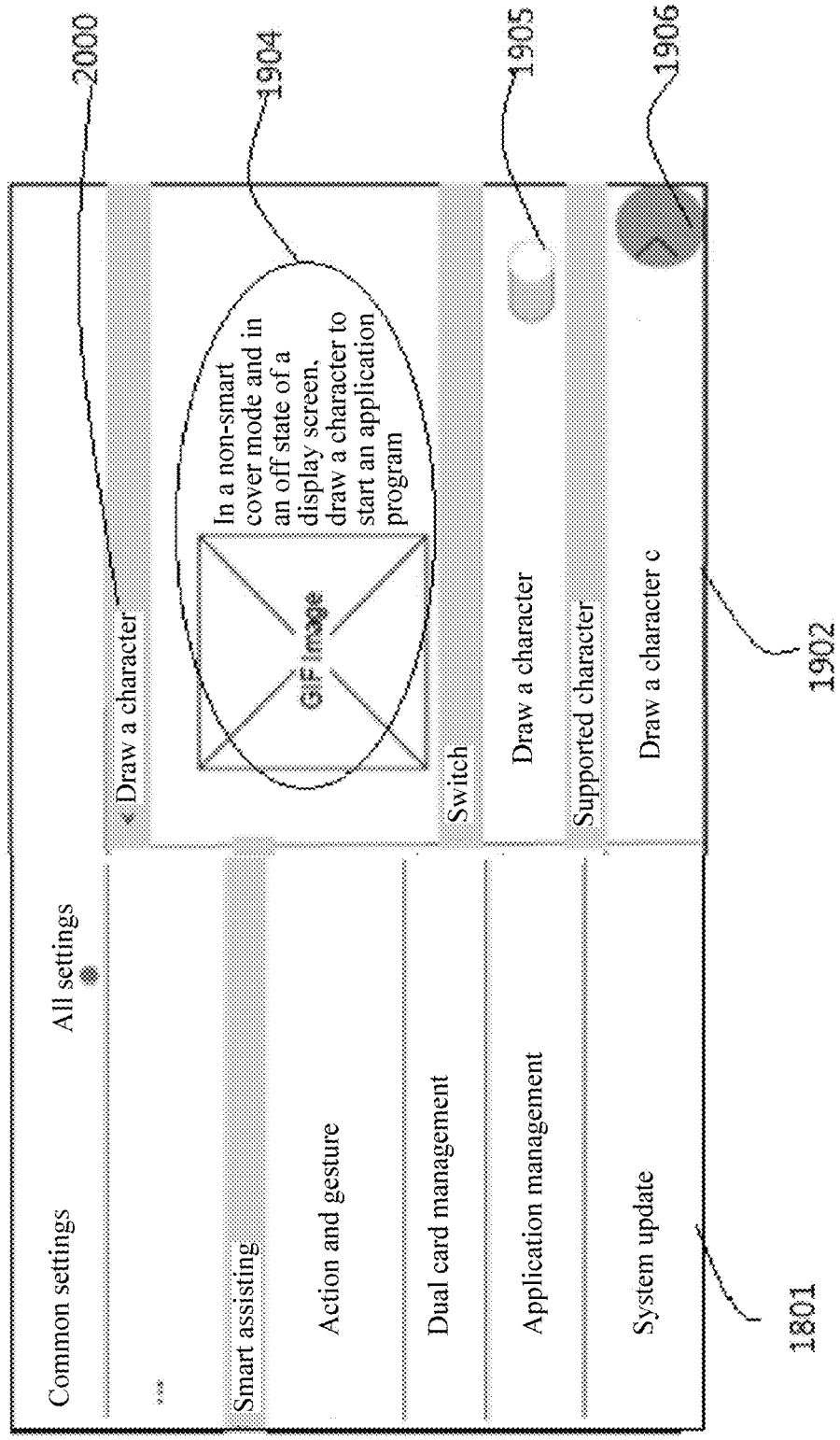
FIG. 22 is a schematic diagram of another application scenario to which an application interface display method is applied according to an embodiment of the present invention.

For a display manner of the third-level application interface corresponding to the menu "draw a character", refer to FIG. 22. As can be known from FIG. 22, the first-level application interface is always displayed in the fifth region 1801, and the third-level application interface corresponding to the menu "draw a character" is displayed in the eighth region 1902 of the application.

In this embodiment, content displayed on the third-level application interface is not limited. For example, the third-level application interface corresponding to the menu "draw a character" displays prompt information 1904. The prompt information 1904 may be used to indicate to the user of a function of the menu "draw a character". In this embodiment, the prompt information 1904 may indicate "in a non-smart cover mode and in an off state of the display screen, drawing a character to start an application program". In this embodiment, specific content included in the prompt information 1904 is an example for description, and is not limited.

The third-level application interface is further provided with a menu 1905, and the user of the menu 1905 determines, based on the touch event entered by the user, whether to start the function of the menu "draw a character".

FIG. 22 is used as an example. If the user wants to draw a character to start an application program in the non-smart cover mode and in the off state of the display screen, the user slides the menu 1905 to the right side. If the user does not want to draw a character to start an application program in the non-smart cover mode and in the off state of the display screen, the user slides the menu 1905 to the left side.

The third-level application interface is further provided with a menu 1906, and the menu 1906 is used to perform application interface jump based on the touch event entered by the user.

Figure 23:
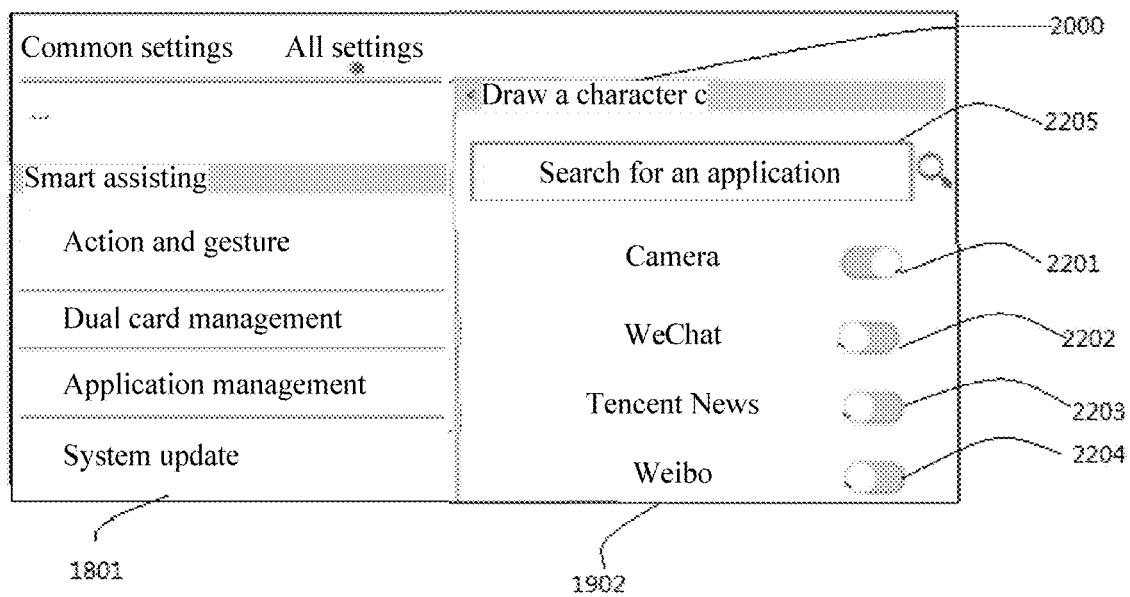
FIG. 23 is a schematic diagram of another application scenario to which an application interface display method is applied according to an embodiment of the present invention.

FIG. 22 and FIG. 23 are used as an example. A system of the terminal device of this embodiment already pre-determines that a character C can be drawn to start a corresponding application in the non-smart cover mode and in the off state of the display screen.

If the menu 1906 receives the touch event entered by the user, a fourth-level application interface corresponding to the menu 1906 is displayed in the eighth region 1902 of the application.

As shown in FIG. 23, the first-level application interface is always displayed in the fifth region 1801 of the application, and the fourth-level application interface corresponding to the menu 1906 is displayed in the eighth region 1902 of the application. The fourth-level application interface corresponding to the menu 1906 displays icons of a plurality of applications, and the user may enter the touch event to select an application corresponding to drawing a character C.

FIG. 23 is used as an example. If the user wants to start a camera by drawing a character, the user may touch a menu 2201 and drag the menu 2201 to slide to the right side.

If the user does not want to start WeChat by drawing a character, the user may touch a menu 2202 and drag the menu 2202 to slide to the left side.

If the user does not want to start Tencent Video News by drawing a character, the user may touch a menu 2203 and drag the menu 2203 to slide to the left side.

If the user does not want to start Weibo by drawing a character, the user may touch a menu 2204 and drag the menu 2204 to slide to the left side.

In this application scenario, the user sets, by entering the touch event, that a character C is drawn to enable a function of an application program camera in the non-smart cover mode and in the off state of the display screen.

Optionally, as shown in FIG. 22, the third-level application interface is further provided with a back menu 2000. If the back menu 2000 receives the touch event entered by the user, the third-level application interface shown in FIG. 22 jumps to a corresponding second-level application interface (as shown in FIG. 20).

Optionally, as shown in FIG. 23, the fourth-level application interface is also provided with a back menu 2000. If the back menu 2000 receives the touch event entered by the user, the fourth-level application interface shown in FIG. 23 jumps to a corresponding third-level application interface (as shown in FIG. 22).

Optionally, in this embodiment, the fourth-level application interface further displays a search component 2205. An application already installed on the terminal device can be searched for by using the search component 2205. For example, if the user wants to perform a function of an application Alipay by drawing the character C, but the fourth application interface provided by the terminal device has not displayed the application Alipay, the user can search for the application Alipay by using the search component 2205. If it is found that the application Alipay is already installed on the terminal device, the application may push a selected menu to the user. The user instructs, by using the selected menu, the terminal to display the application Alipay on the fourth-level application interface.

Optionally, that the application performs an interface jump function based on the second coordinates is described with reference to FIG. 20 and FIG. 24.

First, referring to FIG. 20, the user determines, based on a menu displayed on the second-level application interface, a manner of setting an action that can be performed by the terminal device.

If the user wants to set a menu "flip", the user may directly enter the touch event on the menu "flip" 1907.

If the terminal device detects the touch event entered by the user on the menu "flip" 1907, the terminal device sends the second coordinates of the touch event entered by the user to the application. To complete setting of the menu "flip", the application displays, in the preset mode, a third-level application interface corresponding to the menu "flip".

Figure 24:
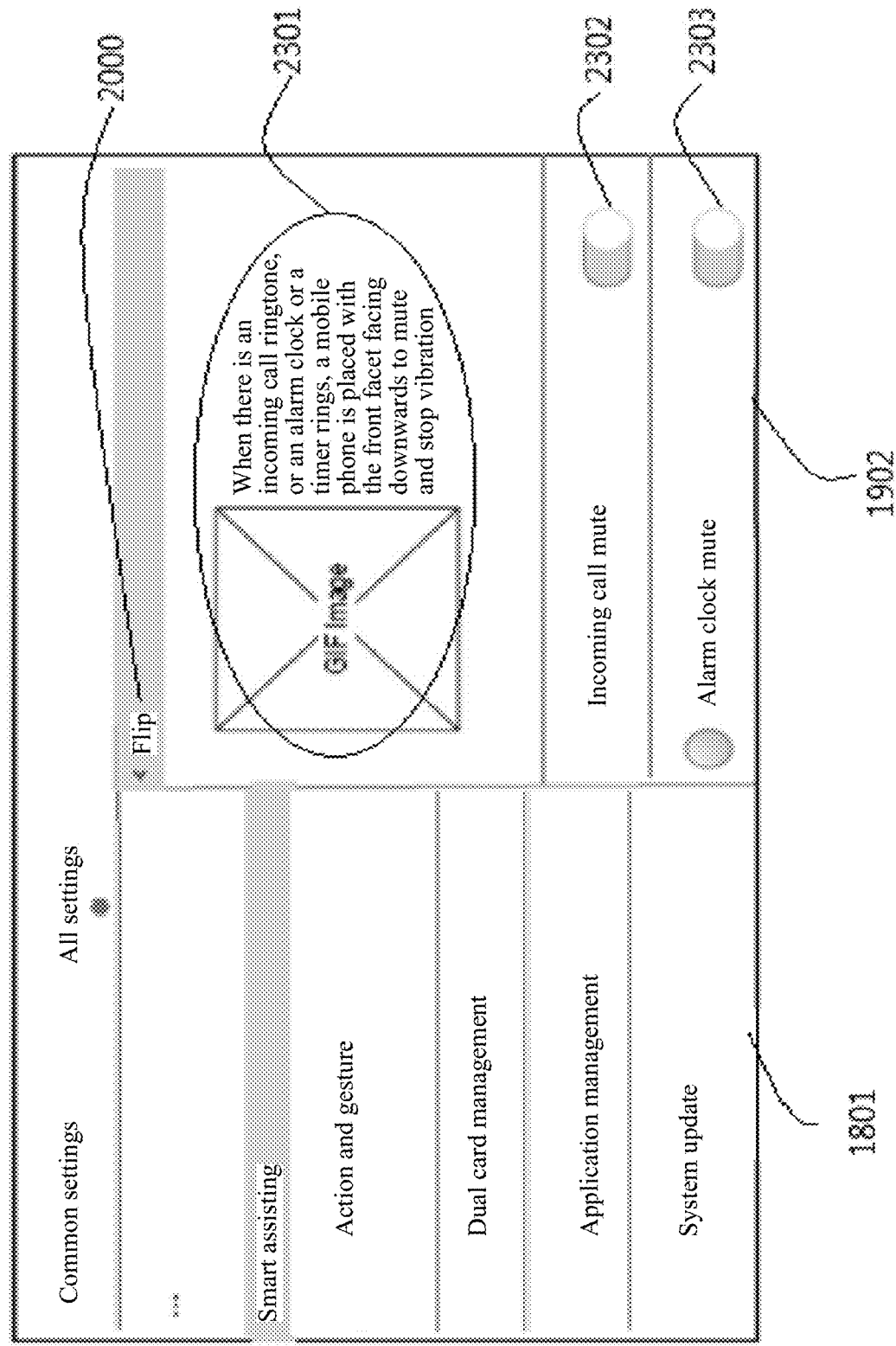
FIG. 24 is a schematic diagram of another application scenario to which an application interface display method is applied according to an embodiment of the present invention.

For a display manner of the third-level application interface corresponding to the menu "flip", refer to FIG. 24. As can be known from FIG. 24, the first-level application interface is always displayed in the fifth region 1801, and the third-level application interface corresponding to the menu "flip" is displayed in the eighth region 1902 of the application.

In this embodiment, content displayed on the third-level application interface is not limited. For example, the third-level application interface corresponding to the menu "flip" displays prompt information 2301. The prompt information 2301 may be used to indicate to the user of a function of the menu "flip". In this embodiment, the prompt information 2301 may indicate "when there is an incoming call ringtone, or an alarm clock or a timer rings, a mobile phone is placed with the front facet facing downwards to mute and stop vibration". In this embodiment, specific content included in the prompt information 2301 is an example for description, and is not limited.

The third-level application interface is further provided with a menu 2302. The user of the menu 2302 determines, based on the touch event entered by the user, whether to mute when there is an incoming call. FIG. 24 is used as an example. If the user wants to place a mobile phone with the front facet facing downwards to mute and stop vibration when there is an incoming call, the user slides the menu 2302 to the right side. If the user does not want to place a mobile phone with the front facet facing downwards to mute and stop vibration when there is an incoming call, the user slides the menu 2302 to the left side.

The third-level application interface is further provided with a menu 2303. The user of the menu 2303 determines, based on the touch event entered by the user, whether to mute an alarm clock. FIG. 24 is used as an example. If the user wants to place a mobile phone with the front facet facing downwards to mute and stop vibration when the alarm clock rings, the user slides the menu 2303 to the right side. If the user does not want to place a mobile phone with the front facet facing downwards to mute and stop vibration when the alarm clock rings, the user slides the menu 2303 to the left side.

Optionally, as shown in FIG. 24, the third-level application interface is further provided with a back menu 2000. If the back menu 2000 receives the touch event entered by the user, the third-level application interface shown in FIG. 24 jumps to a corresponding second-level application interface (as shown in FIG. 20).

The following describes the foregoing steps in entireties with reference to a specific application scenario.

Figure 25:
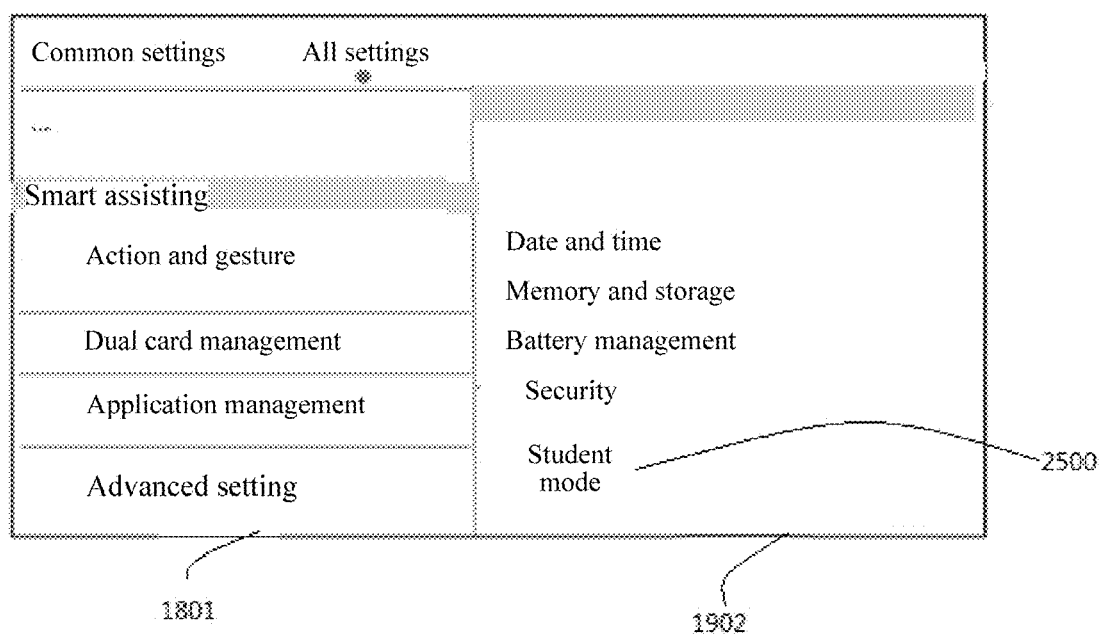
FIG. 25 is a schematic diagram of another application scenario to which an application interface display method is applied according to an embodiment of the present invention.

First, referring to FIG. 25, when the user starts a first-level menu of an application, the user may enter the touch event on a menu that is in the fifth region 1801 and that is used to set a corresponding function. In this application scenario, if the user wants to set "student mode" of the terminal device, the user may enter the touch event on a menu "advanced management" on the first-level application interface.

The terminal device receives the first coordinates entered by the user, and sends the first coordinates to the application. The application determines, based on the first coordinates, that the menu "advanced management" receives the touch event entered by the user. The application displays, in the preset mode on the right side of the display screen of the terminal device, a second-level application interface corresponding to the menu "advanced setting". For detailed descriptions of the preset mode, refer to the foregoing embodiment, and specific content is not limited in this application scenario.

The user can set, by entering the touch event, functions that can be implemented by different menus displayed on the second-level application interface.

In this application scenario, the user enters the touch event on the menu "student mode" 2500. A third-level application interface corresponding to the menu "student mode" 2500 is displayed in the preset mode on the right side of the display screen of the terminal device. For specific content, refer to FIG. 25.

In this embodiment, a quantity of menus displayed on the third-level application interface and functions that can be performed are not limited.

In this application scenario, the user of the menu 2600 on the third-level application interface determines, based on the touch event entered by the user, whether to enable a student mode.

The third-level application interface further displays statistical information, where the statistical information is used to collect statistics on duration for which an application installed on the terminal device is used in a specific time period.

A menu 2601 on the third-level application interface is used to determine a restricted application based on the touch event entered by the user.

Specifically, if the user enters the touch event on the menu 2601, the third-level application interface jumps to a fourth-level application interface corresponding to the student mode. For details, specifically refer to FIG. 27.

In this embodiment, a quantity of applications displayed on the fourth-level application interface corresponding to the student mode is not limited. Specifically, the fourth-level application interface may display all applications installed on the terminal device or some applications installed on the terminal device.

Figure 27:
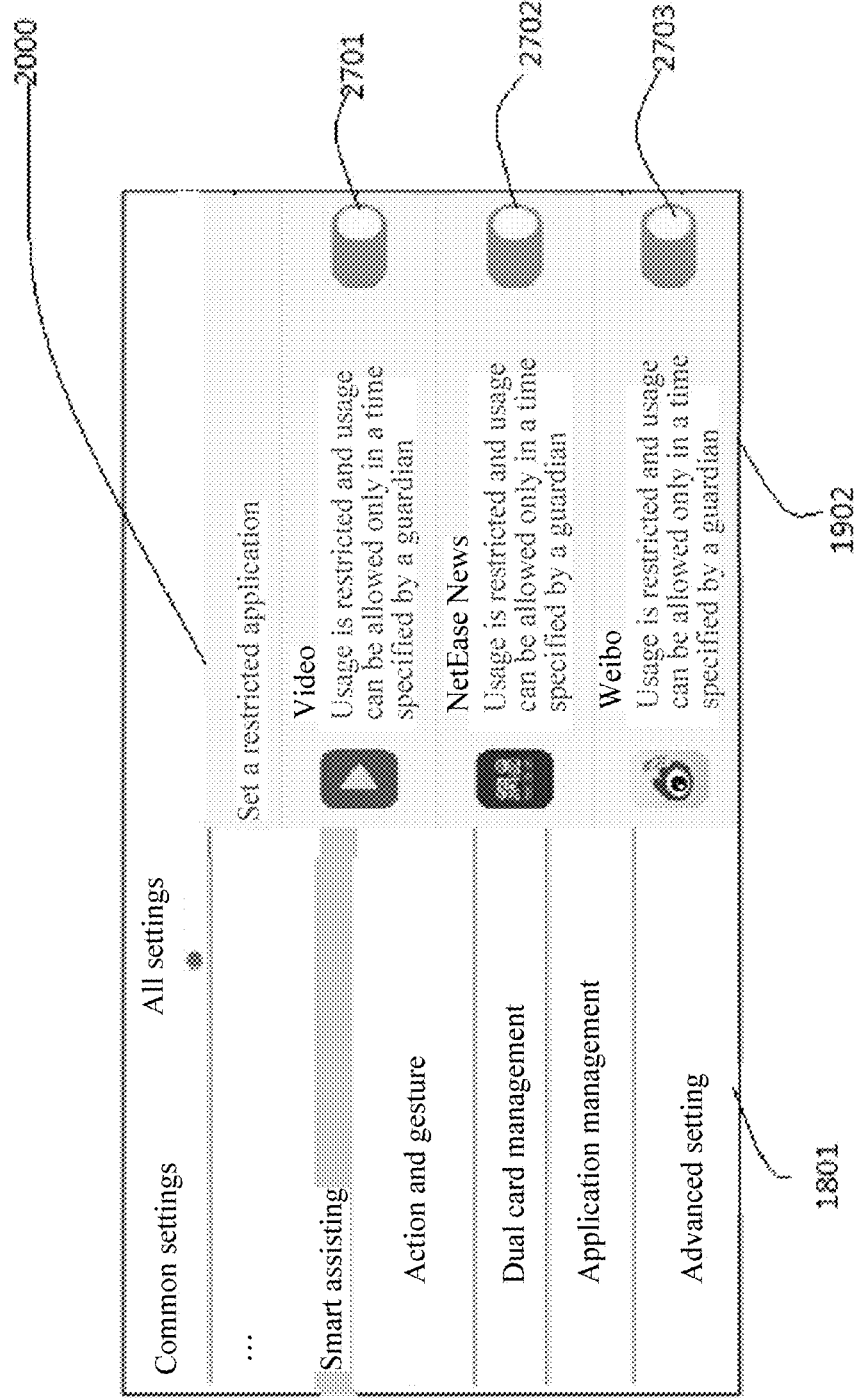
FIG. 27 is a schematic diagram of another application scenario to which an application interface display method is applied according to an embodiment of the present invention.

FIG. 27 is used as an example. The user may enter the touch event on a menu 2701, so that an application "video" is an application in restricted use.

The user may enter the touch event on a menu 2702, so that an application "NetEase News" is an application in restricted use.

The user may enter the touch event on a menu 2703, so that an application "Weibo" is an application in restricted use.

Figure 26:
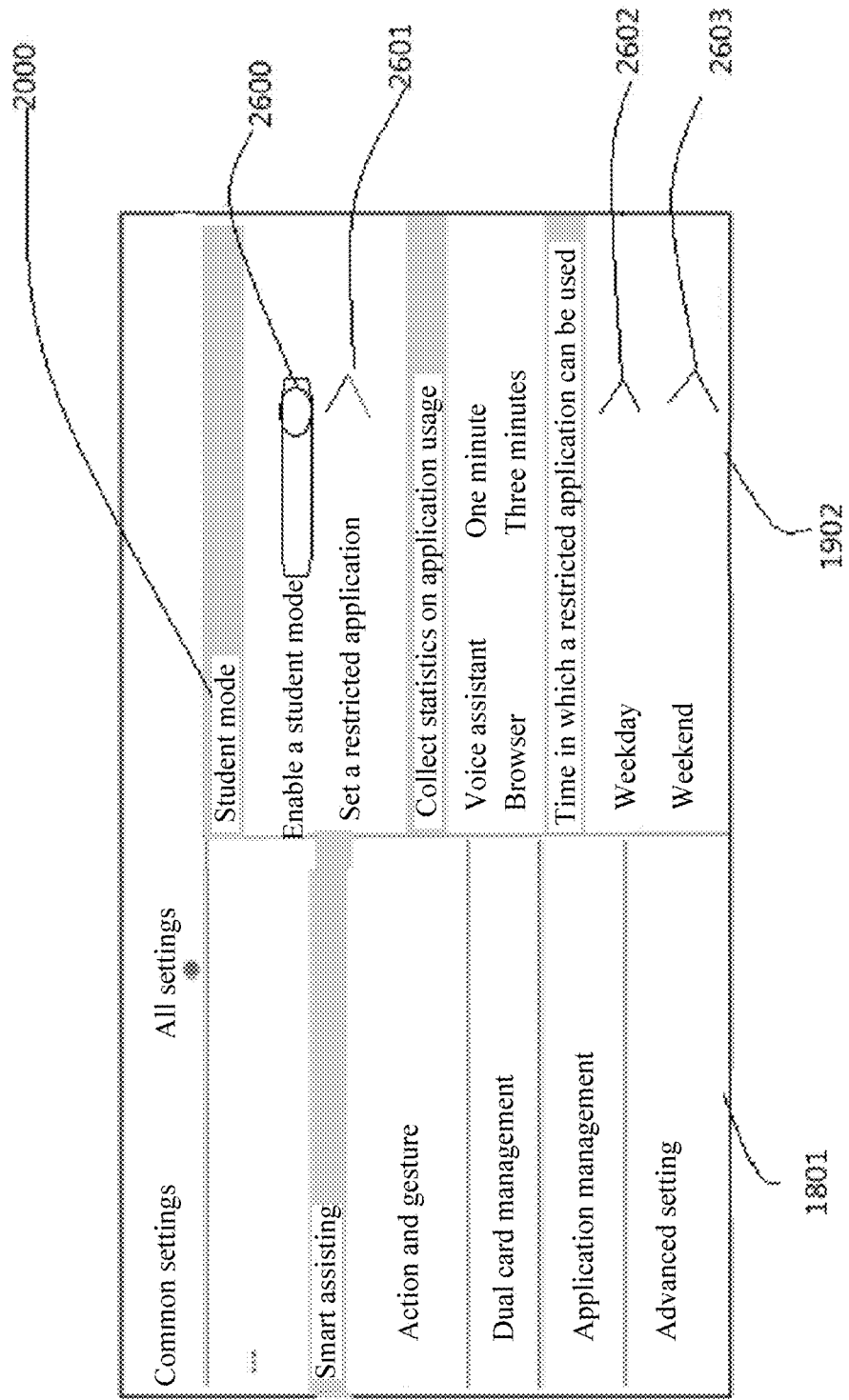
FIG. 26 is a schematic diagram of another application scenario to which an application interface display method is applied according to an embodiment of the present invention.

After the user completes setting an application that needs to be restricted, the user may enter the touch event on the back menu 2000, and the fourth-level application interface jumps to the third-level application interface. Continue to refer to FIG. 26.

The user may further set, by using a menu 2602 on the third-level application interface, a time period in which an application in restricted use is prohibited from being used in weekdays. The user may further set, by using a menu 2603 on the third-level application interface, a time period in which an application in restricted use is prohibited from being used in weekends. A specific setting manner is not described in detail in this application scenario.

In the method of this embodiment, the first-level application interface of the application is always displayed on an inner side, and the $N^{th}$-level application interface is displayed on an outer side of the first-level application interface. N is a positive integer greater than or equal to 2. All the interface elements on the first-level application interface are displayed in the fifth region 1801, and all the interface elements on the $N^{th}$-level interface displayed in the preset mode are displayed in the eighth region 1902, so that the interface elements displayed on the first-level application interface and the $N^{th}$-level application interface of the application are displayed independent from each other and do not block each other.

In the method of this embodiment, the first-level application interface and the $N^{th}$-level application interface simultaneously displayed on the terminal device are simultaneously in the active state, and the first-level application interface and the $N^{th}$-level application interface can implement operation interaction. For example, the user touches different menus on the first-level application interface, so that the display screen of the terminal device displays $N^{th}$-level application interfaces corresponding to the different menus on the first-level application interface. Because the user can simultaneously operate different application interfaces displayed on the display screen of the terminal device, efficiency of operating the terminal device by the user is effectively improved.

The following describes, from the perspective of a procedure of steps, the application interface display method provided in this embodiment. In this embodiment, for a flowchart of software of the application interface display method, refer to FIG. 36 or FIG. 37. For details of a specific execution process of FIG. 36 or FIG. 37, refer to the foregoing descriptions. Details are not specifically described in this embodiment.

As can be seen, when the display screen of the terminal device displays at least two application interfaces, a first-level application interface of this embodiment can navigate a plurality of application interfaces displayed on the display screen of the terminal device, so that the user can clearly and conveniently know a structural relationship between the application interfaces. Therefore, application interfaces of applications are quickly positioned and searched for, and efficiency and accuracy of operating an application by the user are improved.

Figure 33:
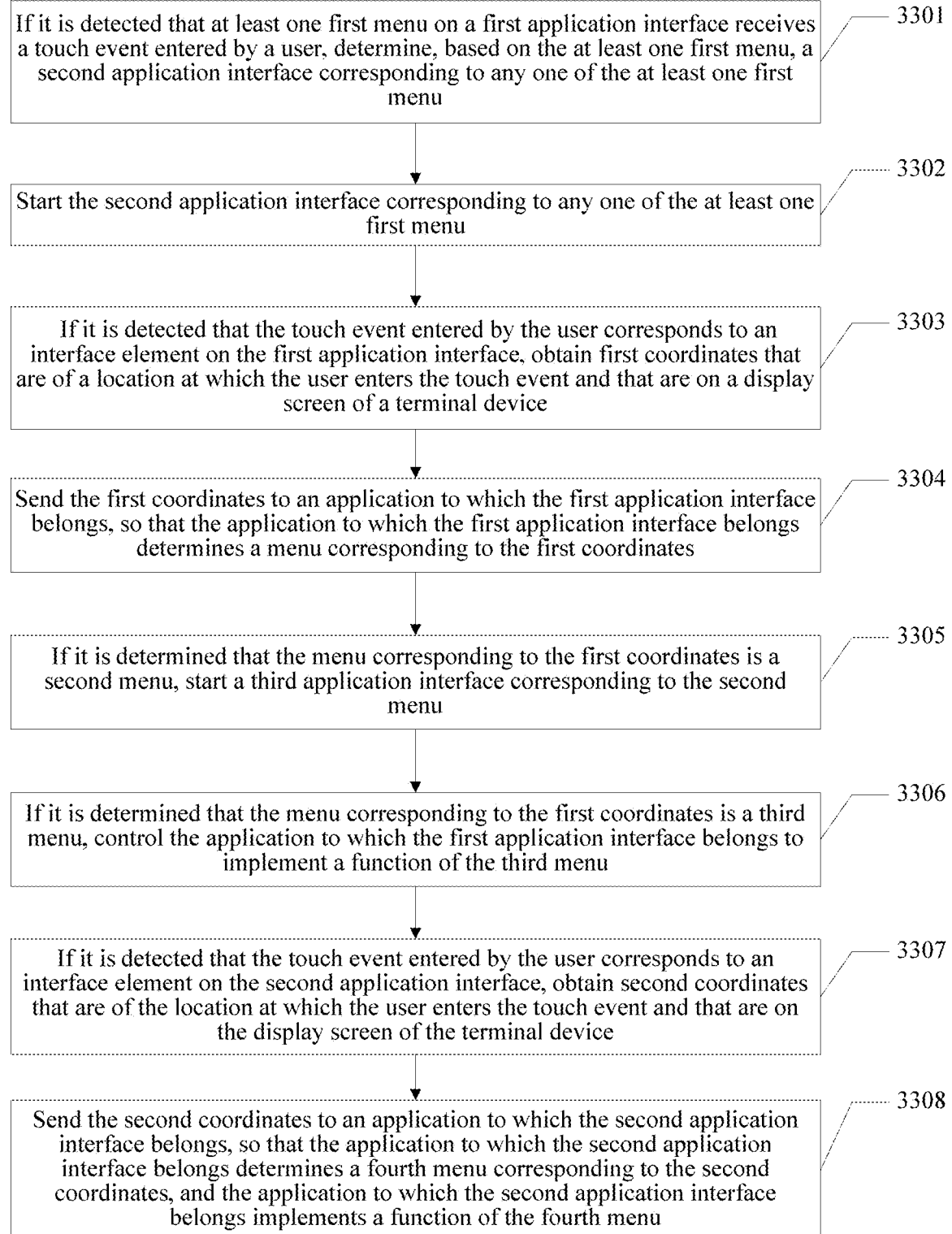
FIG. 33 is a flowchart of steps of an application interface display method according to an embodiment of the present invention.

The following describes, with reference to FIG. 33, an application interface display method provided in the present invention. In the method of this embodiment, a plurality of application interfaces displayed on a display screen of a terminal device can interact with each other in operations.

Specifically, the application interface display method includes the following steps.

Step 3301: If it is detected that at least one first menu on a first application interface receives a touch event entered by a user, determine, based on the at least one first menu, a second application interface corresponding to any one of the at least one first menu.

Step 3302: Start the second application interface corresponding to any one of the at least one first menu.

The second application interface is used to implement a function of the first menu corresponding to the second application interface.

Specifically, in a process of performing step 3302, the terminal device can attach a task of an application to which the second application interface belongs to a task stack of an application to which the first application interface belongs, so that the task of the application to which the second application interface belongs and a task of the application to which the first application interface belongs are in the same task stack.

Step 3303: If it is detected that the touch event entered by the user corresponds to an interface element on the first application interface, obtain first coordinates that are of a location at which the user enters the touch event and that are on a display screen of a terminal device.

Step 3304: Send the first coordinates to an application to which the first application interface belongs, so that the application to which the first application interface belongs determines a menu corresponding to the first coordinates.

Step 3305: If it is determined that the menu corresponding to the first coordinates is a second menu, start a third application interface corresponding to the second menu.

The third application interface is used to replace the second application interface. The second menu is used to start the third application interface corresponding to the second menu, and the second application interface and the third application interface are used to implement different functions.

Step 3306: If it is determined that the menu corresponding to the first coordinates is a third menu, control the application to which the first application interface belongs to implement a function of the third menu.

Step 3307: If it is detected that the touch event entered by the user corresponds to an interface element on the second application interface, obtain second coordinates that are of the location at which the user enters the touch event and that are on the display screen of the terminal device.

Step 3308: Send the second coordinates to an application to which the second application interface belongs, so that the application to which the second application interface belongs determines a fourth menu corresponding to the second coordinates, and the application to which the second application interface belongs implements a function of the fourth menu.

In the method of this embodiment, there are two cases.

In one case, the first application interface and the second application interface belong to different applications, and more specifically, step 3302 includes the following steps: detecting whether the terminal device has stored an application for implementing a function of any one of the at least one first menu; and if it is detected that the terminal device has stored the application for implementing the function of the first menu, starting the second application interface of the application that has been stored by the terminal device and that is used to implement the function of the first menu; or if it is detected that the terminal device has not stored the application for implementing the function of the first menu, downloading the application for implementing the function of the first menu, where the downloading the application for implementing the function of the first menu includes: obtaining an order of applications that are stored on a server and that are used to implement the function of the first menu, where on the server, the applications for implementing the function of the first menu are sorted in descending order of quantities of downloading times, or the applications for implementing the function of the first menu are sorted in descending order of quantities of favorable comments, or the applications for implementing the function of the first menu are sorted in descending order of downloading success probabilities, or the applications for implementing the function of the first menu are sorted in descending order of downloading speeds; and downloading first N applications of the applications that are stored on the server and that are used to implement the function of the first menu, where N is a positive integer greater than or equal to 1.

The second application interface of the application that has been downloaded by the terminal device and that is used to implement the function of the first menu is started.

For specific content of an application interface display procedure performed when the first application interface and the second application interface belong to different applications, refer to FIG. 7. Details are not described in this embodiment.

When the first application interface and the second application interface belong to different applications, an application interface of the first application and an application interface of the second application simultaneously displayed on the terminal device are simultaneously in an active state, and the first application and the second application can interact with each other in operations. For example, the user touches different menus on the first application, so that the second application implements different functions corresponding to the different menus. The user can simultaneously operate applications displayed on the display screen of the terminal device, thereby effectively improving efficiency of operating the terminal device by the user.

In the other case, the first application interface and the second application interface belong to a same application. More specifically, the first application interface is a first-level application interface, and the second application interface is an Mt-level application interface, so that the second application interface is a lower-level application interface of the first application interface, where M is a positive integer greater than 1.

Figure 17:
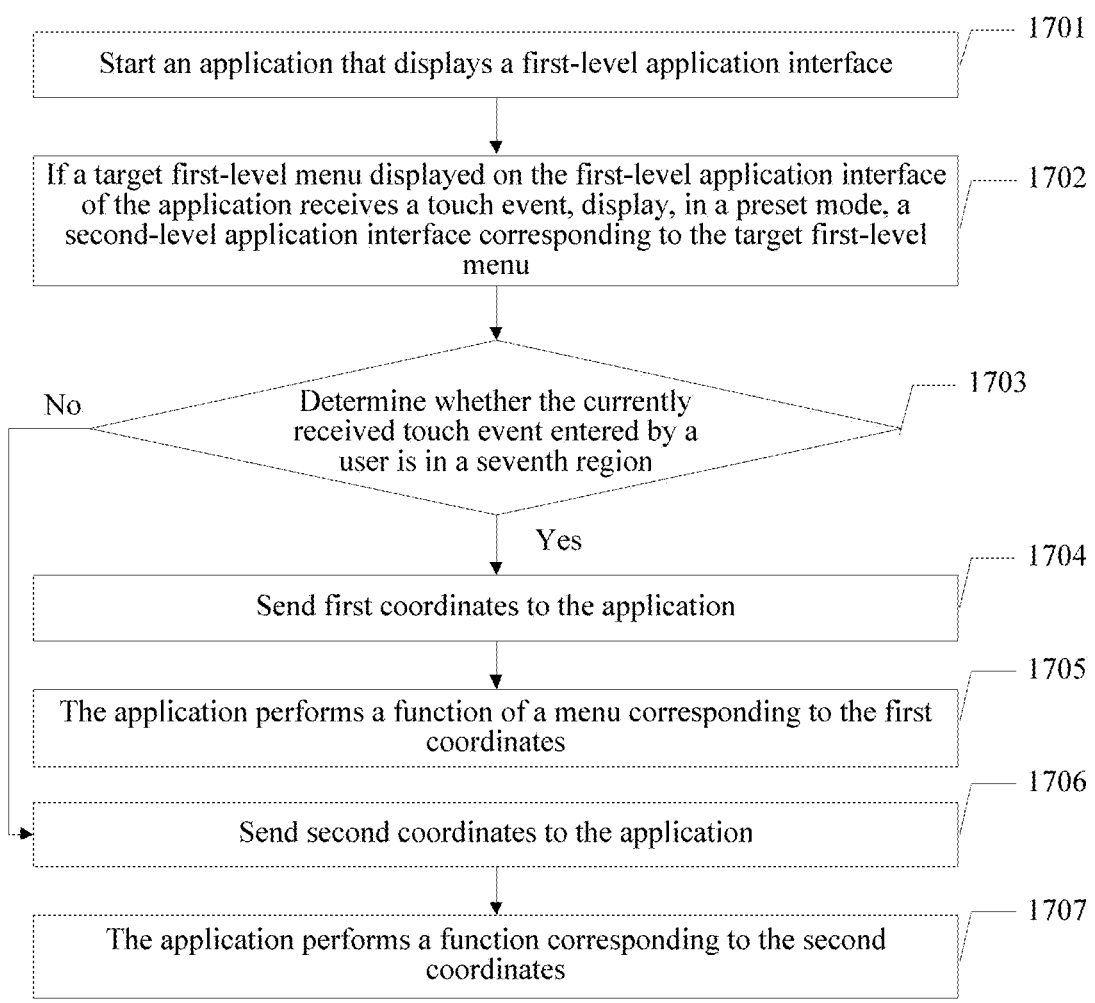
FIG. 17 is a flowchart of steps of an application interface display method according to an embodiment of the present invention.

For specific content of an application interface display procedure performed when the first application interface and the second application interface belong to a same application, refer to FIG. 17. Details are not described in this embodiment.

When the first application interface and the second application interface belong to a same application, and the display screen of the terminal device displays at least two application interfaces, in this embodiment, the first-level application interface can navigate a plurality of application interfaces displayed on the display screen of the terminal device, so that the user can clearly and conveniently know a structural relationship between application interfaces, and application interfaces of an application are quickly positioned and searched for, thereby improving efficiency and accuracy of an application operation.

Figure 34:
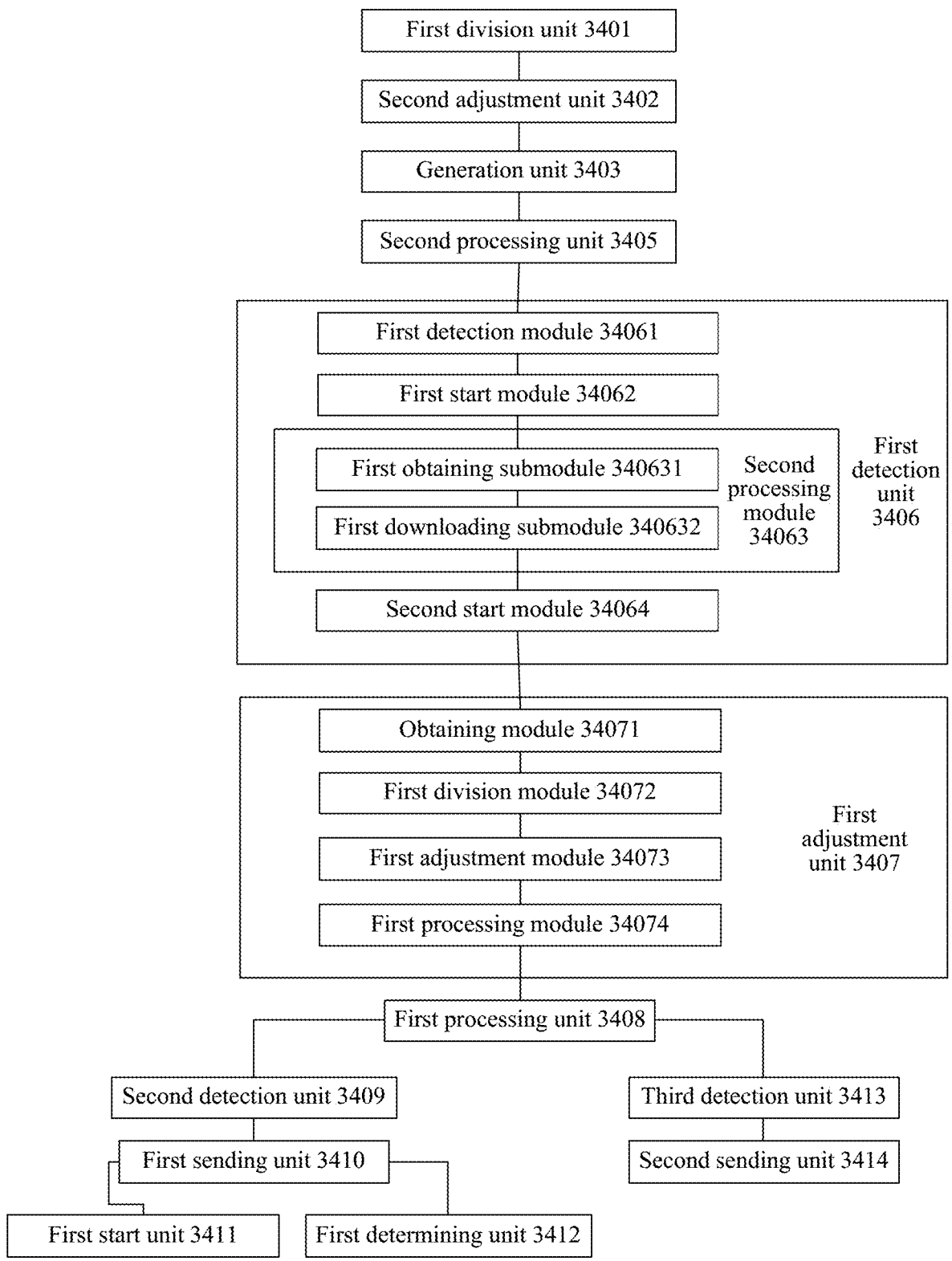
FIG. 34 is a schematic structural diagram of a terminal device according to an embodiment of the present invention.

The following describes a structure of a terminal device provided in the present invention with reference to FIG. 34.

As shown in FIG. 34, the terminal device includes: a first division unit 3401, a second adjustment unit 3402, a generation unit 3403, a second processing unit 3405, a first detection unit 3406, a first adjustment unit 3407, a first processing unit 3408, a second detection unit 3409, a first sending unit 3410, a first start unit 3411, a first determining unit 3412, a third detection unit 3413, and a second sending unit 3414.

The first division unit 3401 is configured to divide the first application interface to form a third region and a fourth region.

The second adjustment unit 3402 is configured to adjust an interface element displayed on the first application interface, so that the interface element of the first application interface is displayed in the third region.

The generation unit 3403 is configured to: if it is detected that at least one first menu on the first application interface receives a touch event entered by a user, generate an application start event, where the application start event is used to start an application to which the second application interface belongs.

The second processing unit 3405 is configured to add a column split flag to the application start event, where the column split flag is used to instruct the second application interface to be displayed in a preset mode.

The first detection unit 3406 is configured to: if it is detected that the at least one first menu on the first application interface receives the touch event entered by the user, start the second application interface corresponding to any one of the at least one first menu.

Specifically, the first detection unit 3406 further includes: a first detection module 34061, a first start module 34062, a second processing module 34063, and a second start module 34064.

The first detection module 34061 is configured to detect whether the terminal device has stored an application for implementing a function of any one of the at least one first menu.

The first start module 34062 is configured to: if it is detected that the terminal device has stored the application for implementing the function of the first menu, start the second application interface of the application that has been stored by the terminal device and that is used to implement the function of the first menu.

The second processing module 34063 is configured to: if it is detected that the terminal device has not stored the application for implementing the function of the first menu, download the application for implementing the function of the first menu.

More specifically, the second processing module 34063 includes: a first obtaining submodule 340631, configured to obtain an order of applications that are stored on a server and that are used to implement the function of the first menu, where on the server, the applications for implementing the function of the first menu are sorted in descending order of quantities of downloading times, or the applications for implementing the function of the first menu are sorted in descending order of quantities of favorable comments, or the applications for implementing the function of the first menu are sorted in descending order of downloading success probabilities, or the applications for implementing the function of the first menu are sorted in descending order of downloading speeds; and a first downloading submodule 340632, configured to download first N applications of the applications that are stored on the server and that are used to implement the function of the first menu, where N is a positive integer greater than or equal to 1.

The second start module 34064 is configured to start the second application interface of the application that has been downloaded by the terminal device and that is used to implement the function of the first menu.

The first detection unit 3406 is further configured to start, based on the application start event, the application to which the second application interface belongs, so that the application to which the second application interface belongs displays the second application interface; and the first adjustment unit 3407 is configured to adjust the second application interface so that the second application interface is displayed in a preset mode, where the second application interface is used to implement a function of the first menu corresponding to the second application interface, where the first application interface includes the third region used to display the at least one first menu and the fourth region on which no interface element is displayed, and in the preset mode, a first region that is of the second application interface and that corresponds to a location of the third region along a direction perpendicular to a display screen of the terminal device is a transparent region, a second region that is of the second application interface and that corresponds to a location of the fourth region along the direction perpendicular to the display screen of the terminal device is a non-transparent region, and an interface element of the second application interface is displayed in the second region.

The first adjustment unit 3407 is further configured to adjust the second application interface based on the column split flag so that the second application interface is displayed in the preset mode.

Specifically, the first adjustment unit 3407 includes: an obtaining module 34071, configured to obtain an area of the third region of the first application interface; a first division module 34072, configured to divide the second application interface based on the area of the third region of the first application interface, to form the first region and the second region, so that an area of the first region is greater than or equal to the area of the third region; a first adjustment module 34073, configured to adjust the interface element displayed on the second application interface, so that the interface element of the second application interface is displayed in the second region; and a first processing module 34074, configured to perform transparency processing on the first region of the second application interface based on preset transparency, so that the first region on which transparency processing has been performed is a transparent region.

The first processing unit 3408 is configured to attach a task of the application to which the second application interface belongs to a task stack of an application to which the first application interface belongs, so that the task of the application to which the second application interface belongs and a task of the application to which the first application interface belongs are in the same task stack.

The second detection unit 3409 is configured to: if it is detected that the touch event entered by the user is in the first region of the second application interface, obtain first coordinates that are of a location at which the user enters the touch event and that are on the display screen of the terminal device.

The first sending unit 3410 is configured to send the first coordinates to the application to which the first application interface belongs, so that the application to which the first application interface belongs determines a menu corresponding to the first coordinates.

The first start unit 3411 is configured to: if it is determined that the menu corresponding to the first coordinates is a second menu, start a third application interface corresponding to the second menu, where the third application interface is used to replace the second application interface and is displayed in the preset mode, the second menu is used to start the third application interface corresponding to the second menu, and the second application interface and the third application interface are used to implement different functions.

The first determining unit 3412 is configured to: if it is determined that the menu corresponding to the first coordinates is a third menu, control the application to which the first application interface belongs to implement a function of the third menu.

The third detection unit 3413 is configured to: if it is detected that the touch event entered by the user is in the second region of the second application interface, obtain second coordinates that are of a location at which the user enters the touch event and that are on the display screen of the terminal device.

The second sending unit 3414 is configured to send the second coordinates to the application to which the second application interface belongs, so that the application to which the second application interface belongs determines a fourth menu corresponding to the second coordinates, and the application to which the second application interface belongs implements a function of the fourth menu.

Optionally, in this embodiment, the first application interface and the second application interface belong to different applications.

If the first application interface and the second application interface belong to different applications, the terminal device of this embodiment executes the specific procedure of the application interface display method. For details, refer to FIG. 7, and details are not specifically described in this embodiment. In addition, for details of beneficial effects of executing the application interface display method shown in FIG. 7 by the terminal device of this embodiment, refer to FIG. 7, and details are not specifically described in this embodiment.

Optionally, the first application interface and the second application interface belong to a same application, the first application interface is a first-level application interface, and the second application interface is an Mth-level application interface, so that the second application interface is a lower-level application interface of the first application interface, where M is a positive integer greater than 1.

If the first application interface and the second application interface belong to a same application, the terminal device of this embodiment executes the specific procedure of the application interface display method. For details, refer to FIG. 17, and details are not specifically described in this embodiment. In addition, for details of beneficial effects of executing the application interface display method shown in FIG. 17 by the terminal device of this embodiment, refer to FIG. 17, and details are not specifically described in this embodiment.

Figure 35:
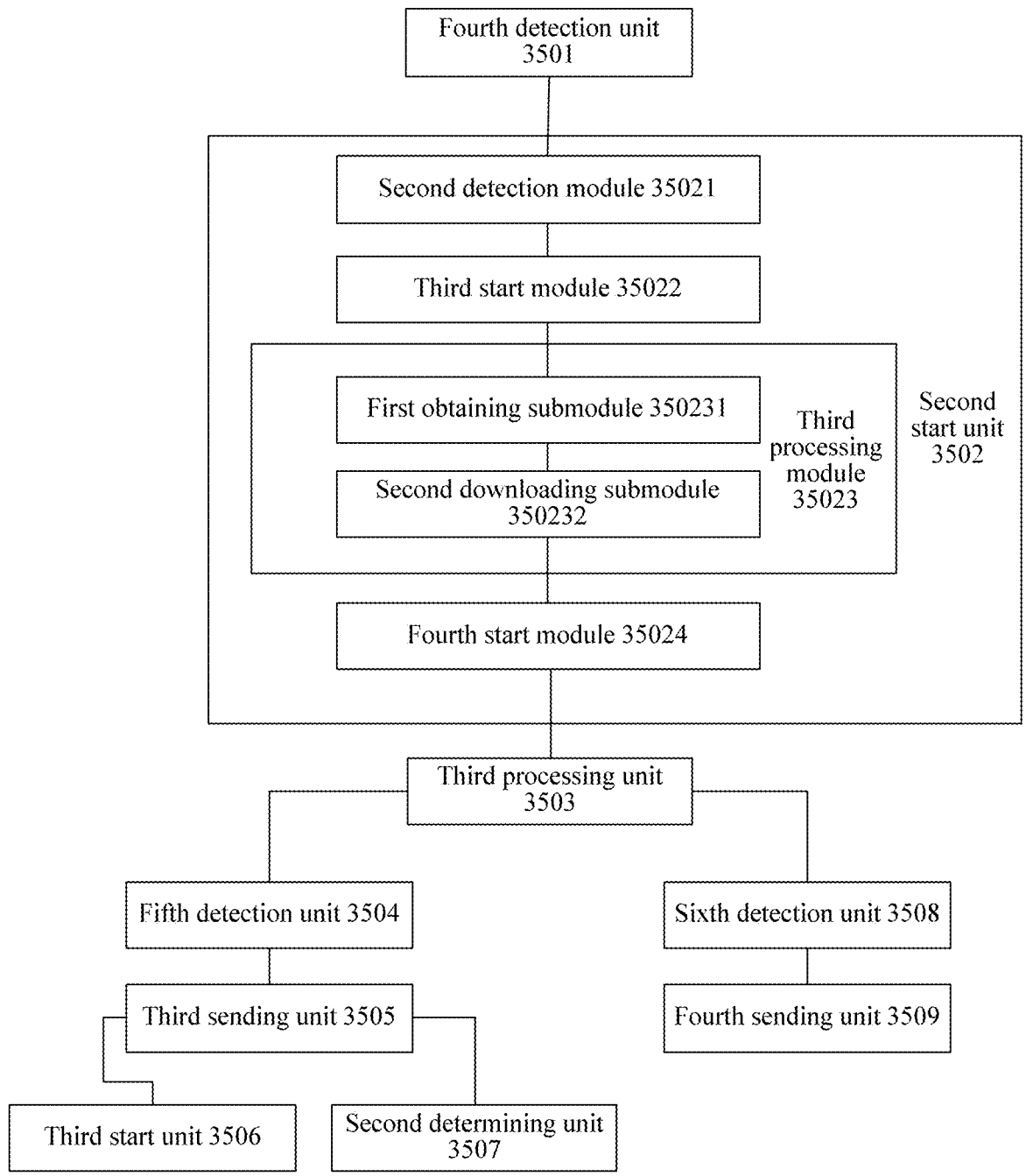
FIG. 35 is a schematic structural diagram of a terminal device according to an embodiment of the present invention.

The following describes a structure of a terminal device provided in the present invention with reference to FIG. 35.

It should be noted that the terminal device of this embodiment is configured to execute the application interface display method shown in FIG. 33. For a specific procedure of executing the application interface display method by the terminal device, refer to FIG. 33, and details are not specifically described in this embodiment. In addition, for details of beneficial effects of executing the application interface display method shown in FIG. 33 by the terminal device of this embodiment, refer to FIG. 33, and details are not specifically described in this embodiment.

As shown in FIG. 35, the terminal device includes: a fourth detection unit 3501, a second start unit 3502, a third processing unit 3503, a fifth detection unit 3504, a third sending unit 3505, a third start unit 3506, a second determining unit 3507, a sixth detection unit 3508, and a fourth sending unit 3509.

The fourth detection unit 3501 is configured to: if it is detected that at least one first menu on a first application interface receives a touch event entered by a user, determine, based on the at least one first menu, a second application interface corresponding to any one of the at least one first menu.

The second start unit 3502 is configured to start the second application interface corresponding to any one of the at least one first menu, where the second application interface is used to implement a function of the first menu corresponding to the second application interface.

Specifically, the second start unit 3502 includes a second detection module 35021, a third start module 35022, a third processing module 35023, and a fourth start module 35024.

The second detection module 35021 is configured to detect whether the terminal device has stored an application for implementing a function of any one of the at least one first menu.

The third start module 35022 is configured to: if it is detected that the terminal device has stored the application for implementing the function of the first menu, start the second application interface of the application that has been stored by the terminal device and that is used to implement the function of the first menu.

The third processing module 35023 is configured to: if it is detected that the terminal device has not stored the application for implementing the function of the first menu, download the application for implementing the function of the first menu.

More specifically, the third processing module 35023 includes: a first obtaining submodule 350231, configured to obtain an order of applications that are stored on a server and that are used to implement the function of the first menu, where on the server, the applications for implementing the function of the first menu are sorted in descending order of quantities of downloading times, or the applications for implementing the function of the first menu are sorted in descending order of quantities of favorable comments, or the applications for implementing the function of the first menu are sorted in descending order of downloading success probabilities, or the applications for implementing the function of the first menu are sorted in descending order of downloading speeds; and a second downloading submodule 350232, configured to download first N applications of the applications that are stored on the server and that are used to implement the function of the first menu, where N is a positive integer greater than or equal to 1.

The fourth start module 35024 is configured to start the second application interface of the application that has been downloaded by the terminal device and that is used to implement the function of the first menu.

The third processing unit 3503 is configured to attach a task of an application to which the second application interface belongs to a task stack of an application to which the first application interface belongs, so that the task of the application to which the second application interface belongs and a task of the application to which the first application interface belongs are in the same task stack.

The fifth detection unit 3504 is configured to: if it is detected that the touch event entered by the user corresponds to an interface element on the first application interface, obtain first coordinates that are of a location at which the user enters the touch event and that are on a display screen of the terminal device.

The third sending unit 3505 is configured to send the first coordinates to the application to which the first application interface belongs, so that the application to which the first application interface belongs determines a menu corresponding to the first coordinates.

The third start unit 3506 is configured to: if it is determined that the menu corresponding to the first coordinates is a second menu, start a third application interface corresponding to the second menu, where the third application interface is used to replace the second application interface, the second menu is used to start the third application interface corresponding to the second menu, and the second application interface and the third application interface are used to implement different functions.

The second determining unit 3507 is configured to: if it is determined that the menu corresponding to the first coordinates is a third menu, control the application to which the first application interface belongs to implement a function of the third menu.

The sixth detection unit 3508 is configured to: if it is detected that the touch event entered by the user corresponds to an interface element on the second application interface, obtain second coordinates that are of the location at which the user enters the touch event and that are on the display screen of the terminal device.

The fourth sending unit 3509 is configured to send the second coordinates to the application to which the second application interface belongs, so that the application to which the second application interface belongs determines a fourth menu corresponding to the second coordinates, and the application to which the second application interface belongs implements a function of the fourth menu.

In FIG. 34, the structure of the mobile terminal is described from the perspective of functional modules, and the following describes a specific structure of the mobile terminal from the perspective of hardware entities with reference to FIG. 1.

The mobile terminal of this embodiment includes: one or more processor units 103, a storage unit 104, a bus system, and one or more programs, where the processor unit 103 and the storage unit 104 are connected by using the bus system.

The one or more programs are stored in the storage unit 104, and the one or more programs include an instruction. When executed by the mobile terminal, the instruction enables the mobile terminal to execute the application interface display method shown in FIG. 7 and FIG. 17. For a specific execution procedure, refer to FIG. 7 and FIG. 17, and details are not specifically described in this embodiment.

In FIG. 35, the structure of the mobile terminal is described from the perspective of functional modules, and the following describes a specific structure of the mobile terminal from the perspective of hardware entities with reference to FIG. 1.

The mobile terminal of this embodiment includes: one or more processor units 103, a storage unit 104, a bus system, and one or more programs, where the processor unit 103 and the storage unit 104 are connected by using the bus system.

The one or more programs are stored in the storage unit 104, and the one or more programs include an instruction. When executed by the mobile terminal, the instruction enables the mobile terminal to execute the application interface display method shown in FIG. 33. For a specific execution procedure, refer to FIG. 33, and details are not specifically described in this embodiment.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separated, and pails shown as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method, comprising:

displaying, by a terminal device, a first application interface on a display screen of the terminal device, wherein the first application interface comprises a third region that displays a first menu and a fourth region;

when it is detected that the first menu on the first application interface has received a touch event entered by a user, starting, by the terminal device, a second application interface corresponding to the first menu, wherein the second application interface comprises a first region and a second region;

adjusting, by the terminal device, the second application interface without scaling down the second application interface such that all interface elements of the second application interface are in the second region, the first region is transparent, and the second region is non-transparent;

adjusting, by the terminal device, the first application interface without scaling down the first application interface by moving interface elements in the fourth region of the first application interface to the third region of the first application interface; and simultaneously displaying the first application interface and displaying the second application interface in a preset mode by displaying the first region of the second application interface above the third region of the first application interface along a direction perpendicular to a major surface of the display screen and by displaying the second region of the second application interface above the fourth region of the first application interface along the direction perpendicular to the major surface of the display screen such that all interface elements of the first application interface are displayed in the third region and visible through the first region of the second application interface that is transparent, wherein the second application interface implements a function of the first menu.

2. The method according to claim 1, wherein adjusting the second application interface to display the second application interface in the preset mode comprises:
obtaining an area of the third region of the first application interface;
dividing the second application interface based on the area of the third region of the first application interface, to form the first region of the second application interface and the second region of the second application interface, wherein an area of the first region of the second application interface is greater than or equal to the area of the third region of the first application interface;
adjusting an interface element of the second application interface to display the interface element of the second application interface in the second region of the second application interface; and
performing transparency processing on the first region of the second application interface based on a preset transparency, to cause the first region of the second application interface on which the transparency processing has been performed to be a transparent region.

3. The method according to claim 1, wherein after adjusting the second application interface to display the second application interface in the preset mode, the method further comprises:
when it is detected that the touch event entered by the user is entered in the first region of the second application interface, obtaining first coordinates of a location in which the user enters the touch event on the display screen of the terminal device; and
sending the first coordinates to an application to which the first application interface belongs, causing the application to which the first application interface belongs to determine a menu corresponding to the first coordinates.

4. The method according to claim 3, wherein after sending the first coordinates to the application to which the first application interface belongs, the method further comprises:
when it is determined that the menu corresponding to the first coordinates is a second menu, starting a third application interface corresponding to the second menu, wherein the third application interface replaces the second application interface, the third application interface is displayed in the preset mode, and the second application interface and the third application interface implement different functions.

5. The method according to claim 1, further comprising:
attaching a task of an application to which the second application interface belongs to a task stack of the application to which the first application interface belongs, causing the task of the application to which the second application interface belongs and a task of the application to which the first application interface belongs to be in the same task stack.

6. The method according to claim 1, wherein after adjusting the second application interface to display the second application interface in the preset mode, the method further comprises:
when it is detected that the touch event entered by the user is entered in the second region of the second application interface, obtaining second coordinates of a location at which the user enters the touch event on the display screen of the terminal device; and
sending the second coordinates to an application to which the second application interface belongs, causing the application to which the second application interface belongs to determine a fourth menu corresponding to the second coordinates, wherein the application to which the second application interface belongs implements a function of the fourth menu.

7. The method according to claim 1, wherein the first application interface and the second application interface belong to different applications, and starting the second application interface corresponding to the first menu comprises:
detecting whether the terminal device has stored an application that implements a function of the first menu; and
performing the following:
when it is detected that the terminal device has stored the application for implementing the function of the first menu, starting the second application interface of the application that has been stored by the terminal device and that implements the function of the first menu; or
when it is detected that the terminal device has not stored the application for implementing the function of the first menu, downloading the application that implements the function of the first menu, and starting the second application interface of the application that has been downloaded by the terminal device and that implements the function of the first menu.

8. The method according to claim 7, wherein downloading the application that implements the function of the first menu comprises:
obtaining an order of applications that are stored on a server and that implement the function of the first menu, wherein on the server, the applications that implement the function of the first menu are sorted in descending order of quantities of downloading times, or the applications that implement the function of the first menu are sorted in descending order of quantities of favorable comments, or the applications that implement the function of the first menu are sorted in descending order of downloading success probabilities, or the applications that implement the function of the first menu are sorted in descending order of downloading speeds; and
downloading first N applications of the applications that are stored on the server and that implement the function of the first menu, wherein N is a positive integer greater than or equal to 1.

9. A terminal device, comprising:
a display screen;
a processor; and
a computer-readable storage medium storing a program to be executed by the processor, the program including instructions for:
displaying a first application interface on the display screen, wherein the first application interface comprises a third region that displays a first menu and a fourth region;
when it is detected that the first menu on the first application interface has received a touch event entered by a user, starting a second application interface corresponding to the first menu, wherein the second application interface comprises a first region and a second region;
adjusting the second application interface without scaling down the second application interface such that all interface elements of the second application interface are in the second region, the first region is transparent, and the second region is non-transparent;

adjusting the first application interface without scaling down the first application interface by moving interface elements in the fourth region of the first application interface to the third region of the first application interface; and simultaneously displaying the first application interface and displaying the second application interface in a preset mode by displaying the first region of the second application interface above the third region of the first application interface along a direction perpendicular to a major surface of the display screen and by displaying the second region of the second application interface above the fourth region of the first application interface along the direction perpendicular to the major surface of the display screen such that all interface elements of the first application interface are displayed in the third region and visible through the first region of the second application interface that is transparent, wherein the second application interface implements a function of the first menu.

10. The terminal device according to claim 9, wherein the program further includes instructions for:

obtaining an area of the third region of the first application interface;

dividing the second application interface based on the area of the third region of the first application interface, to form the first region of the second application interface and the second region of the second application interface, wherein an area of the first region of the second application interface is greater than or equal to the area of the third region of the first application interface;

adjusting an interface element displayed on the second application interface, causing the interface element of the second application interface to be displayed in the second region of the second application interface; and performing transparency processing on the first region of the second application interface based on a preset transparency, causing the first region on which the transparency processing is performed to be a transparent region.

11. The terminal device according to claim 9, wherein the program further includes instructions for:

when it is detected that the touch event entered by the user is entered in the first region of the second application interface, obtaining first coordinates of a location at which the user enters the touch event on the display screen; and sending the first coordinates to an application to which the first application interface belongs, causing the application to which the first application interface belongs to determine a menu corresponding to the first coordinates.

12. The terminal device according to claim 11, wherein the program further includes instructions for:

when it is determined that the menu corresponding to the first coordinates is a second menu, starting a third application interface corresponding to the second menu, wherein the third application interface replaces the second application interface, the third application interface is displayed in the preset mode, and the second application interface and the third application interface implement different functions.

13. The terminal device according to claim 9, wherein the program further includes instructions for:

attaching a task of an application to which the second application interface belongs to a task stack of the application to which the first application interface belongs, causing the task of the application to which the second application interface belongs and a task of the application to which the first application interface belongs to be in the same task stack.

14. The terminal device according to claim 9, wherein the program further includes instructions for:

when it is detected that the touch event entered by the user is entered in the second region of the second application interface, obtaining second coordinates of a location at which the user enters the touch event on the display screen; and sending the second coordinates to an application to which the second application interface belongs, causing the application to which the second application interface belongs to determine a fourth menu corresponding to the second coordinates, wherein the application to which the second application interface belongs implements a function of the fourth menu.

15. The terminal device according to claim 9, wherein the first application interface and the second application interface belong to different applications, and the program further includes instructions for:

detecting whether the terminal device has stored an application for implementing a function of the first menu;

when it is detected that the terminal device has stored the application for implementing the function of the first menu, start the second application interface of the application that has been stored by the terminal device and that implements the function of the first menu; and when it is detected that the terminal device has not stored the application for implementing the function of the first menu, download the application that implements the function of the first menu, and starting the second application interface of the application that has been downloaded by the terminal device and that implements the function of the first menu.

16. The terminal device according to claim 15, wherein the program further includes instructions for:

obtaining an order of applications that are stored on a server and that implement the function of the first menu, wherein on the server, the applications that implement the function of the first menu are sorted in descending order of quantities of downloading times, or the applications that implement the function of the first menu are sorted in descending order of quantities of favorable comments, or the applications that implement the function of the first menu are sorted in descending order of downloading success probabilities, or the applications that implement the function of the first menu are sorted in descending order of downloading speeds; and downloading first N applications of the applications that are stored on the server and that implement the function of the first menu, wherein N is a positive integer greater than or equal to 1.

17. A non-transitory computer readable storage medium storing instructions, the instructions comprising instructions for:

displaying a first application interface on a display screen, wherein the first application interface comprises a third region that displays a first menu and a fourth region;

when it is detected that the first menu on the first application interface has received a touch event entered by a user, starting a second application interface corresponding to the first menu, wherein the second application interface comprises a first region and a second region;

adjusting the second application interface without scaling down the second application interface such that all interface elements of the second application interface are in the second region, the first region is transparent, and the second region is non-transparent;

adjusting the first application interface without scaling down the first application interface by moving interface elements in the fourth region of the first application interface to the third region of the first application interface; and simultaneously displaying the first application interface and displaying the second application interface in a preset mode by displaying the first region of the second application interface above the third region of the first application interface along a direction perpendicular to a major surface of the display screen and by displaying the second region of the second application interface above the fourth region of the first application interface along the direction perpendicular to the major surface of the display screen such that all interface elements of the first application interface are displayed in the third region and visible through the first region of the second application interface that is transparent, wherein the second application interface implements a function of the first menu corresponding to the second application interface.

18. The non-transitory computer readable storage medium according to claim 17, wherein the instructions further comprise instructions for:

obtaining an area of the third region of the first application interface;

dividing the second application interface based on the area of the third region of the first application interface, to form the first region of the second application interface and the second region of the second application interface, wherein an area of the first region of the second application interface is greater than or equal to the area of the third region of the first application interface;

adjusting an interface element displayed on the second application interface, causing the interface element of the second application interface to be displayed in the second region of the second application interface; and performing transparency processing on the first region of the second application interface based on a preset transparency, causing the first region on which the transparency processing is performed to be a transparent region.

19. The non-transitory computer readable storage medium according to claim 17, wherein the instructions further comprise instructions for:

when it is detected that the touch event entered by the user is entered in the first region of the second application interface, obtaining first coordinates of a location at which the user enters the touch event on the display screen; and sending the first coordinates to an application to which the first application interface belongs, causing the application to which the first application interface belongs to determine a menu corresponding to the first coordinates.

\* \* \* \* \*